United States Patent [19]

Johnston, Jr. et al.

[11] Patent Number: 5,069,527
[45] Date of Patent: Dec. 3, 1991

[54] APPARATUS FOR MEASURING THE MODE QUALITY OF A LASER BEAM

[75] Inventors: Thomas F. Johnston, Jr., Auburn; David A. Dewey, Sunnyvale, both of Calif.

[73] Assignee: Coherent, Inc., Palo Alto, Calif.

[21] Appl. No.: 511,817

[22] Filed: Apr. 26, 1990

[51] Int. Cl.⁵ .................................................. G02B 7/02
[52] U.S. Cl. .................................... 359/823; 356/152; 359/380
[58] Field of Search ................. 350/255, 6.3, 274, 518, 350/519, 521, 522, 537, 173; 356/121, 122, 152

[56] References Cited

U.S. PATENT DOCUMENTS

| | | | |
|---|---|---|---|
| 1,651,493 | 12/1927 | Warmisham | 350/481 |
| 2,535,115 | 12/1950 | Back et al. | 350/255 |
| 4,123,167 | 10/1978 | Botcherby et al. | 350/6.3 |
| 4,639,083 | 1/1987 | Fuziwara et al. | 350/255 |

Primary Examiner—Loha Ben
Attorney, Agent, or Firm—Limbach, Limbach & Sutton

[57] ABSTRACT

A method and apparatus for determining the quality of a multimode laser beam (10). In the preferred embodiment, the apparatus includes a lens (32) for creating a transformed or imaged waist from the input beam. The location of the transformed beam waist and its diameter are then determined. These steps can be carried out by chopping the beam using a rotating hub (34) having apertures (36, 38) for seletively passing the beam. Preferably, one of the appertures has a pair of 45° knife edges (40, 42). The transmission of the beam past the knife edge is monitored by a detector (30). In operation, the lens focal position is varied while the transmission of the beam past the knife edge is monitored in order to locate and measure the diameter of the transformed waist. The diameter of the beam at one other known location is measured. A processor then calculates beam quality by fitting these measurements to a mathematical model. Once the quality of the beam is calculated, the location of the original beam waist and its diameter can be derived. Once all of the beam parameters are derived, the propagation characteristics of the beam can be predicted. In the preferred embodiment, the lens is defined by a doublet (533, 535) designed to minimize spherical aberration. In addition, the spacing between the lens pair is varied to minimize the net aberration at the operating wavelength of the laser.

7 Claims, 26 Drawing Sheets

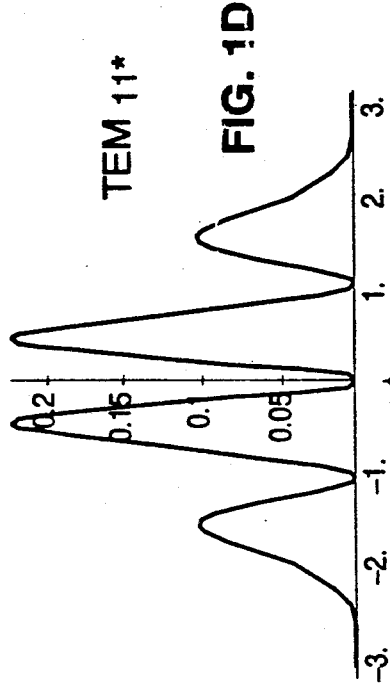
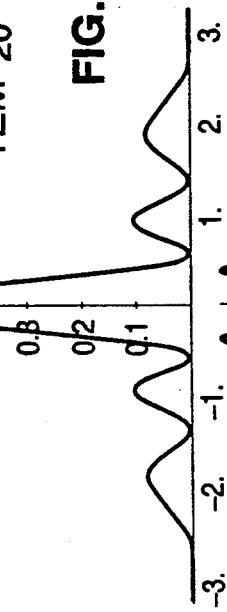
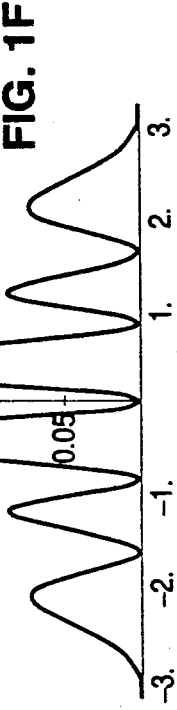
FIG. 1D TEM$_{11}$*
FIG. 1E TEM$_{20}$
FIG. 1F TEM$_{21}$*
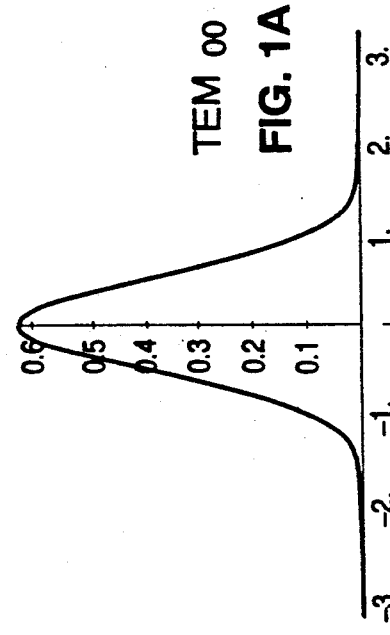
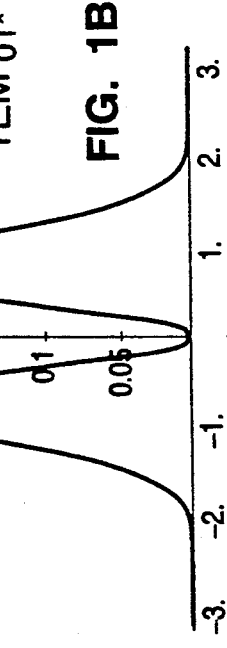
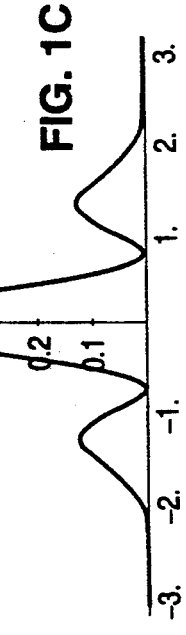
FIG. 1A TEM$_{00}$
FIG. 1B TEM$_{01}$*
FIG. 1C TEM$_{10}$ FIG. 8a
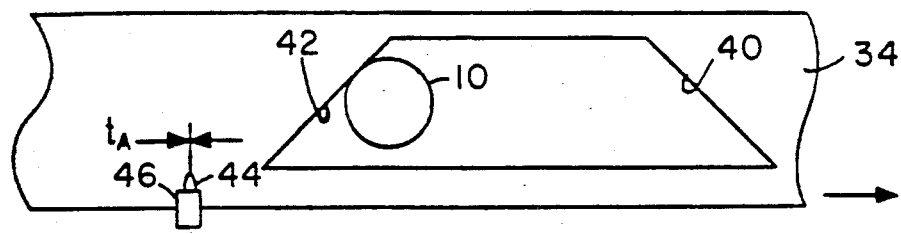
FIG. 8b
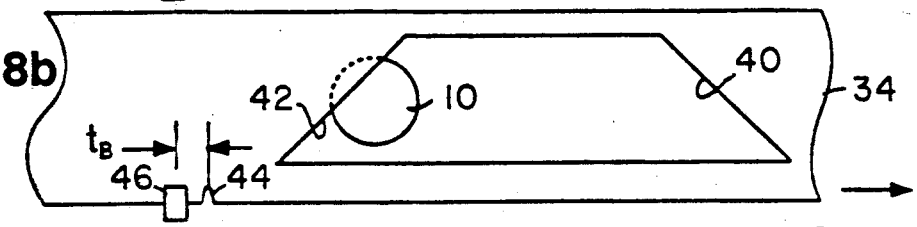
FIG. 8c
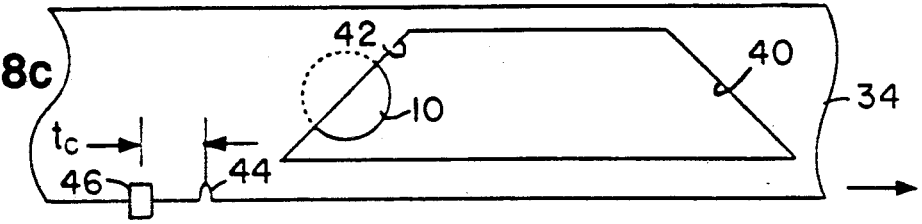
FIG. 8d
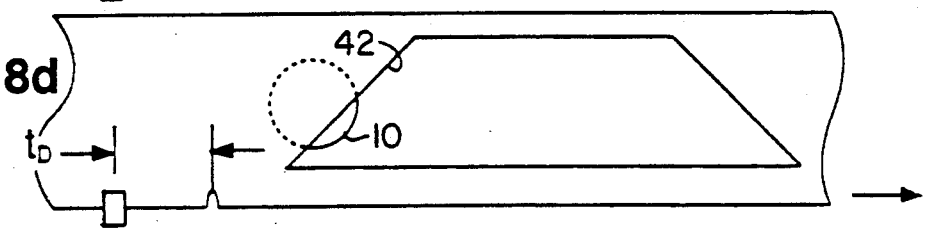
FIG. 8e
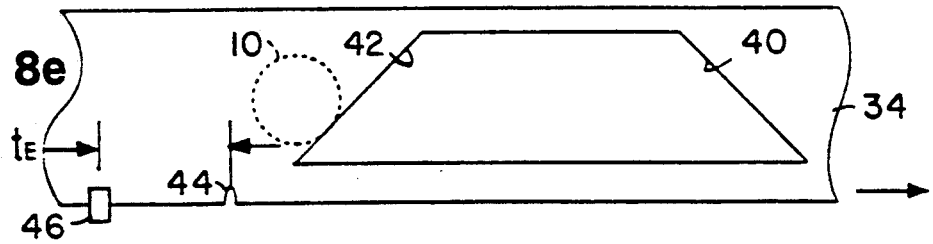
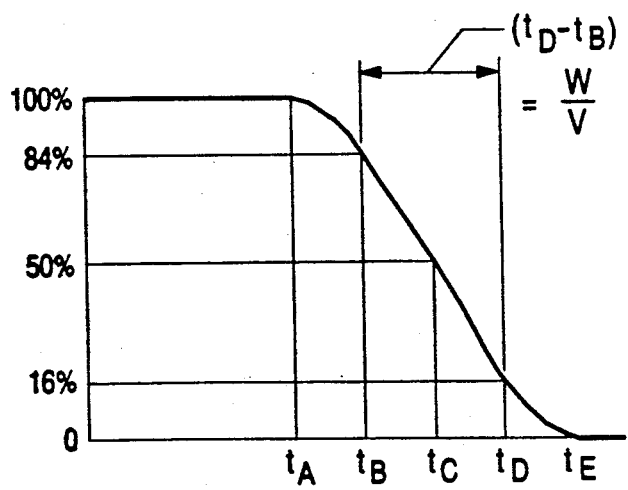
FIG. 9
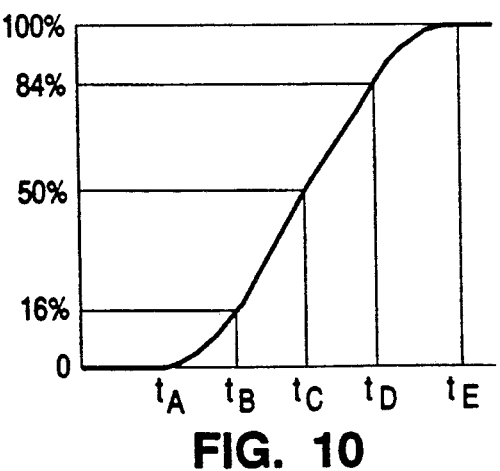
FIG. 10

FIG. 13a
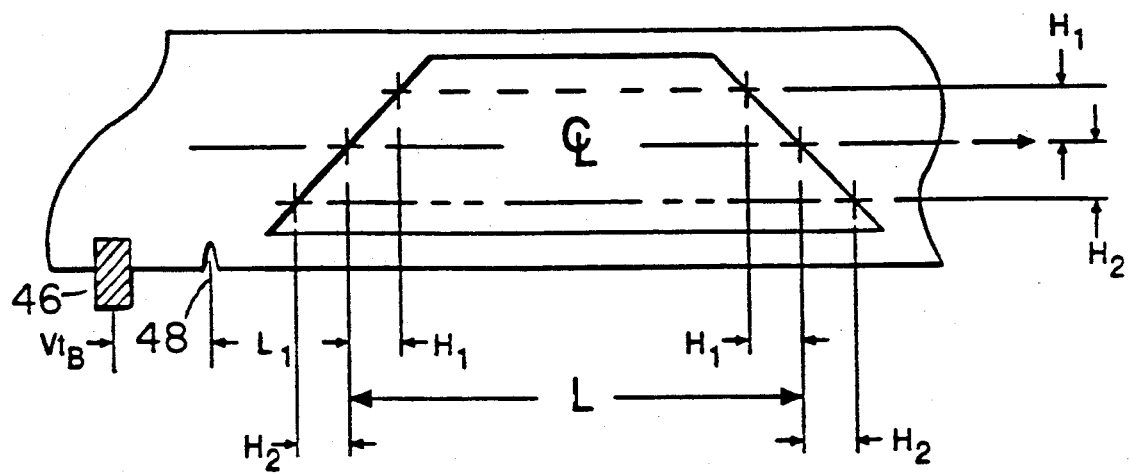
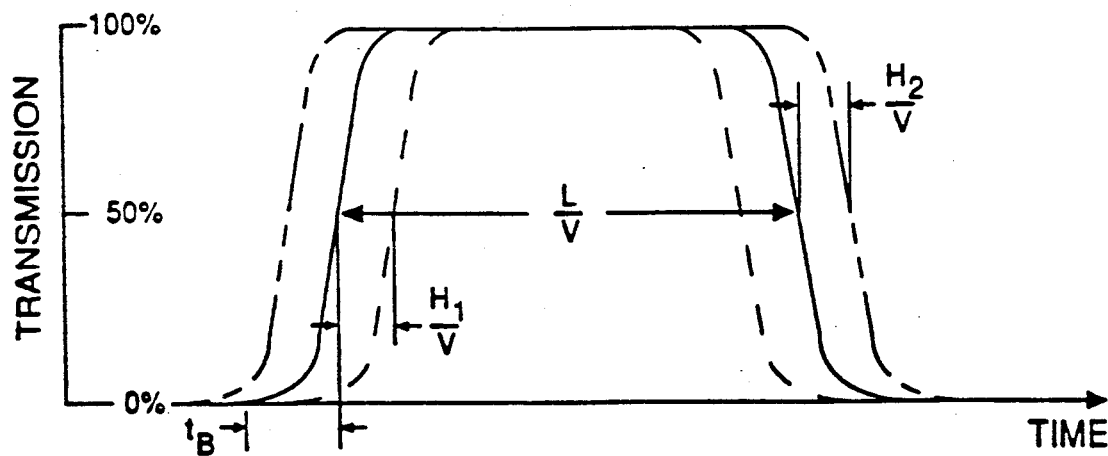
FIG. 13b

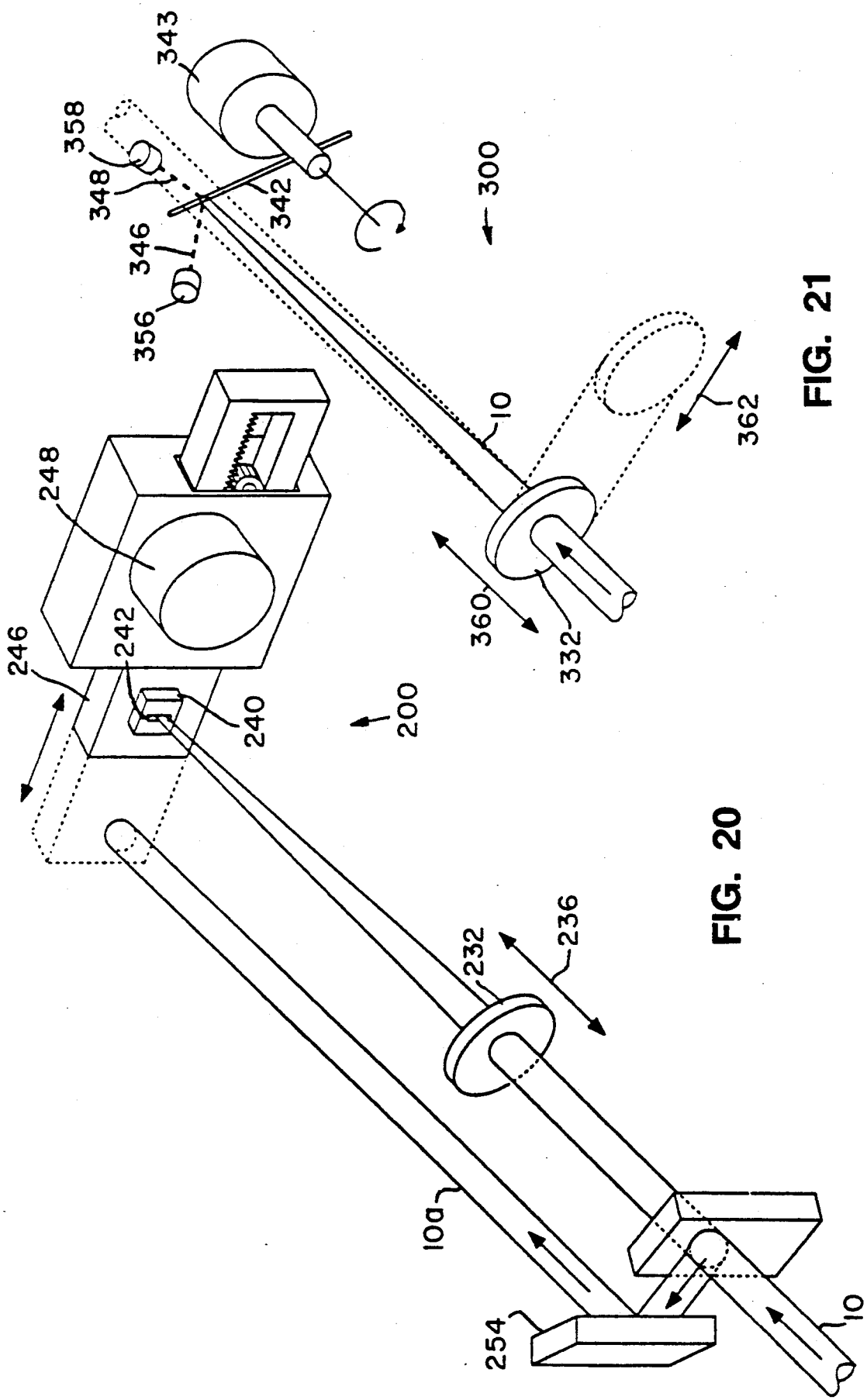

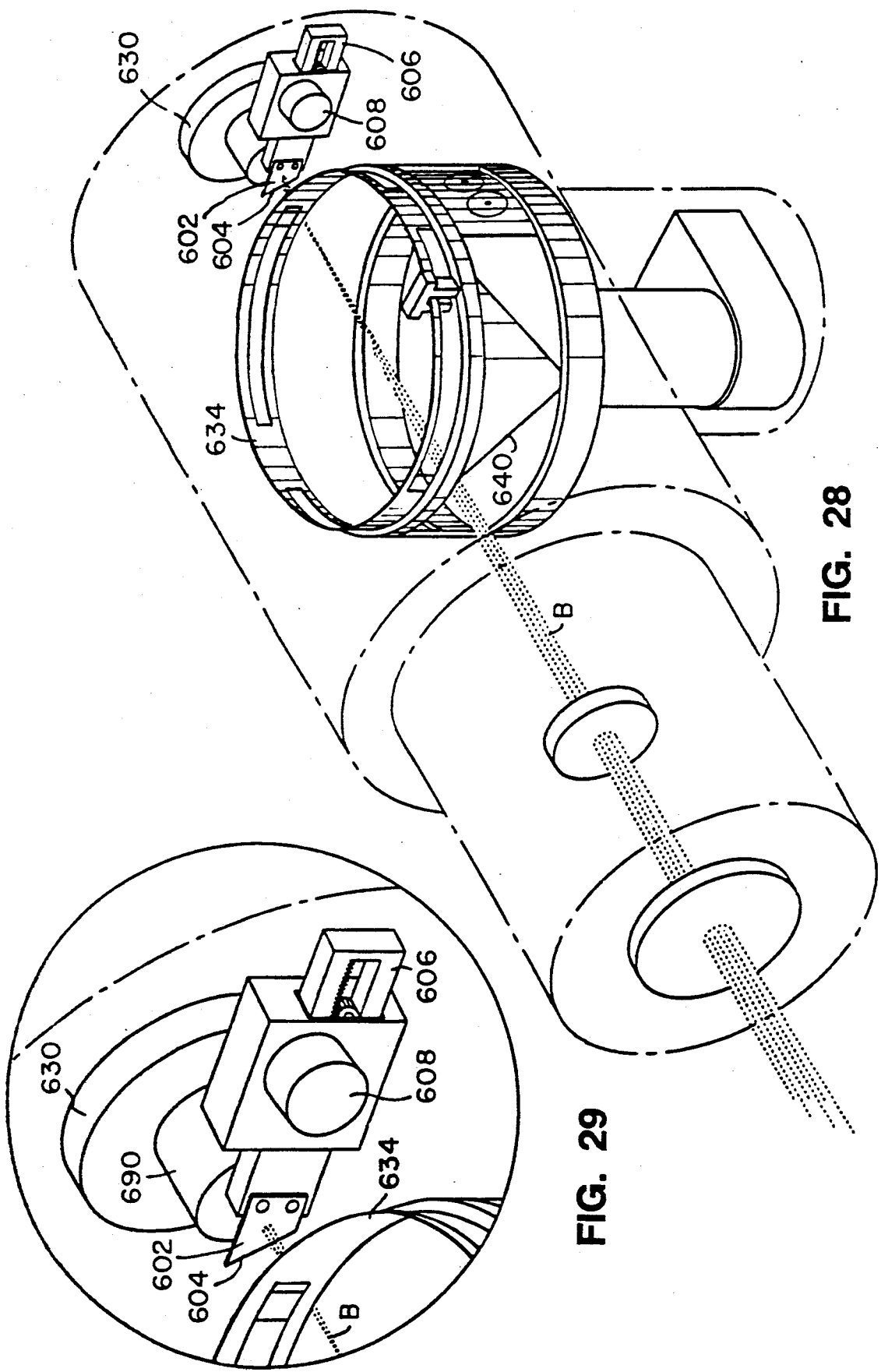

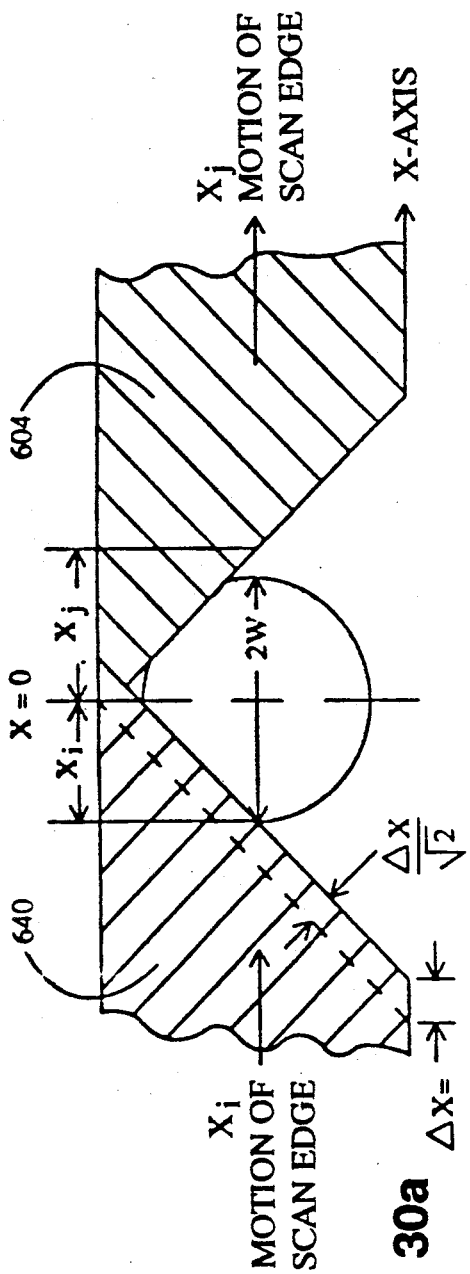
FIG. 30a
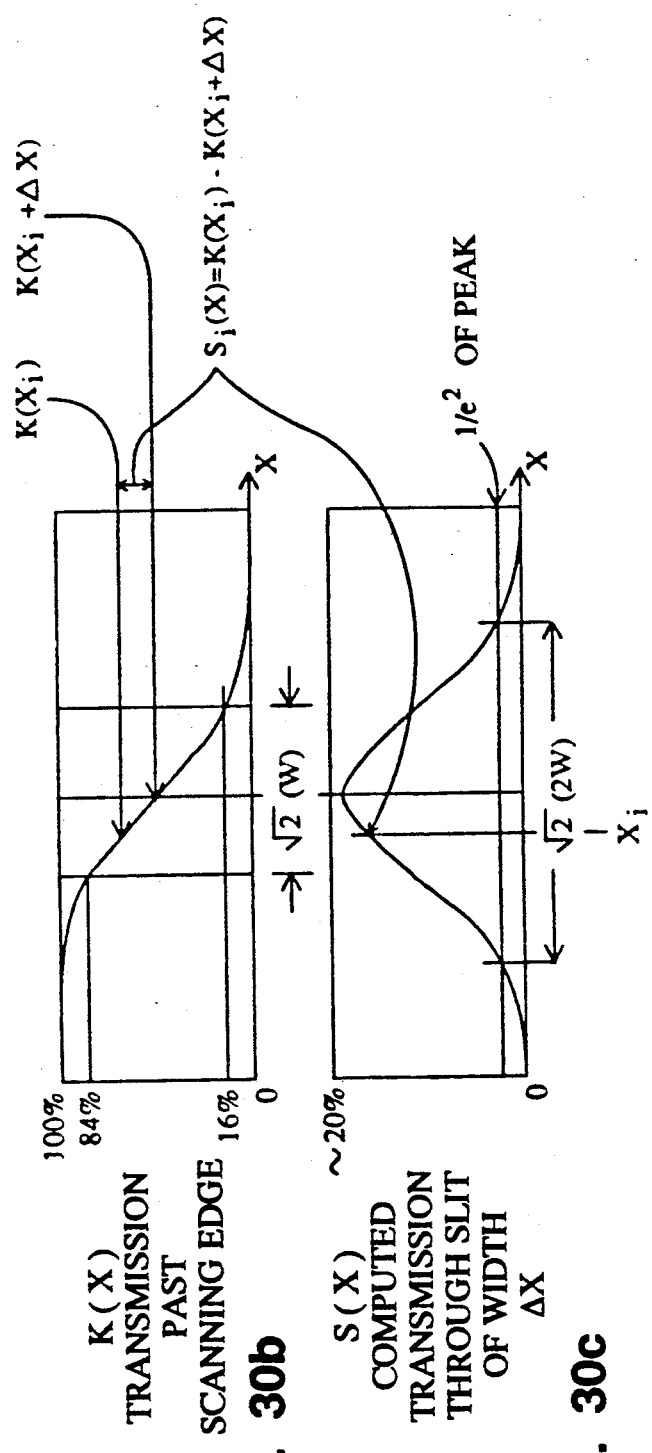
FIG. 30b
FIG. 30c

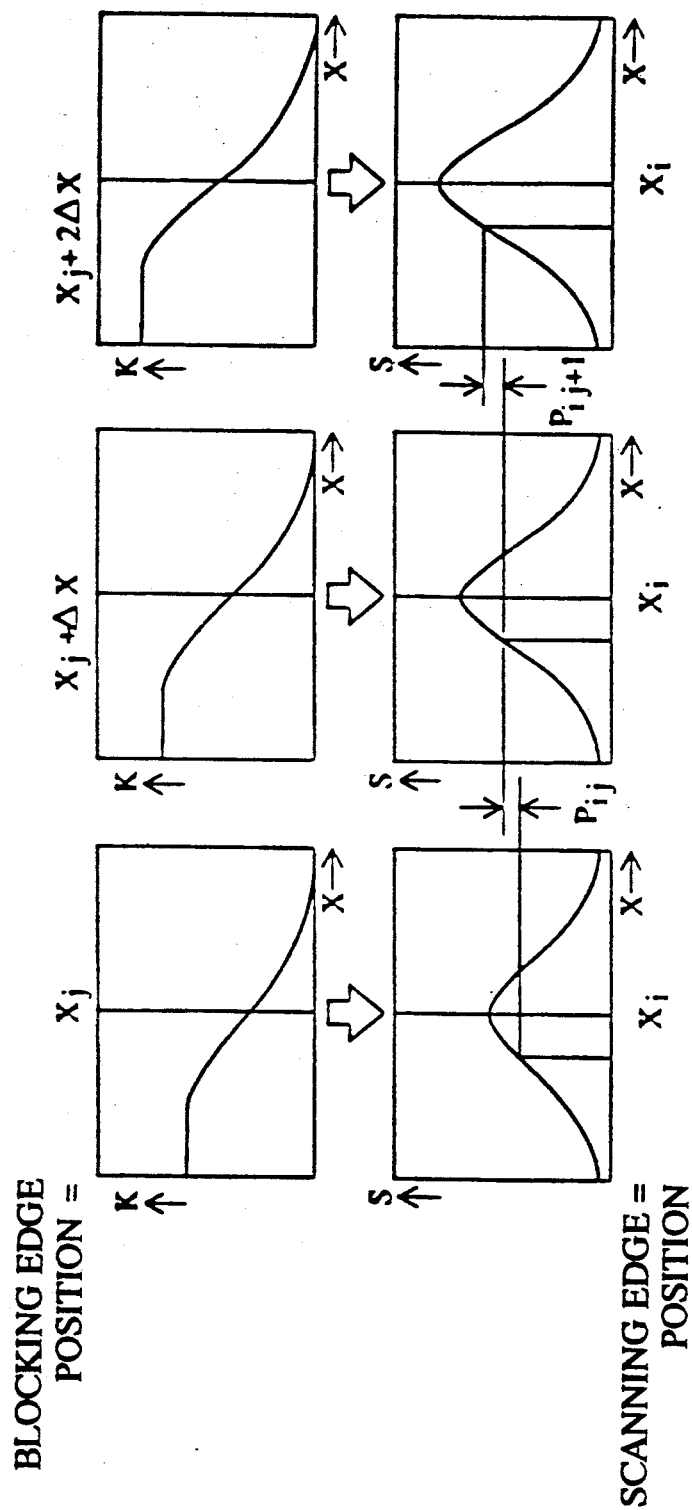

APPARATUS FOR MEASURING THE MODE QUALITY OF A LASER BEAM

TECHNICAL FIELD

The subject invention relates to a device for measuring the mode quality of a laser beam and specifying the propagation constants for the measured beam.

BACKGROUND OF THE INVENTION

One of the principal distinctions between ordinary light and laser light is related to beam propagation. Ordinary light may be thought of as the aggregate sum of a large number of individual spherical electromagnetic waves each radiating from its own separate point source (called Huygen's wavelets in optics textbooks). The individual sources making up the emitter act independently without correlation in space, time or frequency between the individual waves. A familiar consequence, taught in traditional optics texts, is that if one uses a lens to collect such light and concentrate it as tightly as possible in the lens focal plane, the best result is an illuminated region that is the composite image of all the individual incoherent sources with a surface brightness no greater than the surface brightness of the source. The size of this illuminated area will grow in proportion to the size of the emitter and any attempt to create higher intensity in the focal spot by increasing the size (and total power radiated) of the emitter will prove unsuccessful. In contrast, laser light can be characterized as a single wavetrain (or a small number of wavetrains) having uniform frequency and phase over a broad space transverse to the propagation direction. Such coherent light can be concentrated by a lens to a diameter that can be as small as the Heisenberg uncertainty principle allows (i.e., focused to the "diffraction limit"), regardless of the spatial extent of the source.

The way in which intensity is distributed across the laser beam has important consequences in the degree to which a small focal-spot diameter can be achieved. A beam comprising a single wavetrain with a Gaussian intensity distribution (shown as the $TEM_{00}$ mode profile in FIG. 1) will focus more tightly than any other distribution. Such Gaussian beams can be produced by lasers, but typically at a significant sacrifice in output power. Lasers employ resonant cavities to store optical energy, and this energy is stored in various "modes", each with its own frequency and distribution of intensity. The mode of lowest order is the one that has the Gaussian intensity distribution just described, and is for that same reason, the mode that occupies the smallest diameter inside the laser resonator. Higher order modes have more complex intensity distributions and occupy larger cross-sectional areas.

The mode profiles of FIG. 1 are used as examples throughout and so are here briefly explained. For each mode, the intensity in the beam (vertical axis) is plotted as a function of the radial distance outward (horizontal axis) transverse to the beam propagation axis. This intensity could be measured, for example, by detecting the power transmitted through a small pinhole aperture (one with an opening small compared to the beam width) as the pinhole was moved across the beam perpendicular to the propagation axis. The characteristic radius of the $TEM_{00}$ mode is used for the units for the horizontal axis, where the definition of this characteristic radius is the conventional "$1/e^2$ radius" as explained later. The mode designations $TEM_{pl}$ are given in cylindrical coordinates, for radially symmetric intensity profiles (there are similar-looking, but different designations for rectangular coordinates, so the coordinate system must be specified). The units of the intensity axis are relative but normalized so that the same power is contained in each of the modes. The mode order—essentially the number of nodes in the profile, which determines the rate at which the beam spreads—increases by one with each plot, stepping down in FIG. 1, the $TEM_{00}$ mode being the lowest order mode, $TEM_{01}^*$ being the next highest, etc.; these are the six cylindrical modes of lowest order. The modes are shown with the correct relative scales to be a set of higher order modes generated by one laser, in one resonator. A mixed mode profile is made up by summing these profiles (or even higher order profiles) with weight factors proportional to the relative power of that mode in the mixture. For example, adding the first three profiles together would make a mode profile that peaked in the center and was without radial nodes; this would resemble the $TEM_{00}$ mode but would always propagate with a larger diameter. Modes are useful concepts not only because these intensity profiles are generated by real lasers but because these profiles (including mixed mode profiles) remain unchanged as the laser beam propagates or is focused. Since the same profiles apply at the focus of a lens, the figure indicates the relative scale of how tightly each mode from a given laser can be focused.

It is generally possible to constrain any laser to operate only in the fundamental ($TEM_{00}$) mode by reducing the diameter of the limiting aperture in the laser cavity, thereby increasing the optical loss such that no mode except the $TEM_{00}$ mode experiences sufficient net gain to oscillate. The price for this is lower power in the output beam than if several modes were oscillating. Laser manufacturers usually choose to compromise between the two competing goals, high power and $TEM_{00}$ mode, by using designs that allow some power in the higher order modes. The intensity distributions for these mixtures of modes can appear to be Gaussian, but they do not propagate or focus with as small a transverse extent as the pure $TEM_{00}$ mode would.

The fact that a laser beam can have a Gaussian-like intensity distribution, but yet have the higher power possible only with a mixed-modes, has led some laser manufacturers to improperly claim that their products generate pure $TEM_{00}$ beams. In fact their products produce beams that are a mixture of higher order modes, with an intensity profile that only superficially resembles a fundamental mode profile. This has lead to unrealized expectations, often with great economic consequences, for unwary designers of laser systems and naive laser users. An important factor which has allowed these problems to continue has been the absence of a simple, easy-to-use, low-cost instrument for quantifying beam quality in a meaningful way. An even more fundamental problem has been the lack of a theoretical basis for a meaningful way to quantify beam quality. A related issue is that while there exists much information about how to compute the propagation of $TEM_{00}$ beams, there is no practical set of analytical "tools" with which to predict the attributes of a mixed-mode beam as it propagates through an optical system. It is these analytical tools and the resulting instrumentation for quantifying beam quality which are the subjects of this invention.

The absence of an analytical description for the propagation of the mixtures of higher order modes that come out of real lasers makes it very difficult to design optical beam delivery systems which must channel these multimode beams through a plurality of optical elements to a workpiece. In an industrial laser beam delivery system, selecting the proper elements is extremely important. For example, the final delivery lens is typically very close to the workpiece, and often becomes contaminated from material removed from the workpiece. Due to this contamination, the final delivery lens must be replaced very frequently, sometimes many times a day. These lenses can be quite expensive. Moreover, the cost of these lenses goes up significantly with their size. Accordingly it is desirable to design a beam delivery system where the optical elements are as small as possible while still being capable of passing the beam. This requires knowledge of the propagation characteristics of the higher order mode beam. It would be best to have an analytical model that would show how to optimally prepare the beam out of the laser for launch into the delivery system so as to minimize the cost of the whole system.

At present, there are only very crude methods available for designing optical delivery systems for industrial lasers. In one approach, the laser beam is directed across a room, over a distance equivalent to that which will be used in the commercial application. This distance can be many meters. Technicians will then insert pieces of plastic at various locations in the beam path. The burn hole created in each piece of plastic can be used to give information about the diameter of the beam and the intensity distribution pattern at that location. In addition to being crude, this latter approach is dangerous because the technician and other employees must move around a room though which a mulitkilowatt invisible beam is being transmitted. It would clearly be desirable to have an improved way of determining the mode quality or mixture of modes in a laser beam.

As noted above, most laser beams, and particularly those generated by high power commercial lasers, are comprised of a mixture of higher order modes. For the purposes of designing optical elements, it has been found that a detailed knowledge of all the underlying modes is unnecessary. Rather, as will be shown, the propagation of a multimode laser beam through an optical system can be predicted if one can characterize the beam by a numerical "quality". This quality number will turn out to be the same figure as "times-diffraction-limit" figure known in optics literature and it is the factor by which the focus-spot diameter for a high-order beam is larger than that for a $TEM_{00}$ beam having the same diameter at the focussing optic. Equivalently, it is the factor by which the angle of spreading, or divergence angle, for a high order mode is increased over a diffraction-limited, $TEM_{00}$ mode beam of the same waist diameter.

FIG. 2 illustrates a high order mode or multimode laser beam 10 propagating along an axis 12. The beam converges to a smallest diameter 14 (perpendicular to the axis) called the waist of value $2W_o$, and then diverges propagating away from the waist location. In a distance of propagation $Z_R$ on either side of the waist called the Rayleigh range 16, the beam diameter is larger by a factor of $\sqrt{2}$ than the waist diameter. This means the beam cross-sectional area has doubled.

Within this beam is drawn a representation of the beam propagation of the fundamental mode 18 of Gaussian intensity profile which has the same waist location as the multimode beam 10, and a Rayleigh range 20 (propagation distance for the area of this beam to double) given the lower case symbol $z_R$ of the same value as beam 10, or $z_R = Z_R$. The beam 18 with these properties will be termed the "associated fundamental mode" for the multimode beam 10. The laws of diffraction dictate that a beam of waist diameter A will spread at large distances from the waist with a divergence angle inversely proportional to the waist diameter and proportional to the wavelength 1 of the light, or $$(divergence) = (constant)(\lambda/A) \text{ TM} \quad (1)$$

The proportionality constant depends on the intensity distribution across the beam and the way the beam diameter is defined. The smallest possible constant occurs for a fundamental mode with a Gaussian intensity profile $I(r,z)$ given by $$I(r,z) = I_o \exp[-2r^2/(w(z))]^2 \quad (2)$$

where $I_o = 2P/\pi w^2$ and is the intensity at the center of the beam, P is the total power in the beam, r is the radial distance from the center and $w(z)$ is a radial scale parameter which increases with distance z away from the waist.

If the beam diameter is taken as twice the radius for which the intensity has dropped to $1/e^2 = 13.5\%$ of the central intensity, then $2w(z)$ is the beam diameter at distance z, and the constant in the divergence expression for this fundamental mode is $4/\pi$. The laws of diffraction relate the Rayleigh range for a fundamental mode to the waist radius by the expression:

$$Z_R = \pi w_o^2 / \lambda \quad (3)$$

so that for the beam 18 the waist diameter 22 is equal to:
$$2w_o = 2(\lambda Z_R/\pi)^{\frac{1}{2}} \quad (4)$$

and the far field divergence angle 24 is $$A\theta_F = (4/\pi)(\lambda/2w_o) \text{ or } 4\lambda/(\pi 2 w_o). \quad (5)$$

Equation (5) is equivalent to equation (1) with the "constant" expressed as $(4/\pi)$.

The divergence angle $\Theta_F$ (shown at 26 in FIG. 2) for the multimode beam 10 is greater than for the associated fundamental mode beam 18 by a constant factor M equal to:

$$\Theta_F = M\theta_F \quad (6)$$

where the value of M depends on the definition of beam diameter used for the multimode beam. Given these definitions, the laws of light propagation give that the beam diameter $2W(z)$ for beam 10 is everywhere just M times larger than that for the associated fundamental mode, or $$W(z) = Mw(z) \quad (7)$$

and in particular the waists of the two beams are related by $$2W_o = 2Mw_o. \quad (8)$$

To characterize the propagation of the multimode beam, the factor by which its divergence angle, $\theta_F$, exceeds the divergence angle of a $TEM_{00}$ beam having the same waist diameter must be determined. A $TEM_{00}$ mode having a waist diameter of $2W_o$ will diverge more slowly than the smaller associated fundamental mode according to:

$$4\lambda/\pi(2W_o)=4\lambda/\pi M(2w_o)=\theta_F/M \qquad (9)$$

The "quality" of the multimode beam is just the ratio of its divergence, $M\theta_F$ to that for a $TEM_{00}$ of the same waist diameter expressed in (9). This ratio is seen to be $M\theta_F/(\theta_F/M)$ or $M^2$. Thus, $M^2$ is the quantity which characterizes the quality of beam 10 wherein smaller values represent a higher beam quality.

This definition leads to a number of observations. First, a beam that is a pure fundamental mode has an $M^2$ value of 1. Second, as the value of $M^2$ increases, the divergence of the beam increases and quality decreases. Most importantly, analytical tools can be developed for predicting the propagation of a multimode laser beam if the value of $M^2$, $2W_o$ and the waist location are known. (The equation for beam propagation of a higher order mode beam is shown below at (11).)

All modes generated in a given laser resonator, have the same radii of curvature and propagate with the same characteristic distance (Rayleigh range) for the beam area to double, regardless of the mode order, as is well known in the literature (see e.g., H. Koglenik and T. Li, Applied Optics, Vol. 5, Oct. 1966, pages 1550-1567). The associated fundamental mode was defined by matching its Rayleigh range to that of the multimode beam. This means the associated fundamental mode found above is the same $TEM_{00}$ mode that would be generated and appear in the ensemble of modes comprising a multimode beam for that resonator. Each pure higher-order mode making up the multimode beam is everywhere along the z-axis, larger than this underlying $TEM_{00}$ mode by a constant factor; and so the diameter of the entire sum-of-modes is everywhere larger by the constant factor M. This makes Equation (7) true for multimode laser beams, and by so identifying the associated fundamental mode, a propagation law (equation 11) for the multimode beam is obtained by appropriate insertion of the M-factor in the well-known propagation law for the fundamental mode.

To identify the associated fundamental mode, the Rayleigh range of the multimode beam must be measured, requiring measurement of the location of the beam waist, and a minimum of two beam diameters at known distances from the waist. When this data is fitted to the modified propagation law to give the values of $2W_o$, $M^2$, and the location $Z_o$ of the beam waist, the desired analytical model of multimode beam propagation is achieved. Equation 11 becomes the mathematical tool that provides the ability to model and predict beam diameter and wavefront curvature at any location in an optical system for multimode beams. Ray matrix methods, for example, become as useful for high mode-order beams as Koglenik and Li showed them to be in the reference cited above for fundamental mode beams.

While it is possible to predict the propagation of a laser beam if the value of $M^2$, waist diameter and location can be determined, there is no device presently existing which can adequately measure these parameters. At best, researchers have been limited to measuring the profiles of beams at a plurality of locations to obtain an empirical feel for mode quality. Information about beam profiles can be obtained by burning plastic blocks as discussed above. Much more sophisticated beam profilers are available which can give information about the energy distribution of a beam at a location in space. However, information about beam diameter or energy distribution at a one location does not provide enough data to derive a value for $M^2$ or the other parameters. Therefore it would be desirable to have an apparatus which can directly measure the model parameters for a multimode laser beam.

An apparatus for measuring the mode quality of a beam will have many uses beyond designing beam delivery systems. For example, many scientific experiments require that the beam quality be at or near the unity value of the fundamental mode. Such an apparatus can be used to measure beam quality as the laser resonator mirrors are peaked in angular alignment so that the $TEM_{00}$ mode output can be maximized.

Other uses of the subject invention will include the pinpointing of misadjusted or imperfect elements in an optical train. More specifically, since the quality of a beam will be degraded when passed through an imperfect optical element, by comparing the beam quality both before and after passing through a particular optic, information can be derived about the optic itself. The subject apparatus can also be helpful in reproducing experimental results that depend on the mode mixture of the input multimode beam.

Accordingly, it is an object of the subject invention to provide a method and apparatus for determining the quality of a laser beam.

It is another object of the subject invention to provide an apparatus which can determine beam quality at a single location near the output of the laser.

It is still another object of the subject invention to provide a method for optimum design of laser beam delivery systems based on knowledge of the mode quality of a laser beam.

It is still a further object of the subject invention to provide an apparatus which can generate information about the alignment of a laser beam.

It is still another object of the subject invention to provide an apparatus which generates information about the pointing stability of a laser.

It is still a further object of the subject invention to provide an apparatus for generating improved beam profiles.

It is still another object of the subject invention to provide an apparatus which can generate information about the underlying modes forming a multimode laser beam.

SUMMARY OF THE INVENTION

In accordance with these and many other objects, a method and apparatus is disclosed which is suitable for measuring the mode quality of a laser beam. This result requires a fit of the multimode beam parameters to the analytical model based on measuring the multimode beam's Rayleigh range. The form of the multimode beam propagation equation dictates that a higher accuracy fit to measured data results if one of the beam diameters measured is at or near the multimode beam waist. Unfortunately, the actual beam waist may be located many meters away from the output coupler of the generating laser and therefore may be relatively inaccessible for measurements. Also, the beam waist may be located within the laser resonator and, if so, it could not be accessed directly at all.

To overcome this problem, the subject apparatus includes a lens for creating a transformed or imaged beam waist. The apparatus is arranged to determine the location of this transformed waist, and measure the diameter of the beam at two locations a known distance from this waist location, thus giving the Rayleigh range. A processor is provided to calculate a value for beam quality based upon the location of the transformed beam waist and the two measured beam diameters. Once the mode quality of the beam is known, the original beam waist location and its diameter can be calculated using the model equations and the known focal length of the lens.

In one embodiment of the subject invention, the transformed waist is located by adjusting the position of the lens with respect to a means for measuring the beam diameter. The distance between the lens and the measuring means when the beam diameter is at its smallest is used to define the transformed waist location.

In another embodiment, the transformed waist location is determined by measuring the diameter of the beam at locations on either side of the transformed waist. When the beam diameters are equal at the two locations, the beam waist will be equidistant between the two locations. A third approach for locating the transformed beam waist is disclosed below with respect to the third alternate embodiment.

In any case, once the location of the transformed waist is determined, it is desirable to measure the beam diameter at that waist location. The diameter of the beam is also measured at another known location which is preferably spaced from the transformed waist a distance greater than the Rayleigh range of the transformed beam.

In the prior art, there have been developed a number of devices for measuring beam diameter. Most of these devices will generally produce similar values for a beam diameter when measuring a beam that is principally in the fundamental mode. However, when dealing with higher order mode beams, there has not been developed a generally accepted definition of beam diameter. Accordingly, the instruments available for measuring beam diameter will generate different results depending upon the definition being used. It should be understood that the subject invention could be implemented with any definition of higher order beam diameter. The calculated value for beam quality would of course be dependent on the definition chosen for beam diameter.

In the preferred method for carrying out the subject invention, a definition of beam diameter is suggested that has advantages both from a measurement standpoint as well as from a theoretical standpoint. These advantages will be discussed in greater detail below with respect to the preferred embodiment.

In the preferred apparatus of the subject invention, beam diameter is determined utilizing a rotatable hub located in the path of the laser beam. The hub is provided with a plurality of apertures for selectively passing and chopping the beam. A detector is provided on the other side of the hub for measuring the variations in the intensity of the beam as it passes though the hub.

In the preferred embodiment, at least one of the apertures includes a knife edge disposed at a 45 degree angle with respect to the plane of rotation of the hub. As the beam is passed by the knife edge, the intensity measured at the detector will rise from zero to the maximum (complete transmission). Assuming the speed of rotation of the hub is known, the diameter of the beam can be measured by the rise time of the intensity signal generated by the detector. A very suitable beam diameter can be calculated if the times between transmitted fractions of the total beam power are used when most of the change in the transmitted power occurs, such as the time between the 1/5 and 4/5ths total power points. In this manner, any of the light energy that is weakly distributed in higher order modes will not falsely exaggerate the diameter of the beam.

In the preferred embodiment, two knife edges are provided, both at 45 degrees with respect to the plane of rotation of the hub and orthogonal to each other. Two knife edges are provided to permit measurement of beam diameter and mode quality along two orthogonal axes. This measurement is desirable because these parameters vary with respect to the azimuth angle around the beam propagation axis. A minimum and maximum of beam diameter and mode quality will be found for intensity profiles as a function of azimuth angle and these extremes will generally be for azimuths orthogonally oriented. In this embodiment, a means is provided for changing the plane of rotation of the hub with respect to the azimuth around the propagation direction of the beam so the knife edges can be aligned with the maxima and minima for various mode patterns. Separate values for beam parameters, including $M^2$, can be calculated for each axis.

In operation, the beam is focused by the lens to create a transformed waist at either the front or rear hub planes. In one approach, the position of the lens is varied while the diameter of the beam is measured at one of the hub planes. When a minimum is detected, the beam waist will have been located at this plane. In another approach, the position the lens is varied until the beam diameter at both the front and rear planes of the hub are the same. This serves to accurately locate the transformed waist at the center of the hub. The position of the lens can then be moved by half a hub diameter to position the transformed waist accurately at a hub plane where it can be measured.

In the preferred embodiment, the transformed beam waist is located by taking incremental, measurements of beam diameter, at both the front and rear planes of the hub, as the lens is moved a distance at least as great as the diameter of the hub. The diameter measurements from the front and rear planes can be spliced together by the processor to provide an axial profile of the beam over a distance twice as large as the diameter of the hub. This data can then be analyzed using a digital filtering algorithm to find the minimum which corresponds to the location of the transformed beam waist. The lens is then moved to the position which will locate the transformed beam waist at one of the hub planes where it can be accurately measured.

Once the transformed beam waist has been positioned at one of the hub planes (by any of the approaches discussed above) the beam diameter will also be measured at the other hub plane which is a fixed known distance (i.e. the diameter of the hub) away from the waist. From this information, the processor can fit the measurements to the analytical model and calculate a value for $M^2$. As noted above, the processor can also calculate the location of the original input beam waist and diameter from the known focal length of the lens and the known distance between the lens and the imaging planes of the hub. All of this data can then be used to predict the propagation of the beam.

The subject device can also provide information in addition to the model beam parameters. For example, the use of a knife edge allows the transverse position of the beam relative to the apparatus to be located. More specifically, when the knife edge is at the center of the beam, the detector will measure a transmission level of 50 percent. Since this measurement can be made at two spaced apart locations, namely, the front and the rear plane of the hub, information about beam pointing and alignment can be derived.

Information about the profile of the beam can also be generated. One approach can include differentiating the signal from the detector as the knife edge cuts the beam. This information will correspond to the type generated in prior art profilers using slit apertures.

Another approach to obtain beam profile information would be to include a pinhole in the hub. When a pinhole is passed by the beam, the varying intensity measured at the detector will give a picture of the beam profile. This approach has been used with only limited success in the prior art because it is necessary to accurately align the center of the beam with the track or scan line of the moving pinhole. This difficulty is overcome in the subject invention because the knife edge apertures in the hub can be used to accurately align the pinhole scan line through the center of the beam.

After a pinhole profile has been taken and stored in the memory of the apparatus, this information can be analyzed by the processor for additional results. In particular, the mean location of the intensity distribution can be computed, as well as the second moment of the distribution about the mean location. The latter quantity is of interest as a mathematically attractive method of defining the diameter of a higher order mode (as the root-mean-square diameter) and the mode quality of a higher order mode (as the normalized second moment).

One advantage of obtaining a beam profile using the subject invention is that a profile taken close to the output coupler can be made relatively free of distortions caused by diffraction from the limiting aperture in the laser resonator. This result is achieved because the focusing lens will tend to focus the overlaid diffraction pattern at a distance from the transformed waist generally greater than a Rayleigh range for the imaged beam. Thus, if the profile is taken at the transformed waist, an effective far-field profile is generated even if the apparatus is in a location close enough to the laser to be considered in the near field of the original beam.

In the one illustrated embodiment, a slide member having a stationary pinhole aperture of known diameter is provided which can be selectively introduced over the center of the hub. Using the beam locating features of the two 45 degree knife edges, the beam propagation axis can be positioned over the center of the hub, to intersect the pinhole. The lens can be positioned to place the imaged beam waist at the pinhole as well. Thus when the hub is turned to give nominally 100% transmission of the beam (as it is with the beam between the two 45 degree knife edges), introduction of the stationary pinhole will give the transmission of the beam through the known pinhole diameter under standardized conditions. This is of interest as a direct measure of the ability of a multimode beam to be focused to a small spot.

In the preferred embodiment, the focusing lens is defined by a telephoto doublet consisting of a positive and negative lens. The negative lens is designed to compensate for the spherical aberration generated by the positive lens. In addition, a means is provided to vary the spacing between the lens pair to minimize the net aberration at the operating wavelength of the laser.

The subject invention can further be modified to generate a pixel map of the intensity distribution of the laser beam. The modification requires the addition of a blocking member having a knife edge disposed perpendicularly to one of the knife edges carried on the hub. A means is provided for translating the blocking member in discrete steps for each revolution of the hub. The measurement of the power transmitted past the knife edge and blocking member can be used to generate a pixel map of beam intensity.

BRIEF DESCRIPTION OF THE DRAWINGS

FIG. 1A through 1F are drawing illustrating the normalized intensity distributions for the first six lowest order modes of a cylindrical laser resonator.

FIGS. 8A through 8E are a series of time-sequenced drawings illustrating the chopping of a beam with a knife edge.

FIG. 9 is a graph illustrating the transmission curve that would be generated based on the chopping of a beam by a knife edge as shown in FIG. 8.

FIG. 10 is a graph, similar to FIG. 9, showing the transmission curve that would be generated based on scanning the other knife edge past the beam in a manner to successively expose the beam.

FIGS. 13a and 13d are drawings illustrating how beam position information can be derived using a knife edge aperture.

FIG. 20 is a simplified perspective view of the first alternate embodiment of the subject invention.

FIG. 21 is a simplified perspective view of the second alternate embodiment of the subject invention.

FIG. 28 is a simplified perspective view of the fourth alternate embodiment of the subject invention.

FIG. 29 is an enlarged perspective view of the translatable blocking member utilized in the fourth alternate embodiment of the subject invention.

FIG. 30a is a schematic representation of the interaction between a laser beam, scanning knife edge and translating blocking member used to derive a two dimensional intensity profile of the beam.

FIG. 30b through 30f are graphs plotting the transmission of the beam past the elements shown in 0 FIG. 30a and illustrating the calculation of the transmission through a slit and the derivation of the intensity of an individual pixel.

DETAILED DESCRIPTION OF THE PREFERRED EMBODIMENTS

Figure 2:
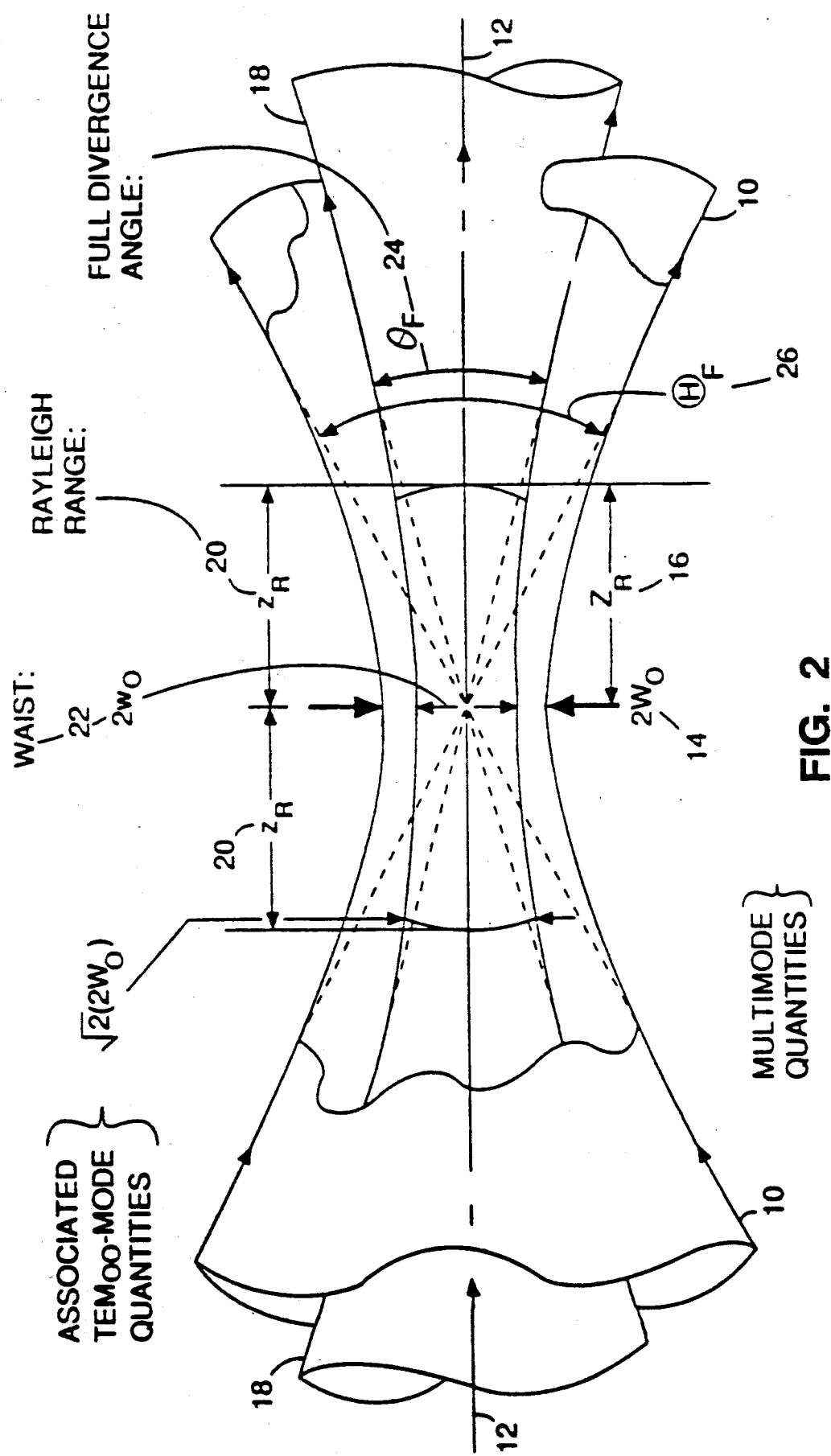
FIG. 2 is a drawing of a laser beam illustrating the relationship between a multimode beam and the underlying fundamental mode quantities. The particular fundamental mode illustrated is defined in the text and is termed the associated fundamental mode.

Prior to discussing the details of the subject invention, some background on the propagation of beams as a function of beam quality, and measurement of beam diameters will first be given.

HIGHER ORDER MODE PROPAGATION

The multimode beam propagation law resulting from considerations of the associated fundamental mode can be obtained by substitution of the multimode beam quantities, through Equations (7) and (8), into the fundamental mode law from the literature; and the relation of matched Rayleigh ranges:

$$Z_R = Z_R = \pi W_o^2/\lambda = \pi W_o^2/M^2\lambda \qquad (10)$$

The result is an expression containing quantities that are all measurable as properties of the multimode beam. In general the location of the waist along the propagation axis is not known precisely until these measurements are done. For convenience the zero point along this, the z-axis, is initially chosen arbitrarily and the waist location assigned the value $Z_o$, making the propagation distance in the propagation law $z-z_o$. Thus for a multimode beam of quality $M^2$:

$$W(z) = W_o \sqrt{1 + (M^2\lambda/\pi W_o^2)^2 (z - z_o)^2} \qquad (11)$$

where $W_o$ is the beam radius at the waist, located at $Z_o$, and $W(Z)$ is the radius of the beam at location Z.

While many laser beams are circularly symmetric about their propagation axis like the beams discussed so far, in general a beam can have independent propagation constants in two planes each containing the z-axis and perpendicular to each other, as is well known in the literature. That is, the propagation equations must in general allow for the possibility of astigmatic beams, with elliptical cross-sections. This means there are two equations of the form (11) to be fitted from diameter measurements in the two principal planes (the two planes containing the maximum and minimum diameters of the elliptical cross section). The apparatus described below allows beam diameters to be measured along any azimuth direction (diameter) of the beam cross section, to facilitate finding the principal planes, and facilitate the taking of the required measurements. Measurements in a single propagation plane are discussed first, applicable directly to a symmetric beam or one principal plane of an asymmetric one, followed later by a discussion of methods for handling astigmatic beams.

Assuming that the wavelength $\lambda$ is known, equation (11) has three unknowns, namely, the diameter of the waist of the higher order mode ($2W_o$), the location of the beam waist ($Z_o$) and the value of $M^2$. Thus, three independent measurements of a multimode beam must be taken to determine the three unknown constants in equation (11). These three measurements can be the beam diameters at three separate propagation distances from the waist.

For greatest accuracy, it is preferable that the three measurements include a positive location of the waist position ($Z_o$) and a measurement of the beam waist diameter ($2W_o$). Positive location of the beam waist position ($Z_o$) is best done by making beam diameter measurements on both sides of the waist position. Because the beam diameter does not vary significantly at various positions near the waist, attempts to locate the waist by extrapolating diameter data taken on only one side of the waist will be relatively inaccurate. The resulting error in the determination of $M^2$, for example, will be twice as large on a percentage basis, as the fractional error in $(z-z_o)$. This occurs because the term $(z-z_o)$ is squared in equation 11. The subject apparatus is designed to rapidly and easily make accurate measurements for determining mode quality, including locating the beam waist with diameter measurements on both sides of the waist.

MEASUREMENT OF BEAM DIAMETERS

As pointed out above, in order to obtain a value for $M^2$ using equation (11) it is necessary to take measurements of beam diameter. Any measurement must be based upon a suitable definition of beam diameter. A suitable and widely accepted definition for beam diameter is available for a $TEM_{00}$ fundamental mode beam. However, there is no widely accepted definition for beams of higher order modes. The difficulty can best be understood by referring to FIGS. 3 through 6 below.

Figure 3A:
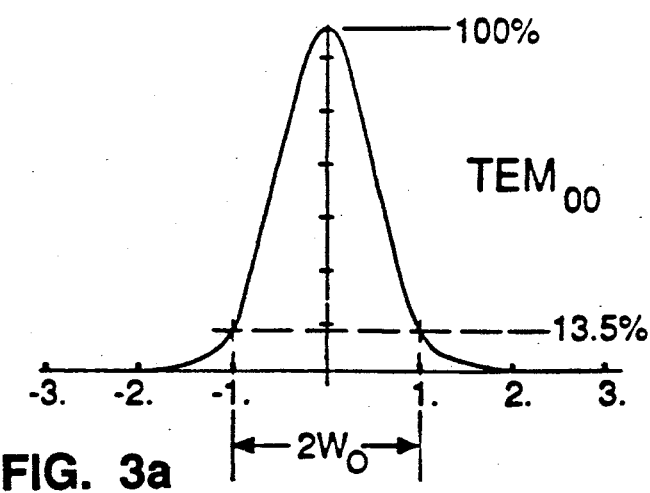
FIGS. 3a, 3b, 4a 4b, 5a, 5b and 6a through 6d illustrate four mode profiles and their cross-sections, and are used in a discussion of alternative ways to define the diameter of a higher order mode.
Figure 3B:
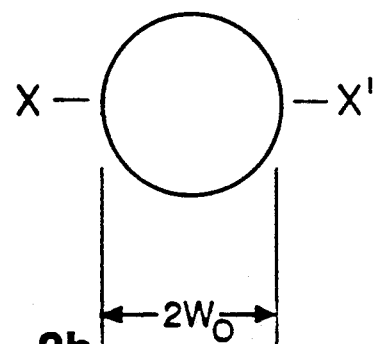

FIG. 3 is an illustration of a fundamental mode beam, shown in profile in FIG. 3a and in cross-section in FIG. 3b. The cross-sections for all of FIGS. 3 to 6 cut across the profiles at heights which are at 13.5% of the height of the central peak. The intensity profile of FIG. 3a is across a horizontal center line x-x' transverse to the propagation axis and passing through the center of the beam as shown in FIG. 3b. As can be seen, FIG. 3a represents the lowest order mode Gaussian intensity distribution. As previously explained, the beam diameter is therefore defined as the width between the points where the intensity of the beam drops to the $1/e^2$ or 13.5% of the peak intensity. These cutpoints are shown as crosses in FIG. 3a, and the beam diameter labeled there as $2W_o$. The value of $M^2$ is 1 for this pure $TEM_{00}$ mode beam, which could represent the beam 18 of FIG. 2.

There are many commercially available devices which can take a measurement of beam diameter using this definition. One type of prior art device manufactured by both Datascan and Dataray (the latter under the trademark Beamscope), uses a motor to move an arm carrying a slit overlaid on a detector through a beam. The light passing through the slit is measured by the detector. The slit is oriented perpendicularly to the direction of motion. When the slit is moved across the beam shown in FIG. 3b, the detector will generate an intensity signal versus translation distance comparable to the trace shown in FIG. 3a. In operation, this signal is stored in memory and from this information a processor can determine the maximum signal and calculate the locations where the 13.5% clip levels occurred. The processor can then calculate the beam diameter based on the distance the arm moves between these two locations.

Another commercially available device is marketed by Photon Inc. under the trademark BeamScan. In this device, a rotating hub is placed in the path of the laser beam. The rim of the hub includes at least one aperture, such as a slit or pinhole, which is moved past the beam as the hub rotates. A photodetector protrudes into the space encircled by the rim of the hub, and is aligned with the beam. The output of the photodetector will generate a trace similar to FIG. 3a. The maximum (100%) signal level is found on an initial revolution of the hub, and the distance the aperture moves between the 13.5% clip levels during the subsequent rotation is measured and displayed as the beam diameter.

A third device, marketed by ALL under the trademark Laser Beam Analyzer, uses a spinning wire to slice through the beam. Reflections off the wire as it passes through the beam are measured by photodetectors. Once again, the outputs of the photodetectors will generate traces similar to FIG. 3a. The diameter of the beam can be derived using clip levels and the known motion of the wire as described above.

Figure 4A:
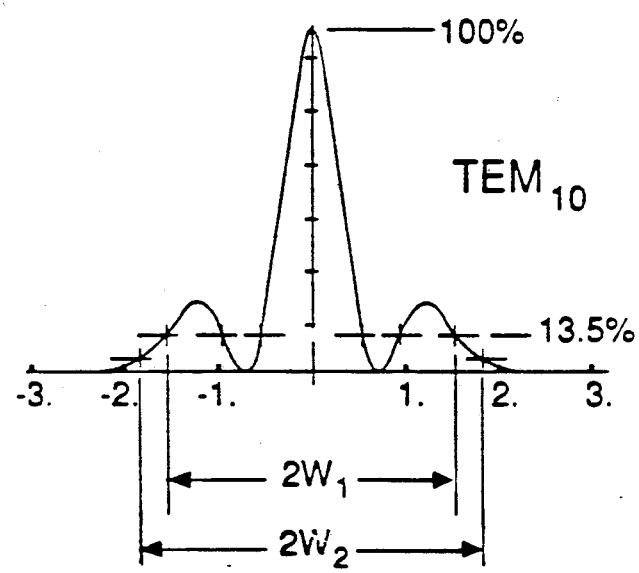

Measuring beam diameters becomes more complex as the laser beam modes become more complex. FIG. 4 illustrates a laser beam having one radial node and no azimuthal nodes. This mode is referred to in the literature as the $TEM_{10}$ mode in cylindrical coordinates. This mode pattern includes a high intensity central zone and a second concentric zone of lesser intensity located radially outside the center zone. A scan with a pinhole aperture will give an intensity profile through the center of such a beam is shown in FIG. 4a. The width of this beam can be taken from this profile using the same definition as for the $TEM_{00}$ beam discussed above.

Figure 4B:
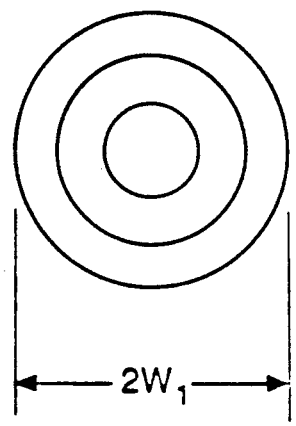

The cross-sectional cut at the $1/e^2$ height produces three radii for this mode as shown in FIG. 4b, but it seems reasonable to take the outermost one (labeled $2W_1$ in FIG. 4) in extending the fundamental mode diameter definition to this mode. The value of $M^2$ for this beam would be 2.26 with this definition. (Note that the modes of FIGS. 3, 4, 5 are taken from FIG. 1 and retain the horizontal axis labeled in units of radii of the associated fundamental mode. Thus the square of horizontal coordinate gives the $M^2$ value for each diameter determination.)

Figure 5A:
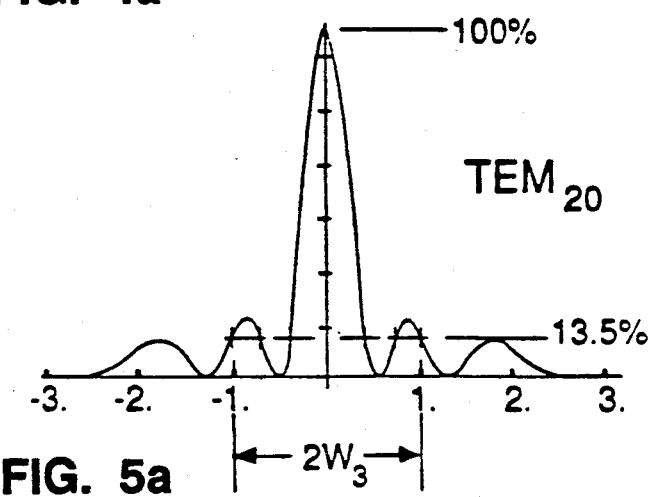
Figure 5B:
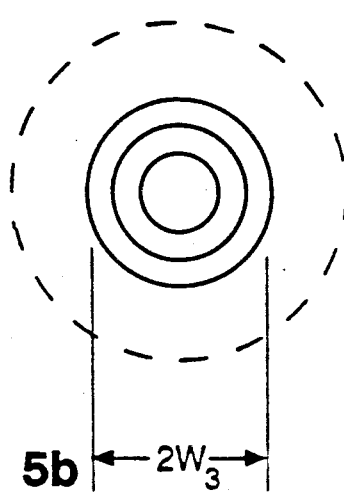
Figure 6A:
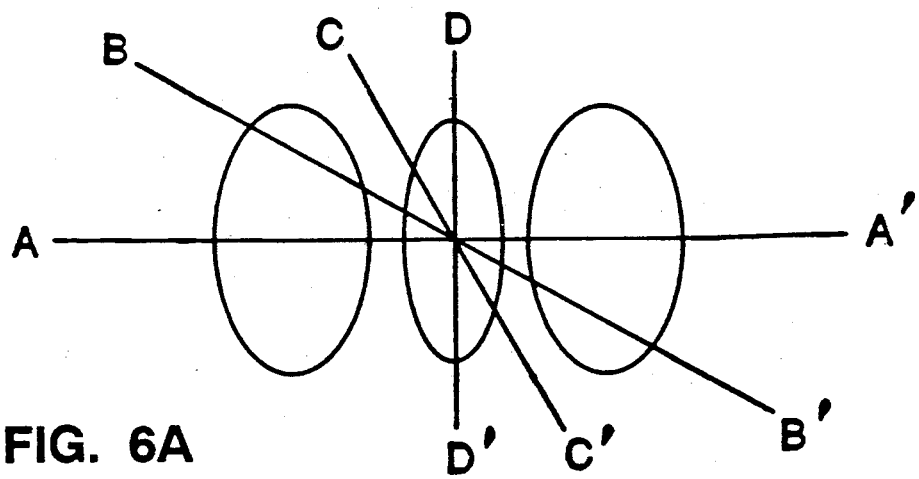
Figure 6B:
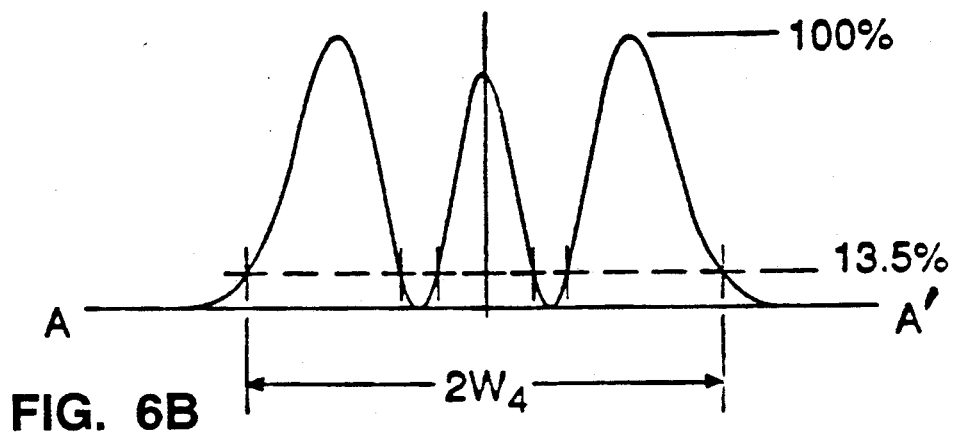
Figure 6C:
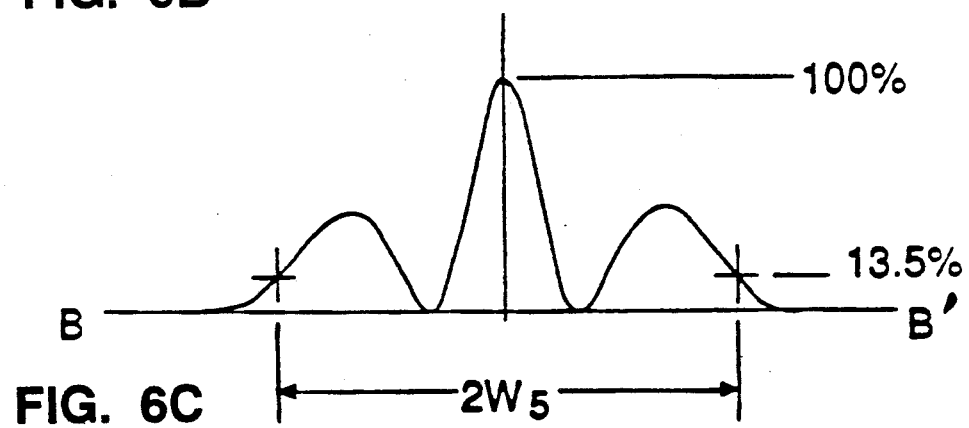
Figure 6D:
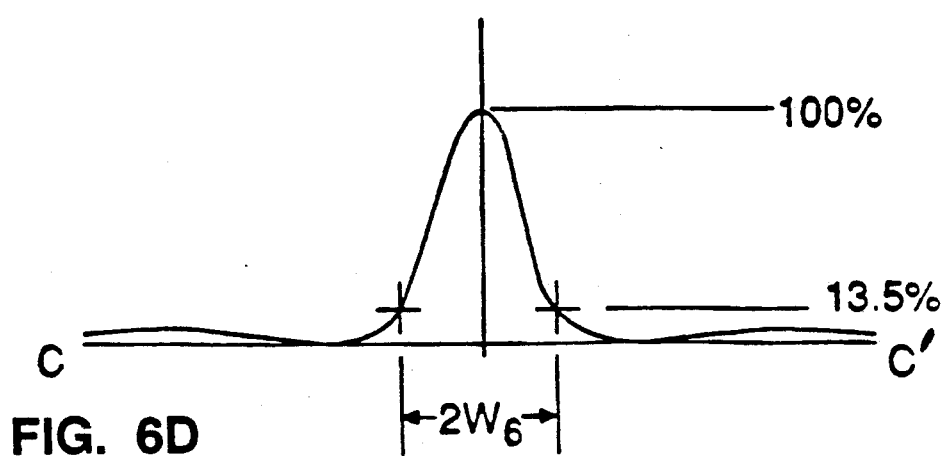

Difficulties with this definition become apparent, however, when an extension to the $TEM_{20}$ mode of FIG. 5 is attempted. This mode has no azimuthal nodes, and two radial nodes. When cut at the 13.5% height, the outermost peak of the profile (occurring at the radius indicated by the dashed line in FIG. 5b) is just missed (the height of this peak is at about 12%). Thus the diameter $2W_3$ of the outermost radius of the cross section is less than the diameter $2W_1$ just found for the lower order $TEM_{10}$ mode. In fact $2W_3$ is very nearly the same as the diameter of the fundamental mode (FIG. 3) while this mode has clearly much higher divergence and is of much lower quality.

Furthermore, an adequate definition must deal with mixed modes, not just the pure higher order modes considered so far. The percentages of the modes in a mixture can vary continuously, and as a smaller diameter, lower order mode is mixed in with a higher order mode, a continuously decreasing diameter should result. But consider what would happen if a small percentage of the $TEM_{11}^*$ mode from FIG. 1D were mixed with the $TEM_{20}$ mode. Since the nodal radii of the two modes do not coincide, the first effect would be that the amplitudes of the depressions in the dominant $TEM_{20}$ mode profile would begin to fill in, and no longer reach zero. The peak height of the mixture would remain the same, since the $TEM_{11}^*$ mode being added in has a node at the center, where the dominant mode has a peak. This means that the 13.5% clip level would remain at the level drawn in FIG. 5a. But the height of the outermost peak, contributed to the mixture by the $TEM_{20}$ mode, would rise and exceed the 13.5% clip level at about an admixture fraction of 20% in the $TEM_{11}^*$ mode. Based on the present definition, the beam diameter for the mixture would thus increase discontinuously near this percentage from about $2W_3$ to about the diameter of the dashed circle of FIG. 5b, changing not only discontinuously but in the opposite direction to what is reasonable for the mixing in of a lower order mode.

Similarly, the inverse effect of a discontinuous jump to smaller values would occur when mixing into the $TEM_{10}$ mode a roughly equal proportion of the $TEM_{20}$ mode (adding the profile of FIG. 5a to FIG. 4a). This would double the height of the central peak while leaving the region at the $2W_1$ diameter of FIG. 4a little changed, since the $TEM_{20}$ mode has a node near this diameter. The result would be that the new 13.5% clip level would be above and miss the $TEM_{10}$ outermost peak, and the beam diameter would jump from $2W_1$ to a smaller value based on clipping the combined central peaks.

To avoid these difficulties, a higher order mode diameter definition was introduced in the literature based on the radius at which the intensity dropped to $1/e^2$ of the intensity of the outermost peak (Freiberg and Halsted, *Applied Optics*. Vol. 8 (Feb. 1969), pp. 355–362). This new definition can be said to reduce to the standard definition for the fundamental mode, where there is only one peak. This new definition would give the result $2W_2$, for example, for the diameter of the mode of FIG. 4a, or an $M^2$ with this definition of 3.65 instead of the value of 2.26 for the $TEM_{10}$ mode given by the first definition. Thus, it can be seen that the actual value of $M^2$ depends on the selection of the definition of the higher order mode beam diameter. The beam profile does not change; the definition merely picks the feature to which the beam width will be measured (see the discussion in W. Bridges, *Applied Optics*, Vol. 14, Oct.

'75, pages 2346-47). If a wider feature is chosen (as in the second definition) equation (11) correctly gives a wider diameter. The difficulties with this second definition become apparent by examining FIG. 6.

An adequate definition must deal with asymmetric modes such as the $TEM_{20}$ mode in rectangular coordinates of FIG. 6 as well as the circularly symmetric modes dealt with in FIGS. 3-5. FIG. 6 shows a cross-section and three pinhole profiles along the indicated paths at different azimuthal angles for this rectangular coordinate mode, which has two nodes in the horizontal plane and none vertically. Using either the first or the second definition above there is a discontinuity in beam diameter as the azimuth angle of the scan is continuously varied. The scan along A—A' in the major principal plane produces the profile labeled A—A' and a diameter $2W_4$. As the scan line azimuth angle swings around towards the minor principal plane (scan B—B' has swung about ⅓ of the way or thirty degrees) the outermost peak heights decrease as the pinhole now traverses the flank of the outer lobes of the mode. The scan B—B' produces the diameter $2W_5$ by the first definition, and a slightly larger diameter results with the second definition. When the azimuth angle has reached the scan C—C' at sixty degrees, the profile peaks from the outer lobes of the mode have almost disappeared. The result is that the diameter given by the first definition has suffered a discontinuous jump down to $2W_6$, while the diameter by the second definition has been pushed out to beyond the width of the profile displayed in the figure. Finally, when the scan reaches the minor principal plane D—D', there are no profile peaks from the outer lobes of the mode (the profile looks like C—C' with the low outer peaks removed) and the diameter by the second definition jumps discontinuously to a value of about the $2W_6$ diameter of the figure. As can be seen, there are significant difficulties with the present definitions of beam diameter. Measurements taken at scan angles near these discontinuities would be highly unstable and subject to large and rapid fluctuations. This situation is unacceptable in most measurement devices. As will be seen below, the subject invention overcomes these problems.

PREFERRED METHODS OF MEASURING BEAM DIAMETER

Discontinuities in the measured beam diameter can be avoided if the measurement (and definition) of the higher order mode diameter is based on an integration over the whole cross sectional area of the beam, and account is taken of the total power in the beam. In the preferred embodiment this is done in a number of ways. In one method, the intensity distribution would be recorded from a pinhole scan of the beam (or equivalent means). A processor would then use this information to compute the second moment of the intensity distribution. This approach is discussed in greater detail below in the section on additional computational capabilities of the instrument.

In another method, the power transmitted past a knife edged aperture scanned through the beam is measured. FIGS. 7 and 8 illustrate the second method. The elements shown in FIGS. 7 and 8 constitute the main components of the preferred embodiment of the subject invention. As seen therein, beam 10 is aligned with a detector 30. Detector 30 is arranged to measure the power of the beam transmitted past the knife edge. To perform this function, the detector must be sufficiently large so that all of the beam falls on its active surface. The choice of detector will depend on the wavelength of the laser beam. In FIG. 7, a lens 32 is used to create a transformed or imaged waist as discussed in further detail below.

Before the beam reaches the detector 30 it will pass by a rotating hub 34. As used here, a hub is a support means for carrying an aperture through the beam at a fixed distance from a rotation axis. Conveniently for mechanical balance this means may have a shape like the hub supporting an automobile tire, hence the use of the term. Hub 34 includes two apertures 36 and 38. Aperture 38 acts as a window for passing light and therefore can have any suitable configuration. Aperture 36 includes two edges 40 and 42 each inclined at 45° with respect to the plane of rotation of hub 34. Edges 40 and 42 are also orthogonal to each other. The signal generated by the detector 30 as the beam 10 is cut by either knife edge can be used to provide a measure of beam diameter.

Figures 7A, 7B:
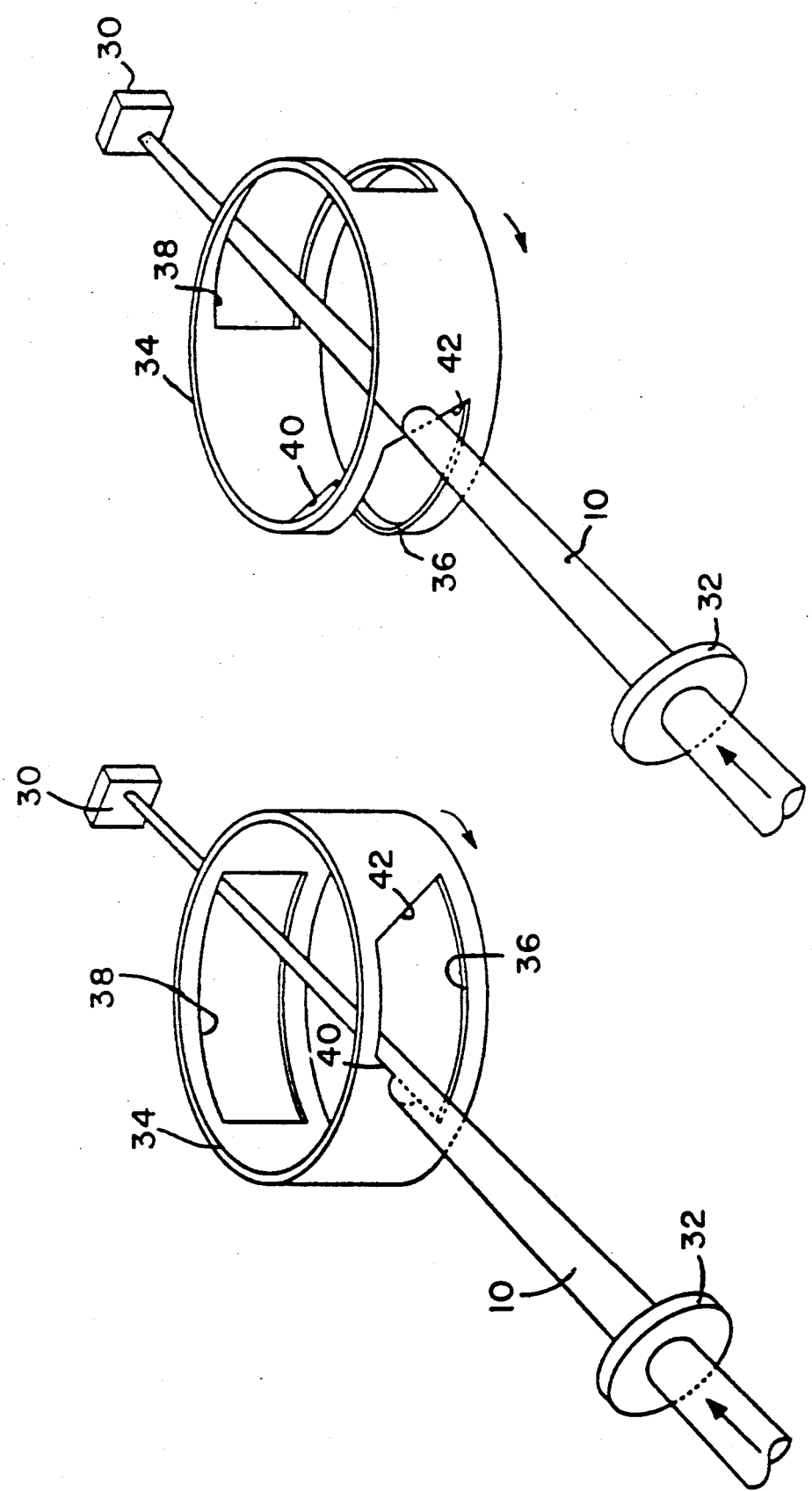
FIGS. 7a through 7d are simplified perspective views of an apparatus formed in accordance with the subject invention showing a focused beam being chopped by an angled knife edge aperture in the front and rear aperture positions.
Figures 7C, 7D:
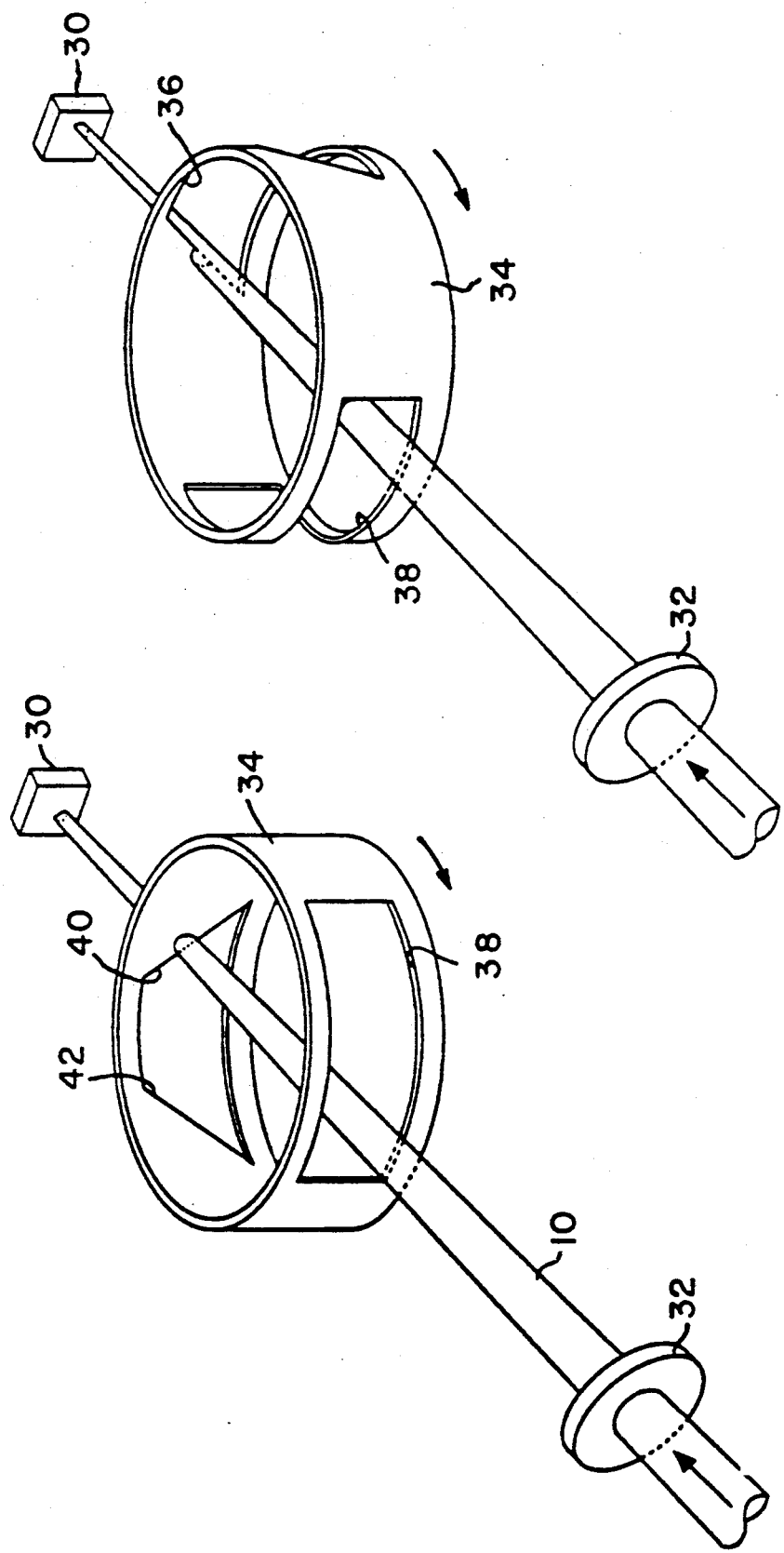

FIG. 8 illustrates a sequence viewed from the detector 30 where edge 42 cuts beam 10 as in FIG. 7B. FIG. 9 illustrates the output of the detector at a time corresponding to the position of the hub with respect to the beam in FIG. 8. At a time $t_A$, as shown in FIG. 8A, the edge 42 is just approaching the beam. The beam is entirely transmitted through the hub so that full power is reaching the detector and the signal output is 100%.

At time $t_B$, shown in FIG. 8B, the edge 40 has cut part of the beam and reduced the light energy reaching the detector. The transmitted power reaching the detector will continue to decrease monotonically as the hub continues its rotation in the direction indicated by the arrow. At time $t_C$, shown in FIG. 8C, half of the beam has been blocked. At time $t_D$, shown in FIG. 8D, most of the beam is blocked and at time $t_E$, shown in FIG. 8E, none of the beam power is reaching the detector.

As shown in FIG. 8, times can be conveniently measured as the elapsed time following the passing of a fiducial mark, here shown as a notch 44 located on the rim of the hub, past a means to read the mark, here shown as an optical interrupter 46. The rim of the hub is moved at a constant, known velocity V, so that multiplication of these times by V converts them to the distance the aperture has moved.

The power transmitted past a knife edge can be used to measure the diameter of the beam. This concept has been used in the literature for measuring beam diameters of pure $TEM_{00}$ modes and small admixtures of the next few higher order modes with the fundamental mode (distorted $TEM_{00}$ modes) It has been found that this concept can be extended with good results for measuring beam diameters of multimode beams.

It is reasonable to require that the definition adopted for higher order mode diameters, produce the conventional $1/e^2$ diameter for the $TEM_{00}$ mode when applied to the fundamental mode. The transmission of a $TEM_{00}$ mode past a knife edge positioned a distance y/w beam radii from the center of the beam is well known in the literature (see e.g., Cohen et al., Applied Optics, Vol. 23, 15 February 1984, pp. 637-640) and is given by:

$$T(y/w) = (\tfrac{1}{2})[1 \pm \mathrm{erf}(\sqrt{2}y/w)], + \text{if } y > 0, - \text{if } y < 0 \quad (12)$$

The function erf(x) is the error function of probability theory, tabulated in mathematical handbooks. Equation (12) gives for the cutting of a fundamental mode beam as in FIG. 8 a falling, S-shaped curve as in FIG. 9, with the property that the distance moved between the 15.8% and 84.2% transmission points is precisely one beam radius w. The transmission of a higher order mode past a knife edge produces an S-shaped curve as well that is very similar to the one for the fundamental mode. A suitable definition for the diameter of a higher order mode is twice the distance between these same cut levels on this similar S-shaped curve. Thus, it can be seen that the width of the beam can be measured by looking at the time elapsed between the detection of clip levels set at 15.8% and 84.2% (hereinafter referred to as 16% and 84% for brevity). Twice the elapsed time $(2(t_D - t_B)$ in FIG. 9) is multiplied by the velocity of the rim of the hub 34 to derive the diameter of the beam.

The calculation above is accurate for a knife edge that is oriented with its edge perpendicular to the plane of rotation of the hub. Such an orientation is perfectly acceptable if one is only interested in measuring the beam diameter in one plane. However, if information about beam diameters along two perpendicular axes is desired, two knife edges oriented at 45° to the plane of rotation should be used.

The effect of using a knife edge is to create a scan across the beam along a line perpendicular to that edge. This is also true when the knife edge is at an angle with respect to the plane of rotation of the support. This can be visualized by viewing FIGS. 8B through 8D where it will be seen that the beam is progressively covered from the upper left corner to the lower right corner. Because the scan is taken at an angle with respect to hub rotation, the effective speed of the scan (i.e.. the speed of the perpendicular motion), is less than the velocity of the rim of the hub which supports the knife edge. Therefore a correction factor must be utilized to calculate the beam diameter. This correction factor is given by sin 45° or $1/\sqrt{2}(=0.707)$ for a 45° knife edge. Thus, the beam diameter will be given by the time elapsed between the 16% and 84% clip levels times the rim velocity reduced by a factor of 0.707.

The output of the detector 30 generated when beam 10 is progressively uncovered by edge 40 is shown in FIG. 10. Given the direction of motion of the hub as depicted in FIG. 8, this will not occur until the hub has moved through enough of one revolution such that edge 40 is brought back around to the beam. Just prior to edge 40 crossing the beam, no power is transmitted to the detector. As the hub continues to rotate, the beam will be exposed and the power transmitted to the detector 30 is increased in a manner exactly inverse to the blocking of the beam previously described with respect to edge 42. This output provides a scan across the beam perpendicular to the edge 40. Since the two edges 40, 42 are perpendicular to each other, edge 42 provides a scan across the beam extending perpendicular the scan generated by edge 40. It should be noted that beam 10 shown in FIG. 8 is a symmetric $TEM_{00}$ mode such that both scans have the same character and generate the same value for beam diameter and $M^2$. This will not be the case for asymmetric beams, as discussed below.

The concept of generating perpendicular scans using apertures disposed at 45° angles with respect to the rotation of the hub has been used in the prior art BeamScan device mentioned above. In the latter device, two slits, disposed at 45° angles with respect to the rotation of the hub are used. In addition, in the BeamScan device, the entire hub assembly is mounted in a collet permitting the assembly to be rotated about a line parallel to the plane of rotation of the hub. When the axis of the collet is aligned along the propagation axis of the incoming beam, a scan through any azimuth angle in the cross-section of the beam can be made. The ability to orient the plane of rotation of the hub to take scans as a function of azimuth is a desirable feature which is incorporated in the preferred embodiment of the subject invention as discussed below.

Figure 11A:
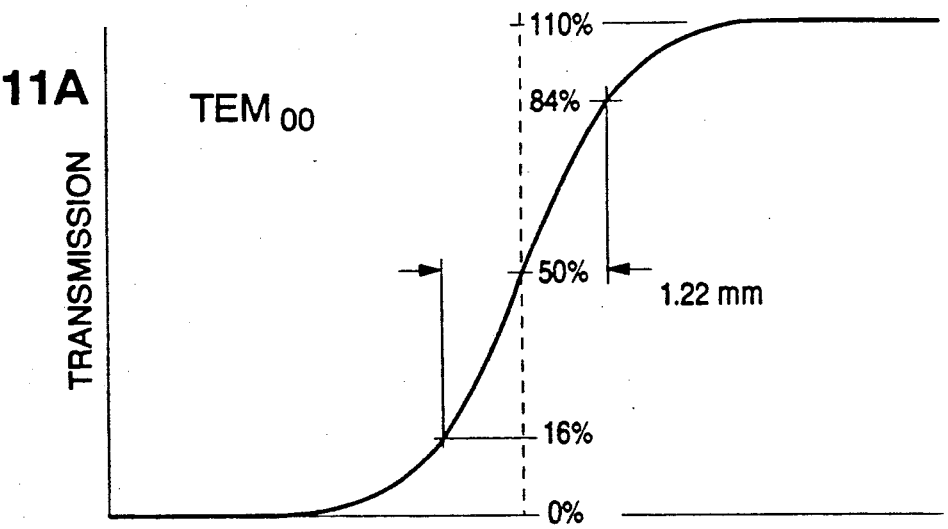
FIGS. 11A through 11C are graphs illustrating the measured transmission curves for various laser modes.
Figure 11B:
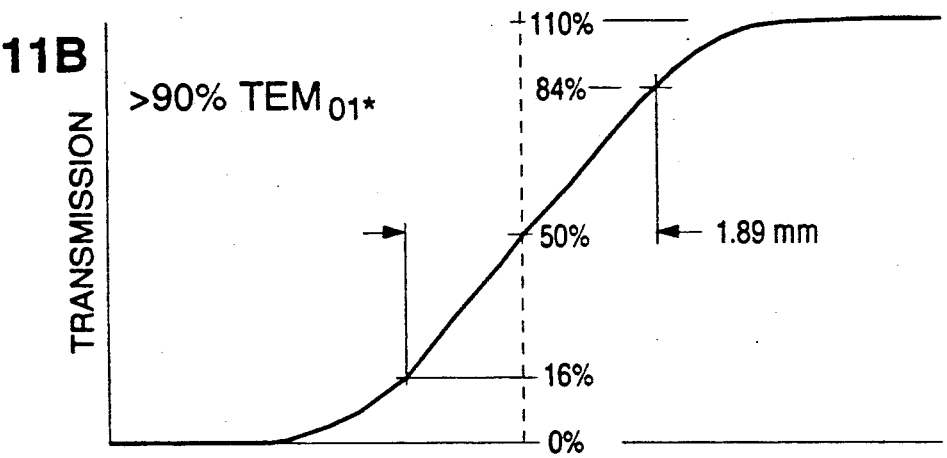
Figure 11C:
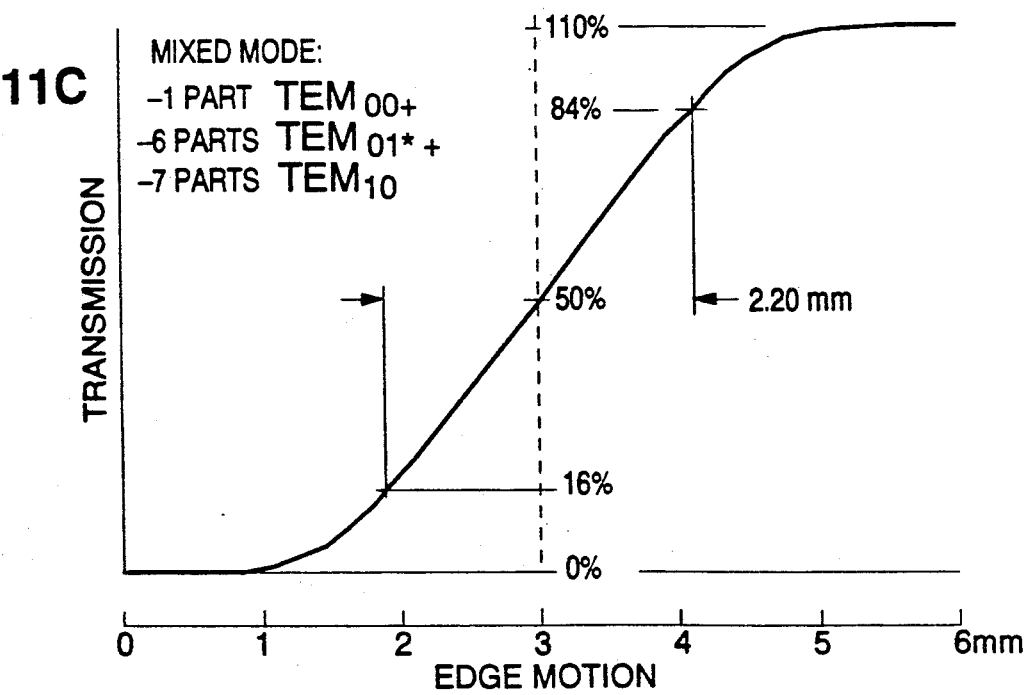
Figure 12A:
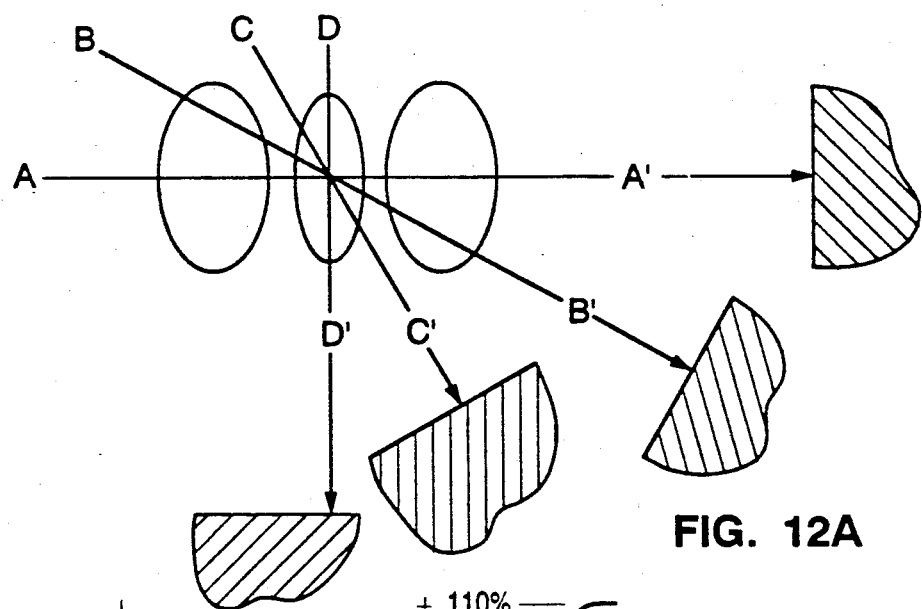
FIGS. 12A through 12D are graphs illustrating the knife edge transmission curves for the mode of FIGS. 6a through 6d.
Figure 12B:
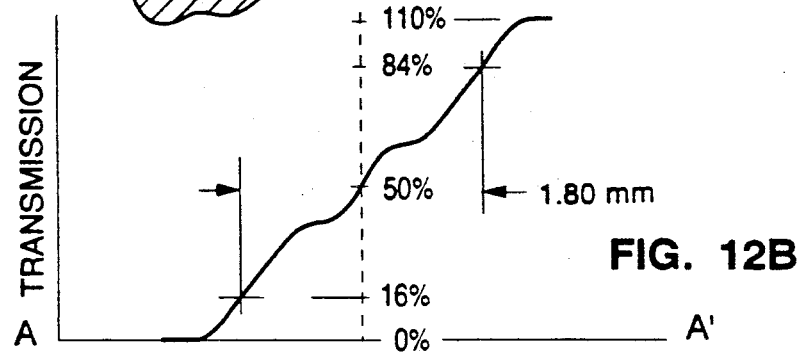
Figure 12C:
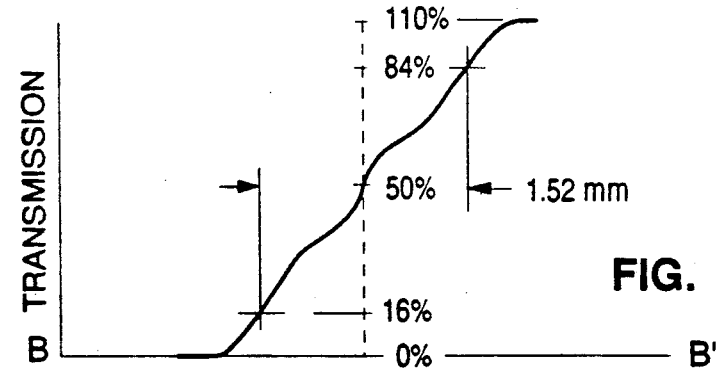
Figure 12D:
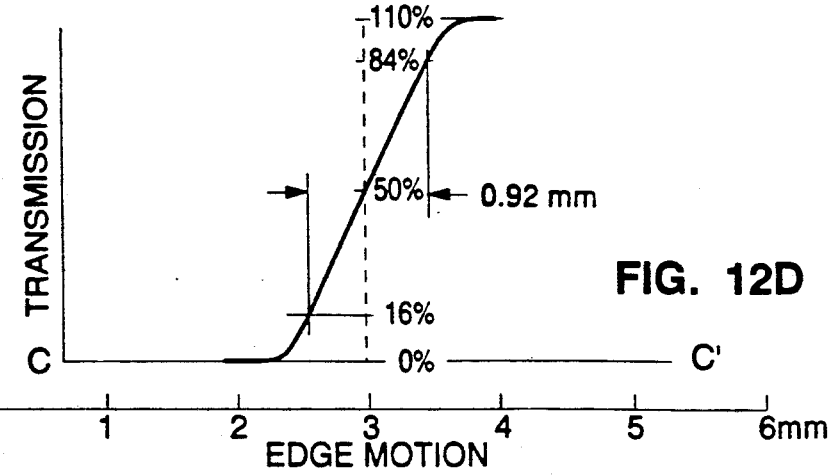

The principal advantage of using the power transmitted past a knife edge to measure beam diameter is the fact that the signal rises monotonically for both the $TEM_{00}$ mode and all higher order modes regardless of the peaks in the mode profile. As the knife edge uncovers the beam, the transmitted power signal can only increase as more of the beam is exposed to the detector. For beam diameters measured between clip points on this signal, this fact eliminates the diameter discontinuity problems discussed with the earlier methods of beam diameter measurement. FIG. 11 shows the transmission signal past a knife edge measured for three beams, a pure $TEM_{00}$ mode beam, a nearly pure $TEM_{01}^*$ mode beam, and a mixed-mode beam containing roughly equal parts of the $TEM_{01}^*$ mode and the $TEM_{10}$ mode (with a small fraction of $TEM_{00}$ mode in addition). These mode designations are all in cylindrical coordinates and correspond to the designations of FIG. 1. The pinhole profile for the 90% $TEM_{01}^*$ mode of FIG. 11B, looked like the profile for that mode in FIG. 1 except that the central node dipped down to 14% of the peak height instead of reaching 0%. The pinhole scan of the mixed mode of FIG. 11C looked like the $TEM_{10}$ mode profile of FIG. 1, except that the nodal dips were at 63% of the central peak height, and the outermost peaks were at 79% of the central peak height. The modes measured in FIG. 11 were generated in an argon ion laser (Coherent Innova Model 90-6, with non-standard short-radius cavity optics) with an internal mode-limiting aperture whose diameter could be varied. By opening this aperture, the higher order mixed modes were generated. By closing the aperture (and reducing the discharge current through the laser tube) the pure $TEM_{00}$ mode could be generated, FIG. 11A. Thus, the mode of FIG. 11A is the "associated fundamental mode" which goes with the modes of FIG. 11B, 11C.

As can be seen, the transmission patterns for all the modes are S-shaped. As the mode pattern becomes more complex, the curve becomes straighter in the middle and the outer edges turn over faster.

Reasonable values for beam diameters can be generated for all modes. The beam radii W determined by the 16% and 84% cut points for each of the FIG. 11A, B and C modes are taken from the bottom scale showing the motion of the knife edge and are 1.22 mm, 1.89 mm and 2.20 mm, respectively. Since in this example FIG. 11A is the associated fundamental mode for the set of modes of the figure, the $M^2$ values for these modes are obtained as the square of the ratios of the B and C diameters to the A diameter, or $M^2$ is 1, 2.40 and 3.25 for the modes of FIG. 11A, B and C.

Moreover, this approach eliminates the sharp discontinuities in measured beam diameter values that would be generated as one varied the azimuth angle of the scan on the beam cross section while measuring the diameter of the beam, as illustrated in FIG. 12. FIG. 12 illustrates computed transmission functions for the mode shown in FIG. 6, as the knife edge 40 uncovers the beam, scanning perpendicular to the edge from A to A', etc., as indicated by the arrows. The shape of the A—A' scan along the major principal diameter for this mode is readily understood. Along this diameter there is a nodal line between each lobe of the mode, aligned with the knife edge. As each lobe is uncovered by the knife edge, it generates the characteristic S-shaped pattern for a single spot, of height proportional to the total power in that lobe, with the patterns for the three lobes stacked on each other.

When the scan direction azimuth is moved to B—B', the upper part of the knife edge begins to uncover the upper part of the central lobe, before the edge is clear of the lower part of the left-most outer lobe. Thus the "step" in the transmission pattern is smoothed out, the "tread" becomes inclined without a horizontal portion. This process continues until at C—C' the steps have almost disappeared, and the beam width indicated has narrowed towards the value of the minor principal diameter. The profile along D—D' is a smooth S-shaped curve without steps, similar to FIG. 11A. The measured beam diameters decrease smoothly in this sequence with no discontinuities. Thus, this approach is ideally suited to determining mode quality of beams since it produces consistent results for beams of any quality.

In addition to providing a good definition of beam diameter, there are several other advantages in using a knife edge. First, with a knife edge there are no deconvolution errors which occur with pinholes or slits. A deconvolution error refers to the fact that with a pinhole or a slit, the profile width that is measured has a component due to the width of the pinhole or slit as well as the beam width; the transmission signal is a convolution of the two widths. This error is not serious so long as the aperture width is much less than the beam width. For a fundamental mode profile, aperture widths up to 1/6 of the beam width for a pinhole, and up to 1/9 of the beam width for a slit, will add to the measured width an error of no more than 1% of the true beam width. For larger aperture widths a mathematical deconvolution should be done to correct the measured profile, which is difficult for an arbitrary mixed mode. Thus, pinhole and slit apertures cannot be used with tightly focused beams.

A knife edge has no width, and adds no convolution error to the measured transmission signal so long as the edge is the mathematically straight line assumed in calculating the transmission past the edge. This property means that a knife edge can be used for all focal diameters on the scale of which the edge is straight. It is not difficult to get straight edges on a scale on the order of ten microns —ordinary razor blades are this straight.

The knife edge technique also provides a transmission signal that has a good signal to noise ratio in the measurement of beam diameters. The improved signal is a result of the fact that the knife edge is straight line, of dissimilar symmetry to the limiting aperture in the laser resonator, which is generally circular. The limiting aperture creates a diffraction pattern with circular symmetry which overlaps with the main laser mode near the laser. The two patterns (the mode and the diffraction pattern) suffer optical interference with each other, which means a circular pattern of fringes is superposed on the laser mode as described in the literature (See Siegman, *Lasers*, University Science Books, Mill Valley, CA, 1986). These fringes move erratically with microphonic motions of the limiting aperture relative to the main laser mode, and create noise on detectors measuring a partially obscured beam. With the signal transmitted past a knife edge, however, due to the symmetry difference there are always both bright and dark interference fringes going past the edge, which average out and reduce this noise.

Another advantage of using a knife edge is that powers on the order of the full beam power are detected. Detected light signals are generally less noisy if more light is detected. As can be appreciated, a slit will transmit significantly less power than a knife edge aperture. The power transmitted by a pinhole is even less.

Another advantage for using a knife edge is that it can be used to give information about the position of the beam. More specifically, the 50% transmission point defines the center of the beam being detected. The timing of these 50% transmission points, as the beam is cut in a hub rotation by knife edges 40 and 42, gives the position of the beam center relative to these edges. The knife edges move at constant velocity V. If the beam center is on the centerline of the knife-edged window shown in FIG. 13A, and the distance between edges along the centerline is L, then the time difference between uncovering the center of the beam by the edge 40, and the blocking of the center of the beam by edge 42, will be L/V. If the beam center is above the centerline by an amount $H_1$, the distance between the 50% cut points is L - 2H (for edges at 45° to the scan direction) as may be seen in FIG. 13A. Thus a time difference $2H_1/V$ shorter than L/V, as shown in FIG. 13B indicates a beam center height $H_1$ above the centerline. Similarly, a time difference $2H_2/V$ longer than L/V between 50% points (FIG. 13B) indicates a beam center height $H_2$ below the centerline, when the edges 40, 42 are oriented as in FIG. 13A. Once the height in the window of the beam center is known, the beam center position along the scan direction is given by the timing difference between the 50% point time at either knife edge and the known rotation position of the hub. The rotation position of the hub is known based on the time $t_B$ elapsed since the passage of the fiducial mark 44 through the interrupter 46, and the distance between the fiducial mark and the edge of the knife at the known height (see FIG. 13A). For example, for a beam center on the centerline, the distance from the edge 42 to the fiducial mark is shown in FIG. 13A as $L_1$.

As can be appreciated, these two distance measurements $L_1$ and either $H_1$ or $H_2$, locate the position of the beam within the knife edge aperture window. Since locating the beam center position depends only on the timing difference between the 50% transmission points at the two knife edges (relative to the known timing difference along the centerline), it can be seen that window geometries other than FIG. 13 will work as well if their timing differences are known.

One benefit of this position information is that it can be used to align the propagation axis of the beam with the optical axis of the instrument during the $M^2$ measurement. Having a reproducible means to insure beam alignment, insures reproducible beam quality measurements. Beam alignment is also critical where a pinhole is to be used to generate beam profiles. More specifically, if a pinhole is not accurately aligned through the center of a multimode beam, an inaccurate profile will be generated.

Another advantage to having a sensitive means for detecting beam position is that fact that the stability of the pointing direction of the laser beam can also be monitored. As discussed below, in the preferred embodiment, transmission information is taken from the knife edges as they intersect the beam both when they are near the lens as in FIGS. 7A and 7B, called the front position, and when they have been rotated away from the lens as in FIGS. 7C and 7D, called the rear position. By generating two-o dimensional transverse beam positioning information at two spaced apart locations, the input beam angular direction (relative to the instrument) can be derived. The size of the fluctuations in this input direction determines the beam pointing stability.

The one drawback to using a knife edge is that it generates curves as shown in FIGS. 9 through 12 rather than the profiles of FIGS. 1 and 3 through 6. Profiles such as would be obtained with a slit can be generated from the transmission signal past a knife edge if that transmission signal is differentiated with respect to the edge motion. This was demonstrated by J. A. Arnuad et al, *Appl. Optics*, Vol 10, pg 2775, Dec. 1971. In the preferred embodiment discussed below, a profile is generated separately with a pinhole in order to obtain the full heights of the intensity peaks and the full depths of the nulls, without the averaging inherent in a slit profile.

MEASUREMENT OF MODE QUALITY $M^2$

As discussed above, in order to model the propagation of a multimode beam using Equation (11), one needs to make three independent measurements. While these three measurements can theoretically be the beam diameter at any three independent locations, these measurements might require extreme precision to accurately locate the beam waist, due to the form of the multimode propagation equation (11) mentioned previously. If the measurements are taken far away from the beam waist, in the asymptotic limit of the beam, the separate effects of the mode quality, waist diameter, and waist location in determining the beam divergence can not be accurately isolated from each other.

This problem can be overcome if measurements are taken at or near the beam waist. However, the beam waist is often relatively inaccessible. For example, the waist can be located many meters from the laser or inside the resonator structure.

Therefore, in accordance with the subject invention, measurement of mode quality is most practically carried out by using a focusing means, such as a lens or mirror, to create a transformed waist which is easily accessible to direct measurement. A means is then provided for locating the transformed beam waist. Once the beam waist is located, at least two measurements of beam diameter are taken. Preferably, one of those measurements is at the beam waist. Once these three measurements are completed, a value for $M^2$ can be calculated. Based on the focal length of the lens, the location of the transformed waist and the calculated value for $M^2$; the location of the original beam waist and its diameter can also be calculated. With this information, the propagation of the beam can be predicted, including the determination of the original beam waist diameter and location.

Figure 15:
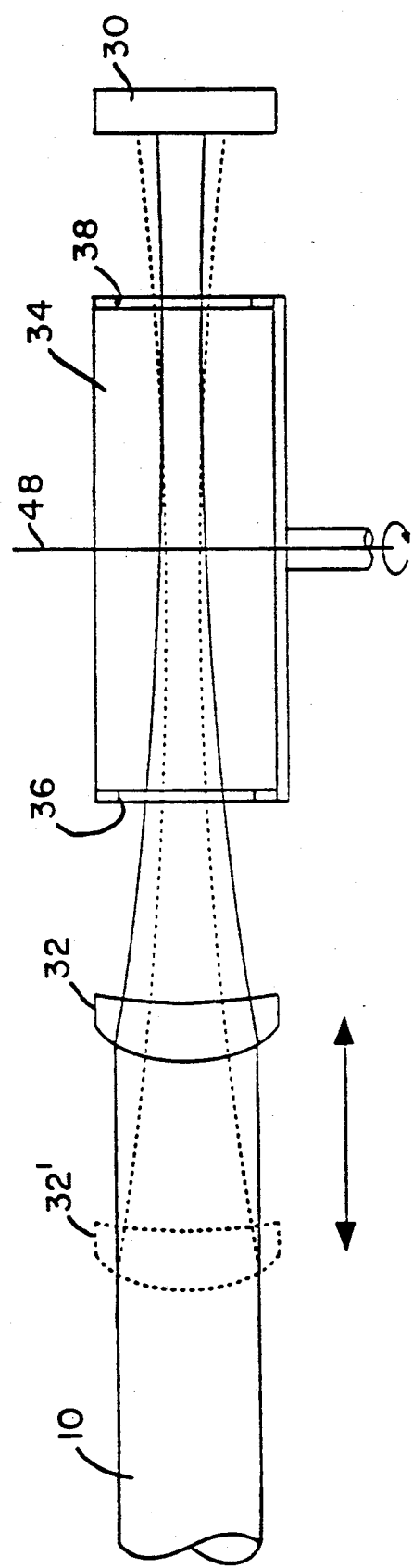
FIG. 15 is a simplified cross-sectional view illustrating the effect of translating the lens in accordance with the subject invention.

In order to carry out this method, a means must be provided to measure beam diameter. There are a number of devices presently available to carry out such a measurement. FIGS. 7 and 15 illustrate one preferred embodiment containing the basic elements for carrying out the subject invention.

As discussed above, the subject device includes a lens 32 for focusing a beam and creating a transformed waist. The beam is aligned with detector 30. A rotating hub 34 having at least two apertures 36 and 38 intersects the beam. As the hub rotates, the transmission past the knife edges 40 and 42 is monitored at both the front and rear positions of the knife edges. These output signals can be used to give measurements of beam diameters at these two positions.

In practice, the first step would include aligning the beam using information about the 50% transmission signal as discussed above. Additional details regarding the method for aligning the beam with respect to the preferred embodiment will be discussed below. Once the beam is aligned, the most accurate measurement of $M^2$ can be derived.

After the beam is aligned, the waist is located. There are a few methods for performing this step. Each of the methods rely on the fact that the position of the waist can be moved if the lens position is moved. Accordingly, a means must be provided for translating the lens and for keeping track of the lens position. The transformed waist location, relative to the lens, is given by well-known expressions in the literature (see the Kogelnik and Li reference cited above). Typically the input waist location will be a meter or more away from the instrument, and the focal length of the lens will be much less than the distance to the input waist. Under these conditions, the transformed waist will lie a little beyond one focal length away from the lens and will stay approximately at that distance away as the lens is moved. In any event, the transformed waist position moves with the lens position, and the processor in the instrument can be programed to account for the slight non-linearity between these two motions once the beam parameters have been measured at any lens position.

In the first method for locating the waist, the lens position is varied in order to place the waist at the rear knife edge position. This result is achieved by monitoring the transmission past the knife edge 40 as the lens is translated. The beam diameter is calculated for each rotation of the hub based on the time difference between the 16% and 84% transmission levels. As noted above, the time difference is easily converted into beam width since the speed of rotation of the hub is known.

Figure 14:
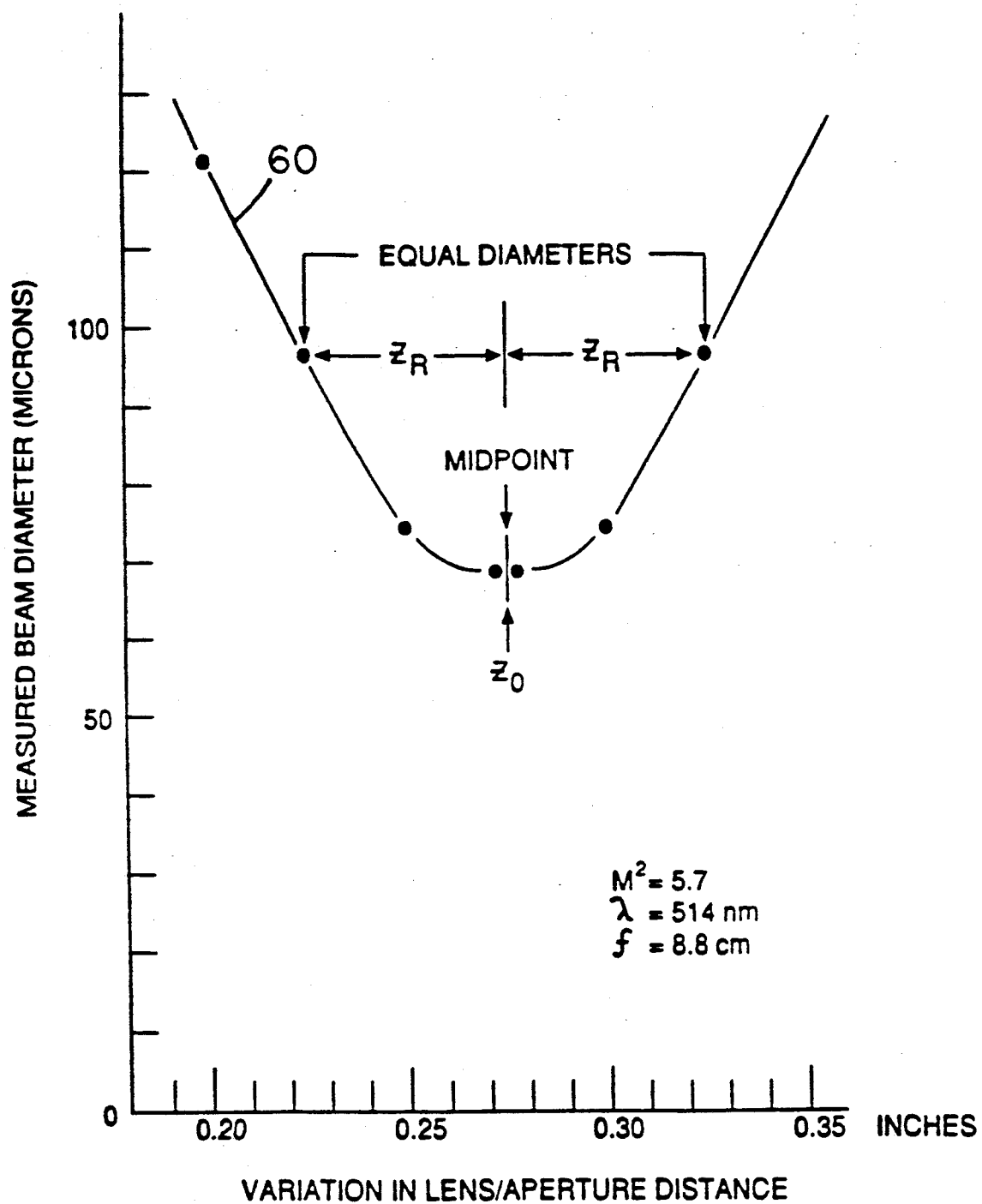
FIG. 14 shows the change in the measured diameter of a laser beam as the lens-aperture distance is varied.

FIG. 14 shows a plot of measured beam diameters taken as the distance from the aperture position to the lens is varied. When curve 60 hits the lowest value, the beam waist has been located at $Z_0$. The value obtained at that location is the diameter of the transformed waist and is used in the subsequent calculation for $M^2$.

For simplicity of discussion, only the scan along one axis (edge 40) will be described at this point. In the preferred embodiment, a two axis scan is performed using both knife edges 40, 42. It should also be noted the 100% transmission value used to set the clip levels is continuously updated on each hub rotation and used for the following pass of the knife edge.

Once the beam waist is located and its diameter measured, the diameter of the beam at another location is determined. This determination is most easily obtained by taking a measurement at the front position of the aperture as shown in FIG. 7A. The advantage of obtaining the second beam diameter measurement at this location is that it is a precisely known distance from the previously measured transformed waist, namely the diameter D of the circle drawn by the aperture in a full rotation, which as noted above is being referred to as the diameter of the hub. The measurement of the second beam diameter is performed by detecting the time difference between the 16% and 84% transmission levels as discussed above.

After these three measurements have been taken, the value of $M^2$ can be calculated using the following equation:

$$M^2 = (\pi W_o/2\lambda)\theta_F \quad (13)$$

where $$\theta_F = \sqrt{[(2W_1)^2 - (2W_o)^2]/D^2} \quad (14)$$

is the full multimode beam divergence angle shown in FIG. 2 and where $2W_o$ is the transformed beam diameter measured at the waist, $2W_1$ is the diameter of the transformed beam measured at the front aperture position, D is the diameter of the hub, and 1 is the wavelength of the laser beam.

Once the value of $M^2$ is known, the diameter of the original beam waist $(2W_{o|in})$ and its distance from the lens $(Z_{in})$ can be calculated with the following formulas:

$$2W_{o|in} = 2W_o \sqrt{1/((d+D)/f)^2 + (Z_R/f)^2} \quad (15)$$

and $$Z_{in}/f = \frac{\{[(d+D)/f] - 1\}}{\{[(d+D)/f] - 1\}^2 + (Z_R/f)^2} + 1 \quad (16)$$

where $Z_R$ is the Rayleigh range given by:

$$Z_R = \pi W_o^2/M^2\lambda \quad (17)$$

where d is the distance from the front aperture position to the lens, and f is the focal length of the lens. As noted above, once $M^2$, the original beam waist diameter $2W_{o|in}$ and its location $Z_{in}$ are known, equation (11) can be used to predict the propagation of the beam.

The second method of locating the beam waist includes measuring the beam diameter at two locations on either side of the waist. When the diameter at these two locations is equal, the waist will be located exactly between the two locations.

This method is readily carried out in the subject invention. More specifically, lens 32 is moved in a manner to locate the waist somewhere within the hub. The beam diameters at both the front and the rear aperture positions are continuously measured. The position of the lens is then adjusted until the diameters measured at both positions are equal. This is shown as the dotted lens position 32' in the cross-section of the device shown in FIG. 15. At this point, it is known that the waist is located midway between the two aperture positions at the center of rotation 48 of the hub 34 in FIG. 15.

This method is more accurate than the first approach. The reason for this greater accuracy can be appreciated by referring to FIG. 14 which illustrates the variation of beam diameter with respect to the lens-aperture distance. As can be seen, the rate of change of beam diameter is much smaller near the waist than at locations about a Rayleigh range of the transformed beam away from the beam waist. Thus, the change in diameter for any given movement of the lens can be maximized if a measurement location is selected away from the waist.

As the rate of change is increased, the measurement accuracy is increased.

Curve 60 also shows that the change in beam diameter varies equally on either side of the waist. Thus, if two locations are found to have the same diameter on either side of the waist, the waist will be found equidistant between the two locations.

Once the waist is located in this manner, the lens can be translated an amount D/2 to place the waist at one of the hub planes. At this point, the same measurements as discussed above are taken. More specifically, the diameter of the waist is measured at the selected hub plane. In addition, the diameter of the beam at the remaining hub plane is measured. With these measurements, the value of $M^2$, the original beam waist diameter $2W_{o|in}$ and its location $Z_{in}$ can be calculated using equations (15) and (16). The propagation of the beam can then by predicted using equation (11).

Using the latter method f locating the beam waist requires that the lens be capable of moving at least a distance D/2. This increased distance will increase the size of the device and add some costs. However, it is believed that the precision with which the waist can be located using the latter method is enhanced by roughly an order of magnitude. This improvement comes not only from the fact that the rate of change of diameter with position increases away from the waist, but that the detection of the equality of the two beam diameters (by rapidly sampling and comparing the measurements made at the front and rear aperture positions and driving the difference to zero) is inherently more accurate than attempting to sequentially measure two absolute numbers.

As noted above, in the latter method, the waist is first located at the center of the hub. Thereafter, the lens is moved in a manner to place the waist at the rear aperture position. Due to the slight divergence of the incoming beam, if the lens is moved an amount D/2, the transformed waist location will not move exactly the distance D/2 due to the slight non-linearity between these two motions. This second order inaccuracy can be corrected by programming the processor to iteratively compute the correction for the non-linearity after the input beam parameters are measured at the first position, move the lens to the corrected position, and repeat the process until the computed correction is negligible.

In the preferred embodiment, a third method for locating the transformed beam waist is used. In the latter method, beam diameter measurements are taken at both the front and back planes of the hub as the lens is translated a distance greater than or equal to the diameter D of the hub. This method further increases the length of travel required for the lens as compared to the first two embodiments. However, it has been found that this approach provides a highly accurate way of locating the transformed beam waist.

Figure 24A:
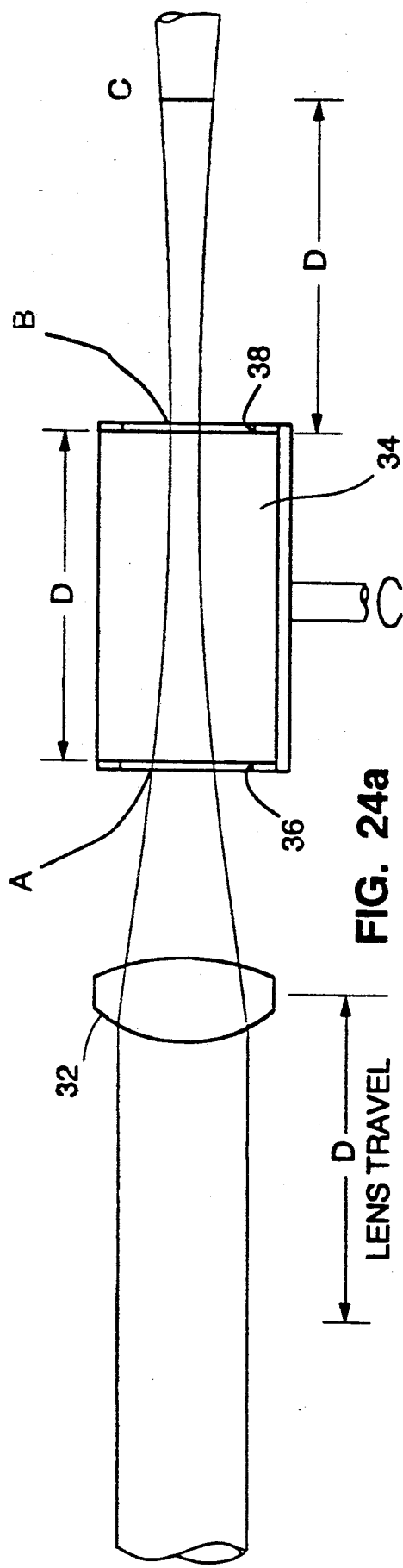
FIGS. 24a through 24b are schematic diagrams illustrating the preferred approach for locating the transformed beam waist.
Figure 24B:
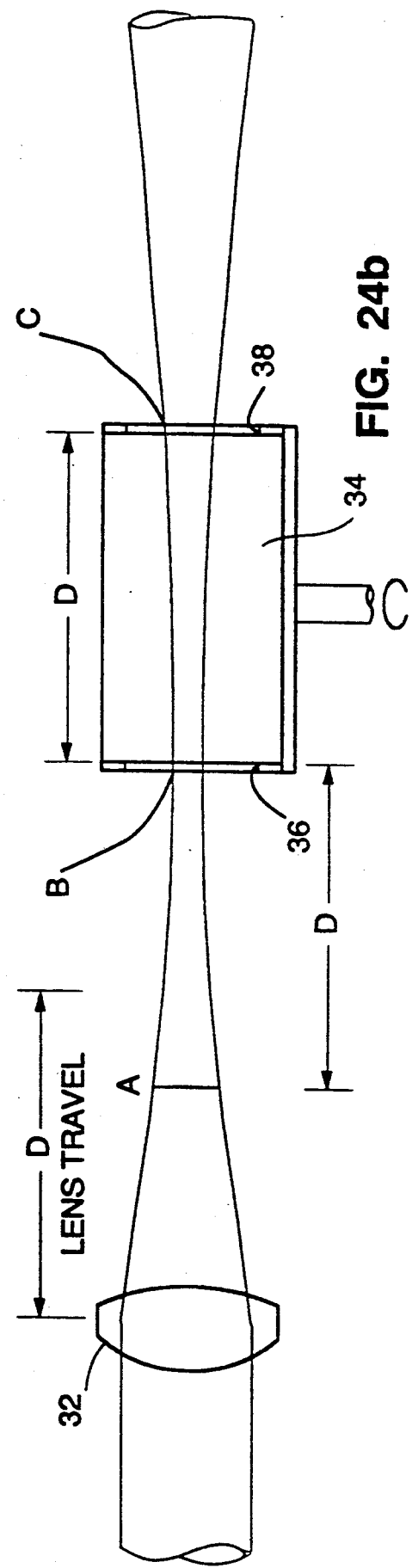

The enhanced accuracy of the third method can best be understood by referring to FIG. 24. For simplicity, the beam is shown as having the transformed waist located at the rear plane of the hub in FIG. 24a.

In the third method, measurements of beam diameter are taken at the front and rear planes of the hub 34 when the lens 32 is in a first position as shown in FIG. 24a. Measurements of the diameter of the beam are then taken sequentially, in both planes, as the position of the lens 32 is stepped away from the hub 34 to a second position, a distance at least the hub diameter D away from the first position. As noted above, the position of the transformed waist will move along with the movement of the lens. All of the data taken during the incremental stepping of the lens can be used to reconstruct the axial profile of the beam over a distance twice the diameter of the hub 34.

This result can be appreciated by first observing the measurements that are obtained at the front hub plane. When the lens 32 is in the position shown in FIG. 24a, the diameter of the beam at point A in space will be measured. As the lens is moved to the position shown in FIG. 24b, the front plane aperture 36 will generate successive beam diameter measurements along the profile of the beam from point A to point B (the transformed waist).

Turning to the measurements taken at the rear hub plane, it will be seen that when the lens is in the position shown in FIG. 24a, the diameter of the beam at the transformed waist, position B will be taken. As the lens is moved to the position shown in FIG. 24b, the rear plane aperture 38 will generate successive beam diameter measurements along the path of the beam from point B to point C. By mathematically splicing the measurements taken at the front and rear planes, the axial profile of the beam from point A to point C can be analyzed. For the reasons noted above, more accurate information about the location of the transformed beam waist can be derived when additional data is taken at locations farther away from the beam waist.

As noted above, in this method, the data is taken at discrete incremental steps as the lens is moved between the two positions. Calculation of the location of the minimum diameter (transformed beam waist) can be performed using a digital filtering algorithm developed by J. J. Snyder and disclosed in Appl. Opt. 19, 1223 (1980). This algorithm provides a digital approximation of the result that would be obtained if the curve defined by the discrete data points was differentiated and the zero crossing at the minimum was located. The algorithm is particularly advantageous because it tends to average noise. Moreover, the filter widths used in the calculations can be varied to optimize the signal to noise ratio in finding the zero crossing. Broader filter widths better average the noise but reduce the range of lens travel for which the filter can locate a zero crossing.

Once the transformed beam waist is located in this manner, the lens is translated to a position which will place the waist at either the front or back planes of the hub. Once again, the same measurements are taken to determine the value of $M^2$. More specifically, the diameter of the waist is measured at the selected hub plane. In addition, the diameter of the beam at the remaining hub plane is measured. With these measurements, the value of $M^2$ and the original beam waist diameter $W_{o|in}$ can be calculated using equation (15). As noted above, equation (16) gives the beam waist location when focusing on the rear aperture position. If the beam waist is focused on the front aperture position, a modified form of equation 16 is used to correct for the different distance between the lens and the focus is used. The modified equation is given below:

$$Z_{in}/f = \frac{[d/f] - 1}{\{[d/f] - 1\}^2 + (Z_R/f)^2} + 1 \quad (16')$$

The propagation of the beam can then by predicted using equation (11).

The waist locating sequences described above occur at start-up, when the processor moves the lens through a wide enough range to initially find and position the transformed beam waist. It can generally be assumed that the waist location will not vary over a given testing period. If waist movement is a concern, the processor can be programmed to servo the lens in a dither-and-track steady state operation to always hold the transformed waist at the rear aperture position (even if the input waist location moves). To do this, the processor steps the lens a small amount first to one side of the last known waist location, and then steps back through the middle to the other side, and measures these rear position beam diameters for each step. As long as the waist is located at the rear position, the end stepped diameters will both be larger than the middle step. If an end step diameter is smaller than the middle step diameter, the processor moves the lens in the small diameter step direction to restore the desired "middle diameter the smallest" condition—this is the tracking part of the operation of the lens servo. From the initial beam parameter information gathered on start-up and subsequently updated, the processor can compute a suitable step size. This would be a step just large enough to make a detectable change in the stepped diameter over the waist diameter (a change of about 1% of the waist diameter). For the beam of FIG. 14, this makes the dither step motion of the lens a distance of about 0.005 inches (⅛ mm).

TWO AXIS MEASUREMENT

As discussed above, providing aperture 36 with two opposed 45° knife edges allows the beam cross-section to be scanned along two orthogonal diameters. In the preferred embodiment, the azimuthal angle of the instrument can be varied around the incoming beam axis such that the scan axes generated by the two knife edges will be aligned with the maximum and minimum principal diameters of the beam.

For the most accurate measurement of a beam in a principal plane, the transformed waist is placed (and held in place by the steady-state lens servo) at the rear aperture position. This presents a problem if the input beam has very different waist locations for the two principal planes (i.e., the input beam is astigmatic). In this case, the transformed waists will also be located at different distances from the lens, and the lens can only be positioned properly for one of the principal planes. This situation is managed by using the input beam information gathered by the processor on both principal planes during the start-up lens-focusing sequence. The processor compares subsequent values to the initial ones to determine when a large enough change has occurred to require refocusing to keep the displayed measurements valid within the specified accuracy of the instrument. Because the instrument is constantly monitoring beam diameters in both principal planes, the processor can decide when such a large change has occurred even in the non-servoed plane.

Typical operation with an astigmatic beam is illustrated as follows. On initial start-up the processor moves the lens over a range large enough to locate the waist positions and measure the diameter at the waists and front aperture positions for both principal planes. This tells the instrument the input beam parameters for both principal planes at the time of start-up.

Often the user of the instrument is more interested in the changes in the beam parameters for one of the principal planes than the other; this plane can be user selected to be the primary plane (defined as the one driving lens servo) or the default setting of the instrument for the primary plane can be accepted. Most laser beams are not highly astigmatic and acceptable readings of beam parameters, at somewhat lower accuracy, are obtained from the beam diameters measured in the (slightly out of focus) secondary principal plane. The instrument displays the readings for both principal planes, but highlights the ones for the more accurate primary plane, in this case of a slightly astigmatic input beam.

For large astigmatism in the input (and transformed) beam, the instrument is forced to sequentially switch between the two principal planes, alternately bringing each into focus, by switching control of the lens servo, to maintain the instrument's accuracy. This switching can be done manually by the user or the user can select an automatic mode where each principal axis (whose output readings are highlighted) is alternately selected by the processor for a few seconds of measurement. The measurements made during the last "in-control" cycle are remembered and displayed by the processor (but are dimmed on the display) during the other-axis measurement cycle.

The processor can decide and prompt the user as to when alternating operation is necessary, based on two criteria. Both the diameter and slope of the diameter versus lens focus curve (like FIG. 14) are available from measurements in the secondary principal plane. (These are available even though the lens is being servoed for and stepped at a step size computed for the primary principal plane, because both principal diameters are always being measured.) Reasonable criteria would be if the secondary mode diameter changes by more than 5%, or the slope of the secondary diameter curve versus step size changes by more than 20%, of their respective initial values. In this case, the user is given a prompt that the alternating-focus operation is necessary.

FIRST PRINCIPAL EMBODIMENT

Figure 16:
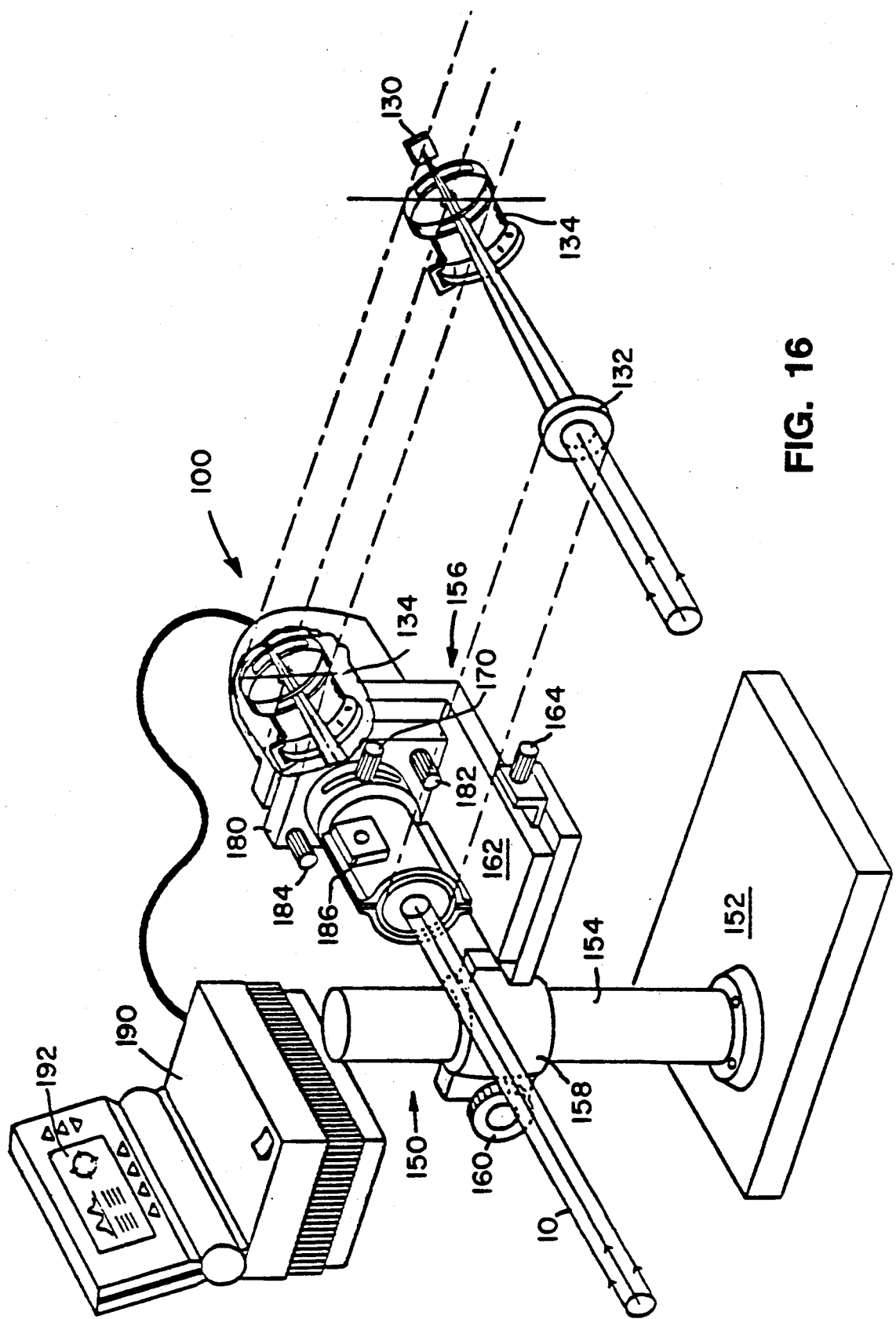
FIG. 16 is an exploded perspective view of the first embodiment of the subject invention.
Figure 17:
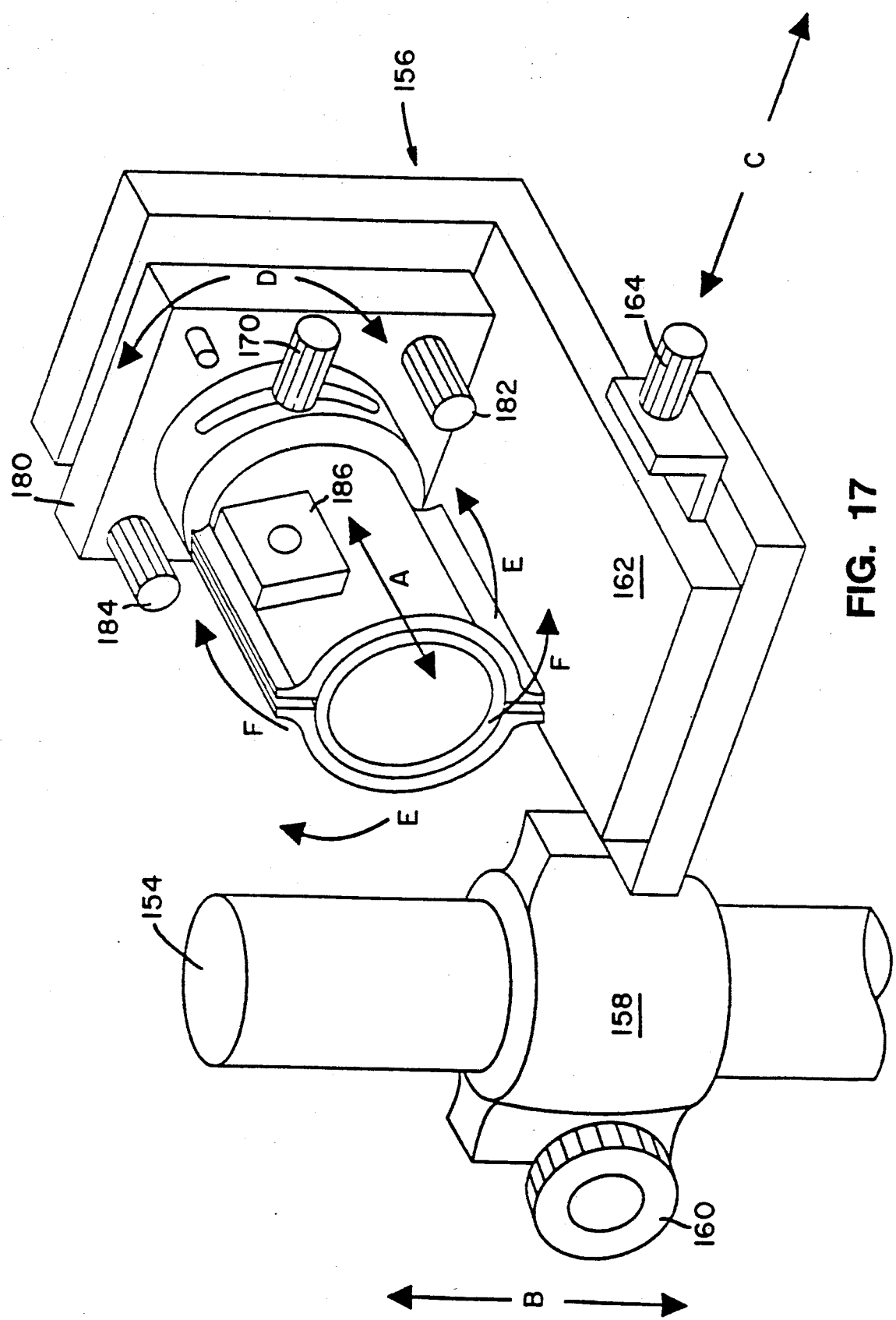
FIG. 17 is an enlarged perspective view of the device shown in FIG. 16 and illustrating the approach for providing six axes of adjustment to allow alignment of the beam with the subject apparatus.

FIGS. 16 and 17 show the first principle embodiment 100 of the subject invention. This device includes a rotating hub 134 for chopping the laser beam 10. A lens 132 is provided for creating a transformed waist. The position of the lens is adjustable along arrows A in FIG. 17 as discussed below. The transmission of the beam past the hub is measured by detector element 130.

As seen in the Figures, the lens, hub and detector are mounted on a support stand 150 designed to allow the orientation of the hub with respect to the beam to be adjusted such that the beam can be accurately aligned for measurement. There are many different designs available for a support stand to satisfy this requirement.

In the illustrated embodiment, the support stand 150 includes a base 152 and a vertical post 154. A hub support platform 156 is mounted to the post 154 via clamp 158. Vertical adjustment (along arrows B in FIG. 17) is achieved by moving clamp along post 154 after the set screw 160 has been loosened.

The lateral movement along the horizontal axis is provided by an adjustment screw and plate combination (162,164). By rotating screw 164, the position of the hub support platform is adjusted along the axis shown by arrows C in FIG. 17.

As noted above, it is desirable to be able to adjust the plane of rotation of the hub with respect to the propagation axis of the beam in order to scan along various azimuth angles. This adjustment feature is provided by rotational element driven by lever 170. The rotational element (not shown) is connected directly to the hub and permits 210° of rotation about the beam axis along arrows D.

Angular tilt adjustability is provided by tilt plate 180. Tilt plate 180 is similar in construction to well known mirror adjustment structures. The tilt plate 180 is spring loaded (springs not shown) to the hub support platform 156 to give a compressive load against screws 182 and 184. By adjusting screw 182, the Vertical tilt of the hub with respect to the beam can be varied as shown by arrows F. Adjustment of screw 184 will vary the horizontal tilt as shown by arrows E. Arrows A–F illustrate the six degrees of motion afforded by this design.

Lens 132 is a low aberration lens and is selected based on the wavelength of light being tested. To facilitate operation, it would be desirable to include with each lens some form of ROM chip having the lens parameters, such as focal length, stored therein. This permits the use of interchangeable lenses, as calibration information on the lens can be read directly by the processor to facilitate the calculation of the various beam parameters. The lens focal length is chosen to give transformed beam characteristics (divergence, waist diameter) that can be conveniently measured, for the range of input beam parameters the instrument is designed to measure. Examples of design parameters for several wavelength ranges are given below.

A suitable means for translating the lens and keeping track of its position is required. As shown in FIG. 17, a stepper motor 186 can be used. In order to first locate the waist in the center of the hub, and then move the waist to the rear aperture position, the lens must be able to move a distance about equal to half its focal length.

As noted above, detector 30 functions to measure the transmitted power of the beam. The selection of the detector will be based on the wavelength of the laser beam. For example, a silicon photodetector will measure light having a wavelength between 0.2 and 1.0 microns and will be useful for most helium-neon, argon and krypton gas discharge lasers. For laser diodes and YAG lasers, a germanium photodetector which measures wavelengths from 0.6 to 1.9 microns would be acceptable. For high powered $CO_2$ lasers, a pyroelectric detector which operates on heat absorption would be used. The pyroelectric detector has a broad wavelength range but is insensitive and requires a beam of 1 watt or more in power to give adequate signals above its noise level.

As noted above, the width of the beam is derived by multiplying the time period between two clip levels and the velocity of rotation of the hub. Therefore, in order to obtain accurate measurements, the speed of rotation of the hub must be accurately controlled. This requirement is met by using a stepping motor with a high step count (400 steps per revolution) driven at a constant step rate. Alternately, a constant speed motor corrected by a feedback loop may be used. For either means, maintaining a rim velocity accuracy constant to one-tenth of one percent is desirable.

It is also necessary to know the rotational position of the hub, to locate the input beam position relative to the instrument, as discussed above in connection with FIG. 13. This information is provided by using some form of optical encoding. Position information can also be generated directly if the hub is driven using a high speed stepper motor.

Figure 18:
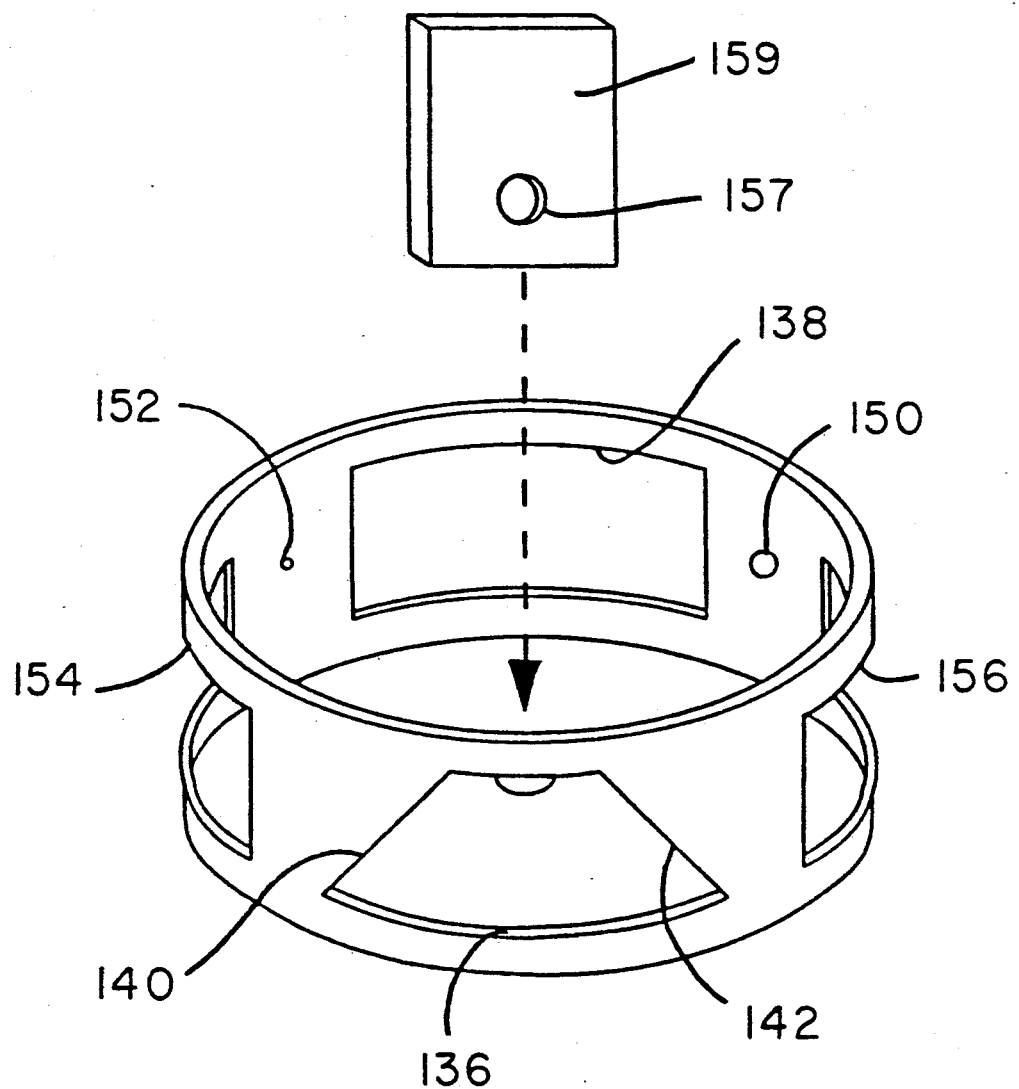
FIG. 18 is a perspective view of the hub used in the first embodiment of the subject invention.

FIG. 18 illustrates one type of hub 134 and aperture format that can be used in this embodiment of the subject invention. As can be seen, this hub includes one aperture 136 having two opposed 45° knife edges. A window 138 is disposed opposite aperture 136 for passing light.

In the preferred embodiment, two pinholes 150,152 of different sizes are provided for generating information about beam profiles. Windows (154,156) are aligned with pinholes 150,152 for transmitting the light passing therethrough. The use of the pinholes to obtain information about profiles is discussed below.

The selection of the diameter of the hub is based on two opposing factors. The first factor is a desire to create the largest difference between beam diameters at both the front and rear aperture positions on either side of the hub. This argues for a large diameter hub. The diameter of the hub must, however, be limited to insure that a constant rotation speed can be maintained without significantly increasing the size and cost of the motor. As can be appreciated, as the hub diameter is increased, the torque needed to drive the hub increases. In fact, the power rating of the motor scales with the hub diameter by a factor $D^3$. It is believed that a good compromise is reached when a practical hub diameter is selected (2 to 3 inches) together with the focal length of the lens such that the variation in beam diameter, measured at the front and rear aperture positions, is at least on the order of the $\sqrt{2}$. The hub rotates at about a 10 Hz rate to give real-time measurements and still allow sufficient time in each cycle for processor computations.

Due to the fact that the selection of some of the components is dictated by the wavelength of the beam, at least two commercial models are being considered. The selection of components is given below in Table I. The focal lengths and hub diameters listed produce a $\sqrt{2}$ or greater beam size increase across the hub diameter, for an input beam diameter at the lens of ½ mm or greater. This minimum input beam diameter should permit measurements to be made on most commercial lasers.

TABLE I

|  | Model 1 | Model 2 |
| --- | --- | --- |
| Wavelength range (microns) | 0.2-1.9 | 10.6 |
| Focal length of lens | 20 cm. | 20 cm. |
| Detector type | Si or Ge photocell | pyroelect. detector |
| Hub diameter | 3 inches | 3 inches |

BEAM ALIGNMENT

Figure 19:
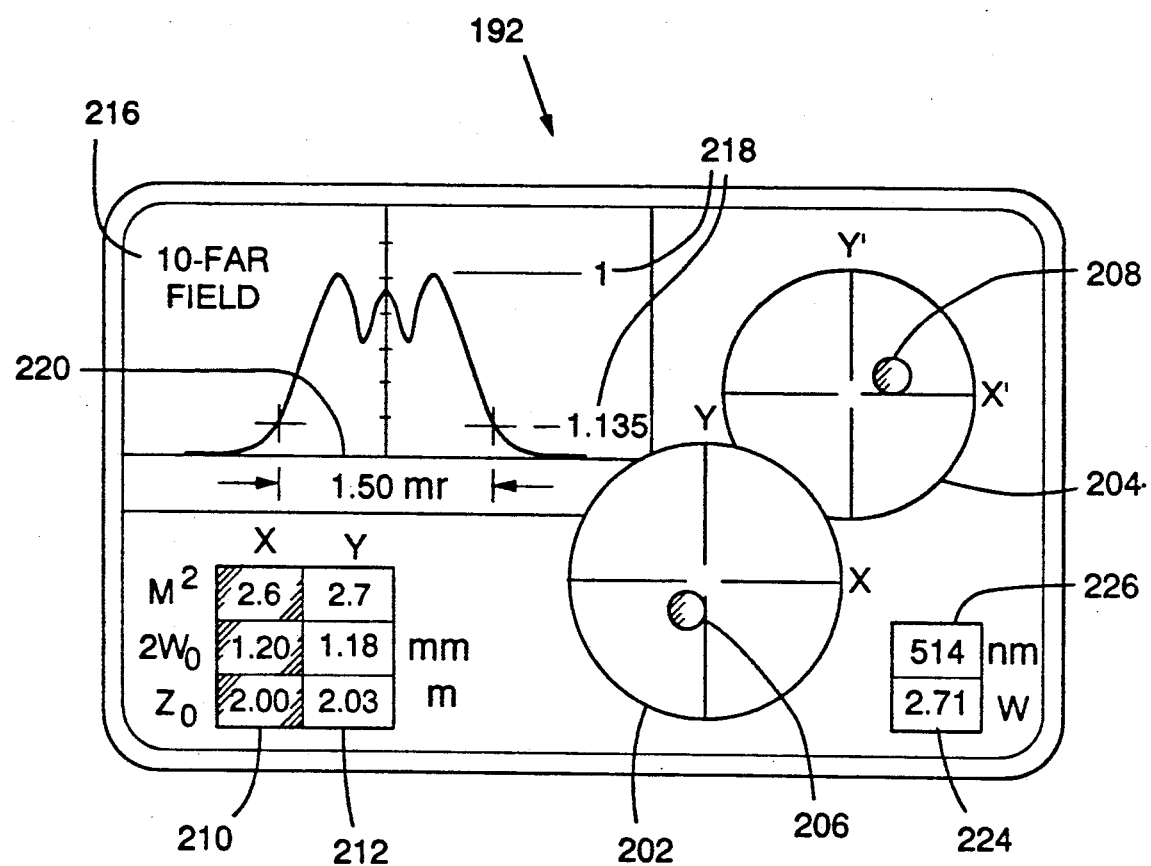
FIG. 19 is an illustration of a display that might be used to relay the information generated by the device of the subject invention to the user.

As discussed above, by detecting the 50% transmission points past a pair of 45° knife edges, information about beam position can be derived. In the preferred embodiment of the subject invention, this information can be provided to the user in a usable form with a graphic display shown in FIG. 16. The output of detector 130 is supplied to a microprocessor housed in the stand alone console unit 190. Console unit 190 also includes a display panel 192 which provides visual feedback of the information generated by the processor. A more detailed view of one form of display is shown in FIG. 19. This display includes a pair of coordinate plots giving X and Y information on the position of the beam at both the front and rear aperture positions. Information from these two spaced apart locations provides position as well as alignment information.

Referring back to FIG. 13, it will be recalled that X and Y coordinate information can be derived by noting the times and computing the time differences for the 50% cut points from the two knife edges. This X and Y information can then be used to generate a spot on the display corresponding to the position of the beam within the instrument. The user can then adjust the optical axis of the instrument with respect to the propagation axis of the laser beam until the displayed spots (206, 208) are centered on each of the coordinate maps. For the display as shown, the foreground coordinate map 202 represent the input lens 132, and the input beam (when looking towards the lens) is seen to enter a little below and to the left of center of the lens. In the rear map 204, the beam is seen to strike the detector in the rear of the instrument a little high and to the right. The beam parameters displayed 210, 212 for the two principal planes are calculated for the input beam, with the Y-axis 212 highlighted indicating that is the primary principal plane (the lens is being servoed to focus that axis most critically on the rear aperture position). The distance $Z_o$ to the input waist is measured from the lens. The designation 10-FAR FIELD, 216, means the profile shown is taken with a 10-micron diameter pinhole at the focused, rear aperture position as discussed below. The clip points used to analyze the profile (which can be set by the user) are indicated at 218, and the profile width 220 is given as the far field full divergence angle. The total power in the beam (appearing at 224) can be obtained from the 100% transmission signals past the knife edges. The wavelength 226 of the laser beam is initially entered into the instrument's memory by the user, as this must be known for the processor to computer the beam parameters via equation (11). Not shown in FIG. 19 are the parts of the display used to label the functions of the control buttons on the console unit 190. The functions and their labels change with the selection of the various operating modes.

The ability to provide such coordinate map positioning information is extremely desirable. Obviously, alignment of the beam prior to measuring its quality $M^2$ will facilitate obtaining consistent, reproducible results. The ability to provide alignment information provides other advantages.

One advantage is that the subject apparatus can be used to provide information about the alignment of optical elements that steer the laser beam. Another important parameter of laser operation is referred to as pointing stability. This parameter defines the ability of the laser beam to point in a stable, fixed direction. The subject apparatus can be programmed to monitor, and store in memory the pointing drift from an aligned position to provide the user with information on pointing stability.

Another advantage to providing position information is that it can be used to align the beam prior to obtaining a beam profile using the pinholes carried on the hub. More specifically, the typical focused beam sizes to be measured might have a diameter of about 100 microns. Accordingly, slight alignment errors can shift the scan line of the pinhole so that it will not cross the center of the beam or that it will miss the focused beam entirely. In prior art devices using pinholes to generate profiles, it often took many minutes of searching by translating the profiler on a translation stage to have the pinhole overlap even a small portion of the beam so that a signal could be generated, before centering could be effected by maximizing this signal. This problem is overcome in the subject invention since the beam can be aligned prior to seeking pinhole profile information by the knife edge scan information, as discussed previously.

Still another advantage to precise alignment is that it allows for an additional measurement for quantifying the ability to tightly focus a multimode beam. The latter measurement is discussed below.

BEAM PROFILING

As mentioned above, it is possible to obtain the equivalent of a slit-profile of the beam if the transmission signal past the knife edge is differentiated. This approach was suggested in the literature by Arnuad, in the earlier cited reference.

In the preferred embodiment, however, maximum information about beam profiles can be obtained using a pinhole scan. A pinhole is preferred because it most fully reveals the full structure of the mode of the beam and its use is made easy by the alignment information provided by the knife edges as discussed above.

The general use of a pinhole to obtain profile information is similar to the prior art. As the pinhole passes through the beam, the detector will measure a variation in transmitted power which can be used to generate a profile display of the type shown in FIGS. 1, 3A, 4A, 5A and 6A-C. This data can be placed on a display associated with the device as shown in FIG. 19.

While the general approach for obtaining pinhole profile information is similar to the prior art devices, there are a few important and distinguishing differences. One of the most significant is that since a lens is used to focus the beam, a far field profile, relatively free of overlaid diffraction patterns can be generated. More specifically, as previously discussed, the limiting aperture of a laser will typically create diffraction effects which produce interfering distortions of pinhole profiles taken in the near field of the laser beam. Most users, and particularly industrial users, are interested in the beam profile at a significant distance from the laser. In the past, unless the user set up his own lens and pinhole profiler on a translation stage, this information was gotten by taking the profile far away from the laser. As described earlier, this requirement was often very inconvenient.

This problem is overcome in the subject device because the lens functions to put the pinhole aperture in the far field of the transformed beam and effectively decouple the diffraction effects from the pinhole profiles. More specifically, the lens will focus the diffracted light, which radiates from the limiting aperture as its source, at a different distance than the input beam waist. Accordingly, if the profile is taken at the transformed waist position, an effective "far field" profile will be generated. The automatic lens-focusing servo of the present instrument is a great convenience in setting up this far-field profile.

Where the subject device is actually located in the far field of the input beam, there will be no diffraction/interference effects from the laser limiting aperture. However, the beam will have a relatively large input diameter such that the focused beam will be quite small and may be so small as to cause convolution distortions of the pinhole profile even with the smaller pinhole diameter. In the latter case, it is desireable to obtain the profile at a point spaced from the focus of the lens. This result can easily be achieved if the beam is focused close to the rear hub plane. The profile can then be taken with the pinhole at the front aperture position. Since the processor knows the input beam parameters, in particular the input beam waist location and beam diameter at the lens, it may be programmed to display the front aperture position profile, when it calculates too large a convolution error for the rear aperture position. The indication 216 on the display, FIG. 19, would then change to "10-AT LENS" or "50-AT LENS". This shows that the profile on the display was taken at the front aperture position, with either the 10 micron or 50 micron diameter pinhole, and that the beam width scale 220 (now changed to units of millimeters, mm, instead of milliradians,.mr) shows the computed beam width at the lens 132. For every automatic mode of the instrument, where the processor makes a decision as to what to display or how to take data, the user has the option to turn off the automatic mode and make a manual selection.

In the preferred embodiment of the hub 134 shown in FIG. 18, two pinholes 150,152 of different diameters are provided. The use of two different diameter pinholes increases the ranges of input beam powers and diameters for which a pinhole-profile free of serious convolution errors can be obtained. As mentioned previously, for a profile accurate to 1% of the diameter of the beam at the aperture position, the pinhole diameter should be less than 1/16 of this beam diameter. However, it is generally preferred to use the largest pinhole diameter meeting this minimum convolution error criterion, as this passes the most beam power and gives the highest signal to noise ratio for the profile. The processor knows the transformed beam diameters at each aperture position from the knife edge transmission measurements. Thus, the processor can compute the convolution errors for the two aperture positions and the available pinhole diameters, and select for the display the combination (indicated at 216 in FIG. 19) giving the cleanest profile free of convolution error. Pinhole diameters in the range of 25 to 50 microns for the larger diameter, and in the range of 5 to 10 microns for the smaller diameter, are believed to be adequate sizes to generate clean pinhole profiles for a wide variety of beams from commercial lasers in the present instrument.

DIRECT MEASUREMENT OF THE FOCUSED POWER DENSITY OF A MULTIMODE BEAM

Since the preferred embodiment of the invention includes a high quality, low aberration lens, a measurement of the focused power density of a multimode input beam can be performed. This measurement can be useful in some laser machining applications which might be sensitive to how much laser power can be delivered within a spot of a particular diameter, but not sensitive to the way this power is distributed within that spot diameter. A pinhole profile in this case might contain more information than is of interest to the user. In contrast, the user will want to obtain a direct measure of the fraction of the beam power which can be focused within the particular spot diameter.

Here the beam position detection and focus adjustment capabilities of the instrument can be utilized to set up the transformed beam in a standardized way, and to permit the introduction of an aperture into this beam. The aperture size and shape is specified by the user and is scaled to function in the transformed beam in the same way the beam from the laser will function in the user's application. The transmission through this aperture is computed from the full beam power (readout 224 in FIG. 19) measured before and after introduction of the scaled aperture into the transformed beam. The standardized conditions may conveniently be that the input beam is centered on both coordinate maps 202 and 204, and the lens is positioned to put the transformed beam waist at the center of the hub as previously described. Provision for inserting the scaled aperture 157, in plate 159, shown in FIG. 18, to the centered beam position at the center of the hub can be provided in the instrument. The translation and angular adjustments of the instrument are peaked to maximize the transmitted power and insure that the scaled aperture is accurately centered on the beam. Because the transformed beam is set up to have its waist at the location of the scaled aperture, the transmission measurement is made insensitive to axial positioning errors of the aperture and hence it is more accurate.

ADDITIONAL COMPUTATION CAPABILITIES OF THE INSTRUMENT

The processor controlling the instrument may also be used to compute additional properties about the input beam of interest to the user. The console 190 contains standard RS232 and IEEE488 data buses, through which the instrument processor can download data to a larger computer for the more extensive computations. The on-board processor can deliver the six propagation constants ($2W_o$, $Z_o$ and $M^2$ for each of the two principal planes) of the input beam in real time to the user's own computer, to permit automatic analysis and control of the experiments which utilize the laser beam.

The second moment of the intensity distribution across the laser beam is one such property that can be computed and is of interest to some users. For this, the clean pinhole profile of the beam is digitized and stored in the instrument's memory. The processor first computes the first moment of this stored profile, i.e. the mean of the scanning pinhole's position, weighted by the transmitted power, in scanning across the beam. Then, the second moment is computed. The second moment is the mean of the square of the difference between the scan position and the mean position weighted by the transmitted power in scanning across the beam. (These are the standard mathematical definitions for the first two moments of any distribution function). Twice the square root of the second moment of the profile is called the root-mean-square beam diameter. This quantity is of interest firstly in determining the particular mixture of higher order modes in a multimode beam with a known value of $M^2$. Secondly, it is of theoretical interest in understanding the way the higher-order-mode beam was generated in the laser. Thirdly, the root-mean-square beam diameter may be shown mathematically to be an alternate definition for the beam diameter of a multimode beam, which is free of the types of discontinuities discussed with regard to other definitions. This is because the root-mean-square diameter is based on an integration over the whole beam cross-section and takes account of the total power in the beam.

The knife edge signal clip levels (used to measure the beam diameter) are under processor control. This provides the user a means to convert from a knife-edge based definition of a higher-order-mode diameter, to some other user-specified definition. For example, calculations have shown that for circularly symmetric modes, if the mixture contains modes of orders no higher than the first four modes, then setting the clip levels at 7% and 93% (instead of 16% and 84%) and multiplying the resultant measured width by 4/3 (instead of by 2) will give beam diameters the same as a root-mean-square diameter to within an accuracy of ±3%, (and rms-based $M^2$ values to ±6%).

More precision in the conversion can be obtained with more elaborate algorithms. For example, the $M^2$ value could be measured with an initial set of clip levels (say 16% and 84%); call this value $(M^2)_1$. The processor could compare that result to a look-up table and see that the initial value should convert to a second value under a "user definition" of beam diameter, $(M^2)_2$. Then for the next revolution of the drum, the processor could check this conversion by computing and setting a new clip level, which should produce a measured $M^2$ value of $(M^2)_2$ to within the desired error band if the initial conversion were correct. If there still is too large an error, the second measurement is used as input for the next revolution, and so forth, until the desired accuracy is reached.

Still another method of converting from knife-edge measurements, to root-mean-square values of beam diameter and $M^2$ involves digitizing the knife edge transmission signals. The derivative of the knife edge signal with respect to the edge motion coordinate gives a slit profile (as discussed in connection with FIGS. 27b, c). If this slit profile is multiplied by the edge coordinate squared and the result integrated over the digitized window width (to calculate the second moment of the slit profile), an integration by parts shows that the second moment is given by the digitized window width squared, minus a known constant times the first moment of the knife edge signal. The significance of this is that the slit second moment value can be calculated directly from an integration of the digitized knife edge signal, a process which averages out the noise on the signal to improve accuracy.

Another computed property of interest to some users would be the total power in the input beam P, divided by the beam quality, or $P/M^2$. This is essentially a measure proportional to the peak intensity of the beam. If the diameter of the internal limiting aperture in the laser is varied as was described in connection with FIG. 11, to vary simultaneously both the $M^2$ and the power P of the laser beam, a measurement in real time of the quantity $P/M^2$ would be of interest as there are applications of lasers which are primarily sensitive to the peak intensity of the beam. Accordingly, the processor can be programmed to compute this quantity from other measurements already described, and display the result at 224 in FIG. 19. The units displayed in the latter case would be changed to $W/M^2$ to distinguish the result from the case where the total power is displayed.

It will also be of value to the instrument's user, to be able to enter a location into the instrument (a given distance away from the lens 32) and have the processor calculate the beam diameter at that location. The processor does this from the measured input beam parameters, using equation (11). Thus, computed information about the behavior of the beam at inaccessible locations (such as inside a vacuum chamber) is provided in a rapid and useful fashion.

Finally, the user can download the beam parameters from the instrument's processor into his own host computer, and by ray matrix methods known in the literature, calculate the propagation and beam parameters of his multimode beam at any point through a specified, arbitrary optical system. This is one of the goals set forth in the section on the background to this invention.

FIRST ALTERNATE EMBODIMENT

FIG. 20 illustrates another embodiment 200 of the subject invention. This embodiment incorporates one of the other approaches used in the prior art for measuring beam diameter.

As in the first embodiment, a lens 232 is used to create a transformed or imaged waist. Some means 236 is provided for translating the position of the lens with respect to the detector portion 240 of the device.

The diameter of the beam is measured by passing an aperture (a pinhole or a slit 242 mounted to cover the detector) through the beam. The aperture and detector are translated past the beam using a linear arm 246 driven by a stepper motor 248. For simplicity, a slit aperture is discussed below. A pinhole could be used similarly, with the addition of a translation stage to center the pinhole scan line on the beam (not shown). The transmission past the slit is measured by the detector. The output of the detector can be used to directly generate profile information of the type previously shown. The beam diameter can be derived using any one of the definitions discussed above where a clip level is set and the time elapsed between the clip levels can be used to derive the beam width.

As with the previous embodiment, the first step to determining the quality of the mode of the laser beam is to determine the location of the transformed waist. The waist is located by adjusting the position of the lens while continuously monitoring the diameter of the beam crossing the slit. When the diameter is at a minimum, the beam waist is located in the plane of the slit and the diameter is recorded.

After the beam waist is located, the beam diameter at another known location must be measured. In the illustrated embodiment, a portion of the beam 10a is split from the main beam 10 using a beam splitter 252. This portion of the beam is then redirected to the detector by a fold mirror 254. The beam diameter is then derived by measuring the power transmitted past the slit as the arm extends into this second beam.

Since the portion 10a of the beam does not pass through the lens, the change in input beam diameter as it traverses the known, relatively short, distance between the beam splitter 252 to the slit detector will be very small. The processor first computes $M^2$ assuming that the measured diameter of the beam 10a is the same as the beam diameter at the lens. Thus, a beam diameter at the waist, and at one other known location in the same beam (the transformed beam) are available to calculate the input beam parameters to the first order as described before. Knowing these parameters, the processor can then compute the second order corrections to these parameters, to take into account the slight difference in propagation path length of beam 10a between the beam splitter 252 and the detector.

The advantage to using the device shown in FIG. 20 is that it is of simpler construction. However, it is believed that the primary embodiment is more useful because of the greater amount of information generated more rapidly since more apertures can be carried smoothly and precisely at high speed through the beam.

SECOND ALTERNATE EMBODIMENT

FIG. 21 illustrates still another embodiment 300 of a device for carrying out the subject invention. As in all the embodiments, a translatable lens 332 is provided for creating and moving a transformed beam waist. In this embodiment, the means for measuring the beam diameter includes a spinning wire 342 driven by a motor 343. The spinning wire moves through the path of the laser beam. Light reflected off the wire (shown at 46,348) is measured by detectors 356,358 and used to derive information about beam diameter. This method of taking two-axis beam profiles is described in the literature; Lim and Steen, *J. Phys. E.*, (Sci. Inst.) Vol. 17, 1984, pp. 999-1007.

In accordance with the subject method, the position of the lens is moved along the beam axis (shown at 360) in order to place the beam waist in the plane of the spinning wire. The diameter of the waist is measured as in the literature reference above. The diameter of the beam at another known location is obtained in the illustrated embodiment, by sliding the lens out of the beam (shown at 362). Thus, beam diameters at the waist and one other known location are obtained in a manner similar to the first alternate embodiment, and the beam parameters can be derived similarly from this information.

Since this second alternative embodiment involves a reciprocating motion 362 of the lens to perform the $M^2$ measurement, it is believed that the primary embodiment is more useful once again, because more information about the beam is obtained more rapidly.

THIRD ALTERNATE EMBODIMENT

Figure 25:
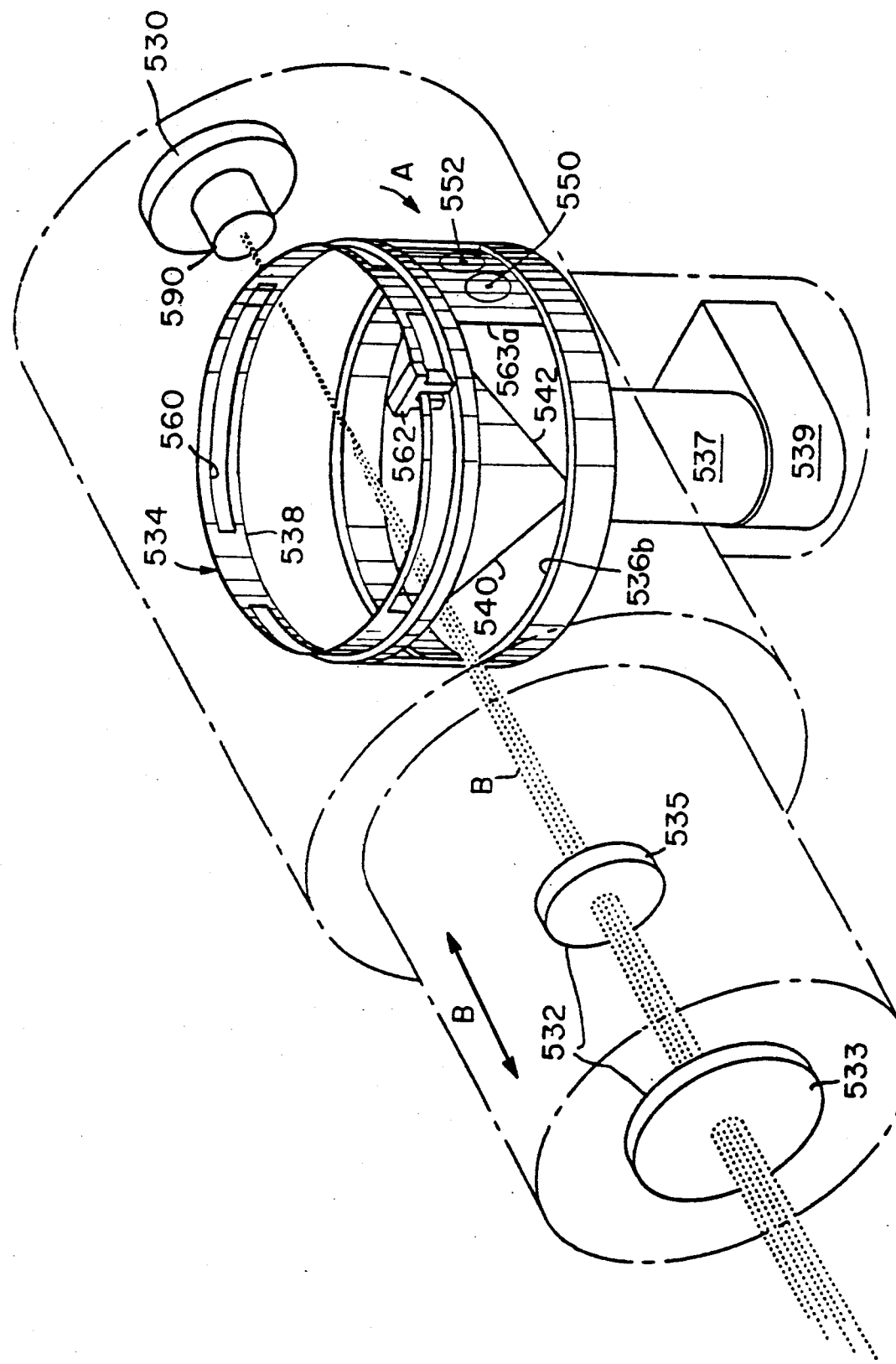
FIG. 25 is a simplified perspective view of the third alternate embodiment of the subject invention.

The third alternate embodiment is illustrated in FIG. 25. The latter embodiment is quite similar to the first principle embodiment and incorporates some additional refinements. Only these additional refinements will be discussed below.

As in the first embodiment, a hub or drum 534 is provided which is rotated in the direction of arrow A by a dc motor 537 with angle encoder 539 mounted on the same shaft. In this embodiment, a constant drum velocity is not necessary. Rather, the angular position of the hub is known at all times from the output of the encoder, which divides each drum revolution into 500 parts. By this arrangement, the beam diameter, measured by the time difference between cut points on the knife edge transmission signal, is proportional to encoder counts. To enhance the resolution of this measurement, the time interval between encoder transitions is subdivided into 1024 parts using an oscillator phase-locked to the transition points. In this way the beam diameter is measured as an integer times an incremental part of the circumference of the drum, where each incremental part is 1/512,000 of the circumference.

The hub carries a thin strip of beryllium-copper having apertures formed therein by a photolithographic technique. Preferably, the strip is 3 thousandths of an inch thick. The photolithographic technique is preferred because it can provide extremely accurate positioning of the feature to be incorporated into the hub, and it is a convenient means of forming thin apertures. Thin apertures facilitate an accurate definition of the drum diameter D, needed in the $M^2$ calculation set forth in Equations (13) and (14). In the preferred embodiment, the beryllium-copper strip is coated with aluminum so that it will reflect the power of the beam.

As with the hub shown in FIG. 18, two 45 degree knife edge apertures (540 and 542) are provided. However, unlike the first embodiment, they do not define the outer edges of the aperture 536. Rather, they are formed within the main aperture 536. This alternate approach was selected to simplify the detection electronics. More specifically, in the design shown in FIG. 18, as the first knife edge 140 approaches the beam, the surface of the hub will be blocking the entire beam and no power will reach the detector. As the knife edge 140 passes through the beam, the intensity of the light reaching the detector will go from a minimum to a maximum. This pattern is reversed as the second knife edge 142 moves past and chops the beam.

In the embodiment illustrated in FIG. 25, this entire sequence is reversed. As can be seen, before the first knife edge 540 passes through the beam, the full beam power will pass through aperture 536 and reach detector 530. It has been found that it is preferable to detect the full power level and electronically set the one-hundred percent transmission signal level immediately before the knife-edge transmission measurement. This approach gives the most accurate beam width if there is drift in the one-hundred percent power level of the beam. As the knife edge 540 passes through the beam the power transmitted and detected will go from a maximum to a minimum. As the second knife edge 542 passes through the beam, the power transmitted will increase again.

As in the first embodiment, hub 534 includes two pinholes 550 and 552 of different sizes. A clearing opening 538 is provided on the opposite side of the hub to allow the beam to freely pass. It should be noted that in this embodiment, only a single clearing opening is used.

This and other features of the layout of the aperture strip are here briefly explained. For each aperture of width W around the circumference of the strip, there must be an opening of width W on the opposite side of the strip for the apertured beam to pass to the detector 530. But in addition, there are physical apertures in the body of the device defining an entrance pupil (diameter H) and an exit pupil (diameter S) on either side of the drum, that determine the extreme ray paths that can pass through the instrument. Since a ray could be anywhere within these two pupils, to insure that no part of an apertured beam be subsequently blocked, the clear opening must be of width W+H+S for each transmitting feature on the strip. Also the width of each feature is a function of the width of the entrance aperture, e.g., for a pinhole a blocking portion of width H on either side of the hole insure no unintended light leaks through as the pinhole transits across the entrance pupil. (The exit pupil is smaller than the entrance pupil, so no light leaks that passage either.) This makes the minimum circumference of aperture strip needed to accommodate the various features, a strong function of the entrance pupil width H. While many layouts of features on the aperture strip are possible, by grouping together the level setting (100% transmission) window, knife edges, and both pinholes in sequential order as in FIG. 25, making them one large (complex) feature, a minimum diameter drum is achieved because the extra clear window width H+S is required only once. This permits the instrument to be more compact. In the preferred embodiment the pupil diameters are H=16 mm, S=10 mm.

Figure 26:
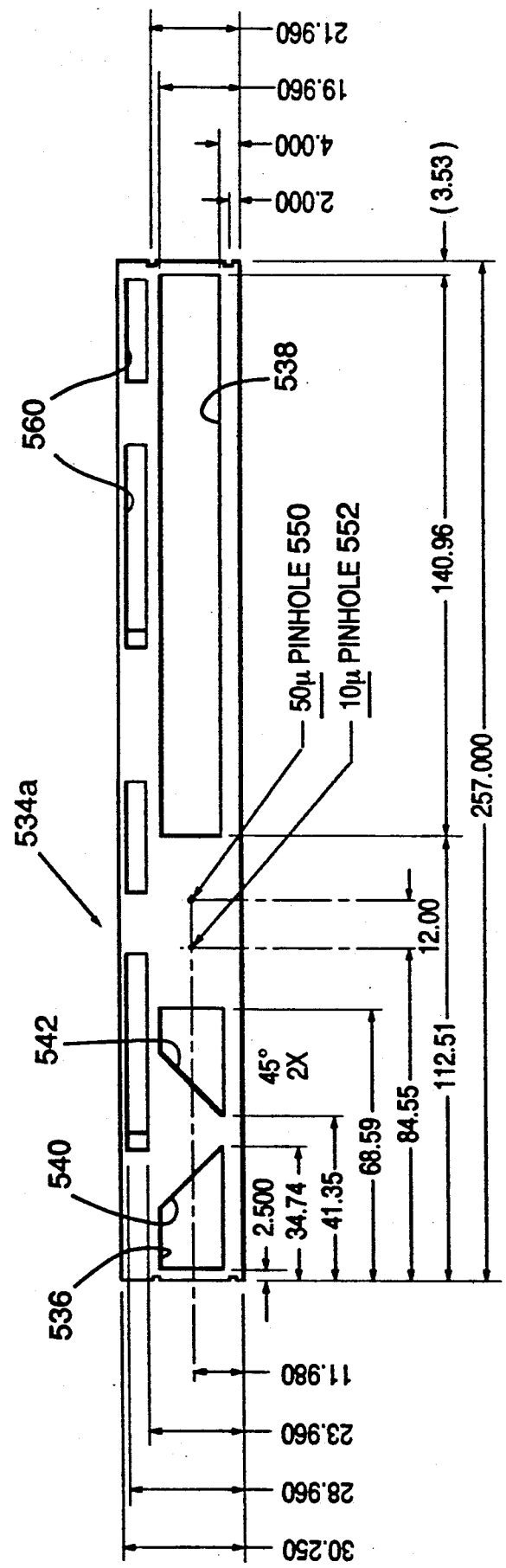
FIG. 26 is a top plan view of the aperture strip used to form the hub shown in the embodiment illustrated in FIG. 25.

The details of the feature layout on the aperture strip 534a is shown in FIG. 26. Preferably, the two pinholes 550,552 are drilled into the strip by a laser. In this manner, they may be positioned accurately to known locations with respect to the knife edge apertures. This facilitates the calibration procedure used to electronically offset the centers of the front 202 and back 204 targets (shown in FIG. 19). The calibration offsets make the centers of the targets represent the locations of the pinholes, for pinhole alignment.

Also in the preferred embodiment a less cluttered target/alignment screen is obtained by having only one target circle, on which two indicators are placed, a small circle replacing the front dot 206 in FIG. 19, together with the rear dot 208. When aligning the instrument, both indicators are placed at the center of the single target, and the small circle makes a halo centered on the rear dot to indicate the correct alignment.

As discussed above, some fiducial marks 44 (as shown in FIGS. 8a and 13a) must be provided indicating the position of features on the hub. In this embodiment, a series of digitizing window encoding marks 560 are provided along the upper edge of the hub. Each of the marks are associated with a specific feature of interest on the hub. A standard LED/photodiode interrupter 562 is used to detect the marks. The signals from the interrupter are gated to the processor and are used as fiducial marks 44 for the various features carried on the hub.

As can be appreciated, the amount of light passing through the large aperture 536 and the small pinholes is substantially different. In order for the detector to measure these different levels, it must have a large dynamic range. Dynamic range may be defined here as the ratio of the largest power that may safely be incident on the detector without damaging it, divided by the smallest incident power giving an adequate signal to noise level. Unfortunately, the dynamic range of the pyroelectric detector used to detect $CO_2$ laser radiation at ten microns is fairly limited, on the order of 1:100. In this case, it would be desirable to minimize the variation in powers to be measured. One way this can be achieved is to attenuate the beam as it passes through aperture 536. A suitable beam attenuator can be fabricated through the photolithographic process if the spaces 536a and b are actually left solid, but peppered with a grid of evenly spaced pinholes. Since the smallest ten micron (wavelength) laser beam diameter to be measured by this device is on the order of 500 microns, as long as the pinholes are less than 100 microns in diameter and they are spaced by less than about 300 microns, the effect will the sam as a attenuating filter. This type of radiation attenuation has historically been called a "wire-grid" attenuator.

Figure 27:
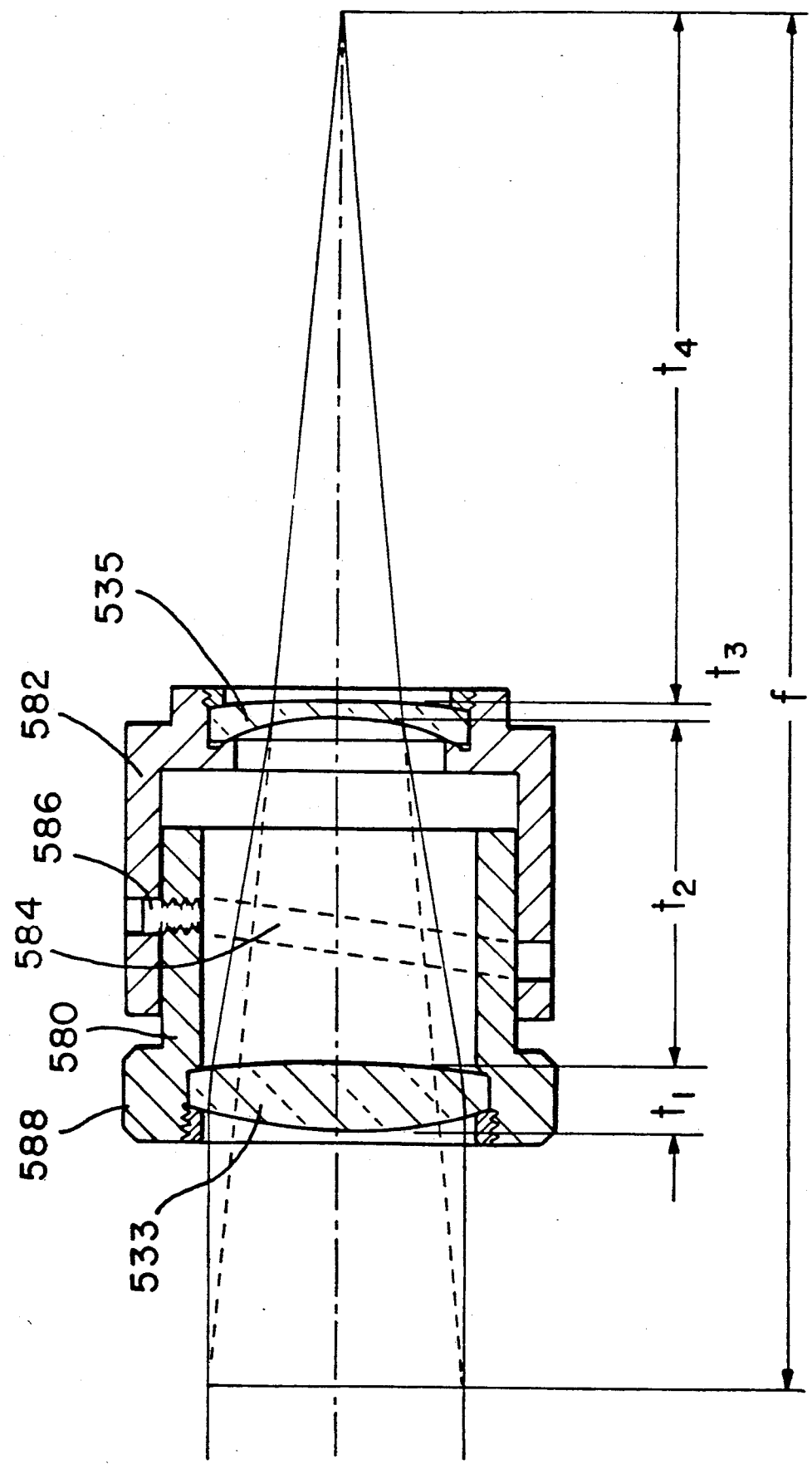
FIG. 27 is an enlarged, cross-sectional view of the telescoping lens doublet used to create a transformed beam waist in the embodiment illustrated in FIG. 25.

In addition to the modifications in the hub design, another significant feature of this embodiment is the provision of a lens system 532 providing diffraction-limited focusing over a wide wavelength span. The lens system 532 is a doublet consisting of a positive element 533 and a negative element 535 as best seen in FIG. 27. As in the all of the embodiments, this lens pair is mounted in a manner so that the pair can be moved back and forth (along arrows B) to focus and translate the transformed beam waist. However, this lens system is a telephoto arrangement wherein the spacing $t_2$ between the two lenses can be adjusted to minimize aberration for specific laser wavelengths.

In the discussion above with respect to the first principal embodiment, it was suggested that to gain a broad wavelength coverage of the instrument, interchangeable lenses could be used. This would be necessary, for example, if conventional designs to reduce the lens aberrations were used involving multiple lens elements of different glasses. The typical index of refraction variations between different glasses for wavelengths different by a factor of about 2 are enough that a well-compensated, low aberration lens on one end of this range, has significantly higher aberrations on the other end of the range. To span a wavelength range of a factor of 8 and meet the diffraction-limited focus requirement of this instrument would require a set of about 3 lenses using conventional lens design. It would clearly be an advantage to the user to cover as broad a wavelength range as possible with a single lens system. A suitable lens system must also be able to handle relatively high input power densities, preferably on the order of 1,000 watts/cm$^2$, reached by commercial laser beams.

To achieve these goals, an air-spaced doublet (telephoto) lens system was developed. The air space permits aberration compensation to be achieved with both lenses of the doublet made of the same glass while the telephoto design reduces the overall length of the instrument. Both of the lenses in the doublet are formed of silica. This is a low absorption material with high transmission over a wide range of wavelengths (somewhat broader than 200 nm to 2,000 nm). Due to these properties, use of silica as the lens material in the subject design results in a lens system with the desired wide wavelength range and high power density capabilities. Both of these lenses are provided with wide-bandwidth anti-reflection coatings.

The lens design is best understood by first considering the choices for the radii of the surfaces of the lenses, when the lens is to operate at a central visible wavelength. The individual focal length of the two lenses and their spacing $t_2$ are chosen to give the desired telephoto focal length f and the desired telephoto compression ratio (the ratio $([t_1+t_2+t_3+t_4]/f)$, as illustrated in FIG. 27). The positive element 533 is given the "best-form" shape which minimizes spherical aberration for parallel incident light. The negative element 535 is then shaped to compensate for a the residual spherical aberration of the positive element at this central wavelength. These shape choices also result in an acceptable level of coma for the lens pair as well. Coma effects are the next most significant lens aberration for a lens used with nearly collimated, small diameter laser beams.

The next step in the lens design must take into consideration the variations induced as the wavelength of the light is varied from the central visible wavelength. In this case, the index of refraction n of the silica material will vary, but this variation is the same for both lens elements. If the height of the refracted ray from the first element is kept the same on the second element, then the same aberration compensation which occurs at the central wavelength, will remain at shorter and longer wavelengths as well. In the subject invention, the ray height is kept the same by scaling the spacing between the lenses in proportion to the focal length of the first element 533. This focal length varies as $1/(n-1)$. Thus, by adjusting the inter-lens spacing $t_2$ proportionally with $1/(n-1)$ as the index refraction n varies with wavelength, a low-aberration lens is obtained which works essentially over the full transmission range of the silica lens material.

The mechanism used to vary the lens spacing $t_2$ in the subject invention is best seen in FIG. 27. The positive element 533 is mounted in an inner carriage 580 while the negative element 535 is mounted in an outer carriage 582. Inner carriage 580 is telescopingly received in outer carriage 582. A spiral slot 584 is machined into the inner surface of outer carriage 582 and is engaged with a pin 586 projecting outwardly from the inner carriage 580. By this arrangement, as the inner carriage is rotated with respect to the outer carriage, the lens spacing $t_2$ will be adjusted. A knurled ring 588 can be provided for rotating the inner carriage.

The pitch angle of the spiral slot is cut so that the wavenumber (inverse of the wavelength) for which the lens pair is properly spaced, will vary linearly with the rotation angle. Using this approach, a wavenumber readout dial (not shown) may be placed directly on the inner carriage. In the preferred embodiment, a spring loaded, sliding-pin, linear potentiometer (not shown) is mounted between the two carriages, and is used in a circuit designed to allow the processor to monitor the spacing between the lenses. The processor will convert the selected spacing to a wavelength via a look up table. The selected wavelength will be displayed. In use, the operator, knowing the wavelength to be tested, will rotate the knurled ring watching the display until the desired wavelength is found. At this point, the proper spacing will have been set between the lenses to minimize the spherical aberration and the processor will have read the proper wavelength to be used in the M$^2$ calculation of equation (13).

The dimensions of the lens pair in the preferred embodiment are set forth in Table II below. The interlens spacing $t_2$ and the distance $t_4$ from the rear of the negative element to the focal plane are indicated in FIG. 27. The parameters $t_1$ and $t_3$ are the thickness of the positive and negative lens elements also indicated in FIG. 27. The focal length f of the telephoto doublet is indicated by the phantom line ray tracing in FIG. 27.

TABLE II

|  | Positive Element |  | Negative Element |
|---|---|---|---|
| First surface radius | 64.00 mm |  | −39.90 mm |
| Second surface radius | −281.93 mm |  | −127.00 mm |
| Diameter | 40.00 mm |  | 32.00 mm |
| Wavelength | 225 nm | 633 nm | 2000 nm |
| Index of Refraction | 1.5242 | 1.4570 | 1.4381 |
| $t_1$ | 8.00 mm | 8.00 mm | 8.00 mm |
| $t_2$ | 46.07 mm | 52.36 mm | 54.39 mm |
| $t_3$ | 2.00 mm | 2.00 mm | 2.00 mm |
| $t_4$ | 90.21 mm | 106.34 mm | 112.12 mm |
| focal length f | 183.90 mm | 212.12 mm | 222.26 mm |

It is believed that this lens system can be used advantageously in any device where a diffraction limited focus of a laser beam is necessary, and the wavelength of that beam can vary over a wide range.

Another modification provided in this embodiment is a diffuser element 590 positioned before the detector 530. As noted above, detector 530 is only used to measure transmitted power, not the spatial distribution of the beam. While a diffuser element will alter the spatial distribution, it will also preserve the relative power of the transmitted beam. The advantage to using a diffuser is that by spreading out the beam, the areal intensity will be reduced allowing the detector to operate over a greater range.

The process of finding the transformed beam waist location has already been described. This process can be performed on start-up of the instrument, or in a continuing dither and track option where the processor dithers the lens position to follow a moving waist location and keep it in focus.

In practice, it has been found more convenient to leave the decision up to the user as to when to refocus the instrument. .This approach is preferred because the input waist location (and therefore also the transformed waist location) is tied to the presence and location of the optical elements in the train generating and delivering the beam to the instrument. These elements and their positions are only changed by the user. For example, a change in the waist location of the beam directly out of a laser usually requires the substitution of a new resonator mirror of different radius. The substitution of a new mirror generally changes the output beam direction to some degree and therefore would require the realignment of the $M^2$ meter. Since the user must readjust the meter anyway, it is also convenient to push a button to instruct the instrument to check the focus.

The latter approach is preferred to dithering the lens to maintain the focus. More particularly, dithering the lens slows down the update rate of the $M^2$ measurement because data can be taken only when the lens is in the focused location (or about one-third of the time), not when it is dithered to either side.

The ambiguities as to which principal plane upon which to focus is settled since the user picks the plane of most interest. Thus, in this preferred embodiment, the button to initiate a focus sequence is constantly available and the decision as to when to use it is left to the user.

It has also been found convenient to present to the user the data acquired by the instrument in determining the best focal position. This data takes the form of a beam propagation plot similar to FIG. 14, presenting the measured beam diameter as a function of lens position during the focusing sequence. FIG. 14 is an illustration for finding the waist location and presenting the beam diameter data only for a limited portion of the lens travel, near the beam waist. In the preferred embodiment, the data over the full lens travel is presented to the user. The data is also converted by the processor as discussed above to show the input beam values. Diameter data from both principal planes are shown simultaneously on one plot so that the difference in waist locations (the astigmatism of the beam) and the difference in waist diameters (the asymmetry of the beam) in the two planes is graphically displayed. This is called an axial profile or beam propagation plot.

PIXEL MAP

The apparatus of the third alternate embodiment can be further modified to produce a two dimensional bit or pixel map of the intensity distribution across the beam. This type of intensity profiling is typically performed with relatively expensive devices which include a CCD camera or pyroelectric array, having a plurality of detector elements, each of which images discrete locations within the beam. The output of these devices is a pixel map showing the intensity distribution over the entire beam cross section. Unfortunately, these devices tend to be relatively expensive. More significantly, the resolution of these device is limited to large pixel sizes, which for pyroelectric arrays are on the order of one millimeter squared. The modification described herein can be used to generate a pixel map having a resolution or pixel size on the order of one micron squared.

This result is achieved by incorporating into the device a translatable blocking member 602 having a knife edge 604 as shown in FIGS. 28 and 29 illustrating the fourth alternate embodiment of the subject invention. The knife edge 604 is oriented perpendicular to knife edge 640 carried by the hub 634. The blocking member is carried by a reciprocating arm 606 which is translated by a stepping motor 608. In operation, the blocking member is moved across the beam in discrete increments, sequentially blocking or unblocking the beam B. To reduce parallax effects, the blocking member 602 should be placed as close as possible to the hub 634. Preferably, the blocking member is moved one step for each revolution of the hub. The amount of movement is based on the desired pixel resolution. It should be understood that as the pixel size is reduced and the resolution is increased, the time necessary to obtain the measurement will also increase (unless the area to be mapped is also reduced). One revolution period is required per pixel so the total time is always determined by the total number of pixels measured.

The detection electronics used to measure the transmitted power (including diffuser 690 and detector 630) are the same as in the previous embodiments. The steps of the processor takes to generate the pixel map based on the transmitted power measurements can best be understood with reference to FIGS. 30a through 30d.

FIG. 30a illustrates the geometry of the interaction between the rotating knife edge 640 (carried on the hub) and the knife edge 604 of the blocking member. The beam passing through to the detector is represented by the circle of diameter 2W. In this example, both knife edges are shown moving from left to right along the X-axis. Note that in operation, the blocking member will be moved one increment ($\Delta X$) between successive scans of the beam by the knife edge 640. To simplify the mathematics, it will be assumed that the selected pixel width ($\Delta X/\sqrt{2}$) is very small so that the variation in intensity from one side of the pixel to the other can be ignored. As will be seen, the intensity at a pixel is derived by taking differences between the powers transmitted through two orthogonal slits, each having a width $\Delta X$ whose intersection defines the pixel's location and size.

FIGS. 30b and c show how the slit transmission function S(X) is derived from the measured power transmitted past the rotating knife edge 640 while the blocking member is withdrawn to a position well removed from the beam. The transmission function (K(X)) follows the same format as has been discussed above with respect to FIGS. 8 through 10. To derive the transmission that would be observed through a slit ($\Delta X/\sqrt{2}$ wide), it is merely necessary to take the difference between adjacent values on the transmission function. Thus, the transmission through a slit is derived based on the movement of knife edge 640 from position $X_1$ to position $X_1 + \Delta X$ and is defined as:

$$S_i(X) = K(X_i) - K(X_i + \Delta X) \qquad (18)$$

FIG. 30c is a plot of the calculated transmission through a slit at various points across the beam profile.

The calculation of the intensity of the pixels within the slit is performed in an analogous manner. This calculation requires sequential transmission measurements taken as the blocking member 602 is moved through the beam.

FIGS. 30d through 30f illustrates transmission functions measured with the blocking member 602 in three different positions, $X_j$; $X_j + \Delta X$; and $X_j + 2\Delta X$. Note that as the blocking member moves off the beam spot, the successive transmission functions increase in amplitude, with the associated slit functions (shown directly underneath in FIGS. 30d through 30f) increasing in proportion. For each position of the blocking member 602, the difference between adjacent values provides the intensity value for the given pixel. Thus, the pixel intensity ($P_{ij}$) can be defined as follows:

$$P_{ij} = [S_j(X_j + \Delta X) - S_j(X_j)] \quad (19)$$

In practice, the beam size and location information initially taken from the knife edge scans will be used to rapidly move the blocking member into position. Preferably, the blocking member will be moved to a position between 1.5 and 2.0 spot radii from the center of beam. The blocking member would then be stepped to cover one pixel width per hub revolution, out to 1.5 to 2.0 spot radii to the other side of the center. In this measurement approach, the time taken to step the blocking member is minimized since its movement is limited to be within the area where the transmission variation is significant. This is possible because the beam diameter and centering information has already been measured as previously described and is available to the microprocessor.

As discussed above, the subject invention can be used to provide beam alignment information with very high precision. However, before this information can be generated, it is necessary that the device be placed so that the beam is roughly aligned with the detection mechanisms (instrument optical axis). This initial rough alignment of the device can be facilitated by using a pre-aligned, removable reflecting mirror over the input end thereof. The mounting of reflecting mirror permits the normal to the mirror to be adjusted parallel to the instrument's optical axis in a calibration step. Then, to initially align the instrument, the incident beam is first made to strike on the centerline of the instrument. Then, the rough angular position of the device is varied with adjustments 182, 184 until the incoming beam is reflected back on itself (retroreflected) by the mirror. Once this positioning has been achieved, the reflecting mirror can be removed and the beam should be centered sufficiently to be measured accurately by the device.

SPECIFIC APPLICATIONS FOR MODE QUALITY INFORMATION

In planning laser material processing applications, prediction of the diameter of the beamsurface interaction region of a given input beam diameter and lens focal length require a knowledge of $M^2$. High beam quality is essential where small focus-spot diameter is important.

Figure 22:
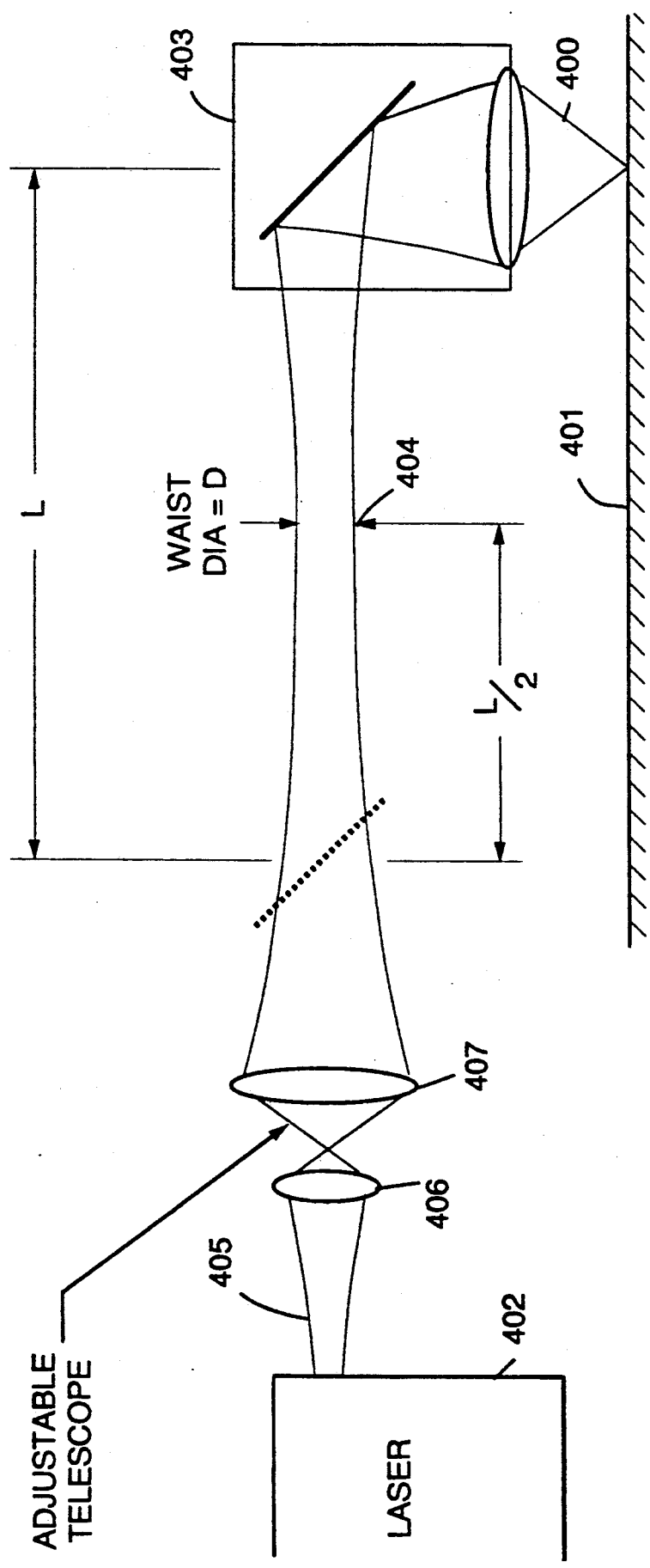
FIG. 22 is a schematic view of a gantry delivery system utilized to scan a laser beam over a workpiece.

Many laser applications require delivery of the beam over long and variable length optical paths. An example is shown in FIG. 22. In this device, a gantry beam delivery system is utilized to scan the beam 400 over the workpiece 401 while the laser 402 remains stationary. The final delivery assembly 403 (consisting of a beambender and lens) will move over a large range L, typically from a few meters to 20 meters from the laser.

The most economical design for such an optical system uses optical components of the smallest possible diameter consistent with allowing the entire beam to pass without significant aperture loss. This constraint requires that a beam waist 404 of optimum diameter be positioned in the middle of the variable portion of the optical path, at a distance L/2 from each end of the travel. In order to minimize the beam diameters at the ends of the variable path, the optimum beam waist diameter $D_0$ at location L/2 is given by:

$$D_o = 2\sqrt{(M^2 \lambda (L/2))/\pi} \quad (20)$$

Following this approach the diameter at each end will be larger than the diameter of the waist by a factor of $\sqrt{2}$. These diameters improve (decrease) as the beam quality improves, if only as the square root of the beam quality number $M^2$.

The beam 405 emitted by the laser is unlikely to have the characteristics required by Equation 20. To transform the laser beam into the required beam will require the use of an optical system referred to in the literature as a mode-matching telescope. This optical system is represented as the combination of lenses 406 and 407 in FIG. 22. One or both of these lenses could be high reflectivity mirrors with suitably curved surfaces. (It should be understood that the lenses shown in connection with the measurement apparatus described above could, as well, be suitably-curved, high reflectivity mirrors.)

Figure 23:
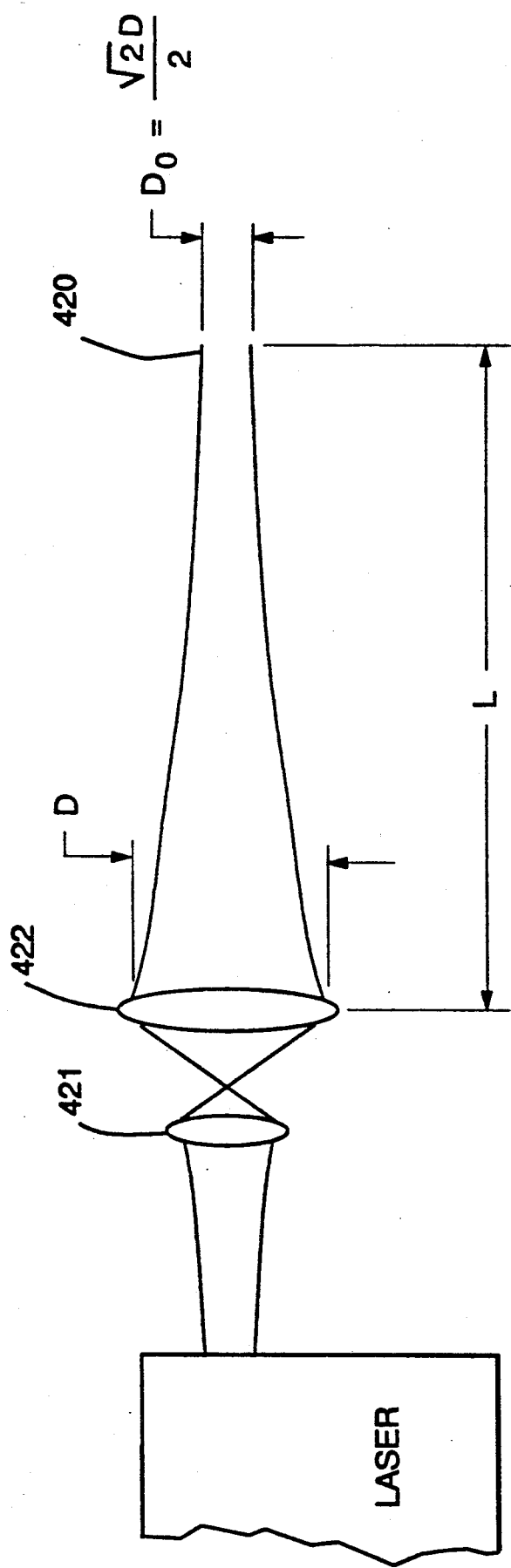
FIG. 23 is a schematic view illustrating how the diameter of the optical elements in a fixed delivery system can be minimized with the knowledge of beam quality.

For laser applications requiring beam delivery over a fixed distance the same relationship applies for minimizing optics diameter at the output end 420 as shown in FIG. 23. This is especially true for articulated optical pipes (articulated arms) where there is often high interest in having a long arm and also having a small tube diameter at the far (distal) end to make it light and easy to manipulate. The maximum distance $L_{max}$ at which a beam waist can be positioned beyond an aperture large enough to pass a beam with diameter D is given by:

$$L_{max} = \pi D^2 / (8 M^2 \lambda) \quad (21)$$

If this constraint is observed, the beam diameter at the output end will be $D/\sqrt{2}$. As described above, a mode-matching means 421,422 will likely be required.

An instrument for measuring mode quality will be of use in finding and correcting aberrating elements in a laser optical system. As a first example, $M^2$ measurements were used as a quality control method on an assembly line building articulated arms (mentioned above) for the delivery of a surgical laser beam. These arms consist of a series of pipes, joined at the elbows by plane mirrors in mechanical assemblies (called knuckles) that keep the beam pointed down the center of the next pipe, despite the motions of the whole arm necessary to deliver the beam to the desired target. It was found that the $M^2$ value for a beam transmitted through a properly assembled arm was 1.1, little changed from the $M^2$ of the beam propagating in free space. However, when the surface of one of the plane mirrors was distorted, (by over tightening the mounting screws) the $M^2$ value rose to 1.7. A simple profile of the transmitted beam at one location might not have detected the aberration. Measurements of $M^2$ before and after the arm can accomplish this because a change represents a change in beam quality caused by something in the propagation path.

It is well known in optics textbooks that the aberrations of a lens used to focus a beam depend on the orientation of the lens in the beam. For instance, a lens which has one plane and one spherical surface (a plano-convex lens), has less spherical aberration if the curved surface of the lens faces the (nearly) planar wavefronts of the collimated beam (instead of the converging spherical wavefronts of the focused beam). If the lens is used at a large enough aperture that its spherical aberration is significant, enlarging the spot size of the focus of the beam, beam quality measurements would reveal the inadvertent reversal of the lens.

Thus, it is envisioned that beam quality instruments will be in routine use for locating and correcting aberrating elements in an optical system. The useful property of $M^2$ here is that like the classical "diffraction limit", beam quality is conserved (unchanged) in passage through (transmission or reflection) a non-aberrating system and increases through an aberrating one. It is useful to define the aberrating quality $Q_A$ of an optical element for a beam of quality $M^2_{IN}$ as $$Q_A = (M^2_{OUT}/M^2_{IN}) \qquad (22)$$

where $M^2_{OUT}$ is the beam quality measured after traversal of the optic. $Q_A$ will generally depend on the diameter and $M^2$ of the input beam and increase with an increase in either, as can be appreciated in view of the above discussion relating to spherical aberration. For a system of cascaded elements, all of low aberration, the overall $Q_A$ will be the product of those for the individual elements as can be seen from equation (22). When a badly aberrating element is included in the cascade, $M^2$ increases upon exiting that element, which generally increases the aberrating qualities of the remaining elements in the cascade in a compounding fashion. It is evident that a beam quality instrument, applied to aberrating quality measurement will be of considerable use in the testing of optical systems.

By the laws of light propagation and definition of beam quality, the value of $M^2$ can be no smaller than unity. An element might act on a beam to reduce its value of $M^2$, but never to less than one. A passive device known as a spatial filter, for example, is intended to improve the quality of a beam. The beam is brought to a focus with a high quality microscope objective, and at the focus there is placed a centered pinhole of a diameter chosen to pass about 95% of the associated fundamental mode for the input beam. This diameter is small enough to block a considerable amount of the higher order mode content of the beam, and the transmitted beam quality improves. Thus, the $Q_A$ for the spatial filter is a number smaller than one. A beam quality instrument can therefore be used to adjust the alignment of a spatial filter for a lower $Q_A$ value.

Similarly, some active optical systems may have aberrating qualities of less than unity, where the output beam quality is improved. In the effect known as second harmonic generation, a laser beam typically in the visible wavelength range is focused into a crystal having certain special properties, and an output beam having a wavelength of half that of the input beam is generated, in the ultraviolet wavelength range. The conversion efficiency of visible to ultraviolet is mode dependent, lower order modes generally producing higher conversions. It is therefore generally expected that the $M^2$ number for the second harmonic beam will be lower than for the visible pump beam, indicating better beam quality for the second harmonic beam. Light propagation in the crystal can, however, also produce aberrations (which also differ in the two principal planes of the beams) due to double refraction (the "walk-off" effect). Thus, the aberrating quality of a second harmonic crystal is an interesting quality to measure. It is evident that once a beam quality instrument is widely available it will be of considerable use for aberrating quality analysis of laser physics experiments.

Beam quality instruments will also find applications in the set-up and adjustment of the laser system itself. An example where beam quality has been used to do this was in a dye-laser photocoagulation system. Photocoagulation is the application of an intense burst of light, here delivered through a fiber, to treat diseases of the eye. Dye lasers produce output beams whose wavelength can be varied or tuned, but they typically require another laser, here an argon ion laser, to optically activate or pump the dye molecules. The dye laser is used for treatment because by tuning the wavelength, selective absorption can be had in the proper tissue in the eye.

The conversion efficiency from ion laser pump beam power, to dye laser output beam power, is dependent on the beam qualities of both beams. The lowest acceptable beam quality of the dye laser beam was fixed by the requirement for transmission of this beam through the delivery fiber. This system is an example of the "power vs. mode" trade off discussed in the background section of the application. Various optics combinations were tried inside the ion laser resonator, which produced coupled changes in the ion laser pump beam power and mode. The effect of these changes on the dye laser output beam power (of acceptable beam quality) were monitored. It was found that reducing the $M^2$ value for the ion laser beam from $M^2=6.3$ to $M^2=3.2$ decreased the ion beam power only slightly, but further reduction to $M^2=1.4$ dropped this power by 20%. The dye laser power, on the other hand, rose by +45% over the original value with the first change, then fell from this peak to 35% over the original value with the second change. Thus beam quality measurements were successfully used to optimize this complex problem of trading-off power versus mode.

A simpler example of beam quality use in adjustment of a laser is in setting up the internal limiting aperture (selecting its diameter, and centering its position), and in aligning the resonator mirrors, to give a desired $M^2$ value. This is the classic example of the power-vs.-mode trade-off. An off-center or incorrectly sized aperture, coupled with a slightly misaligned mirror, may produce the expected power, but in a poorly focusable mode. Without an instrument to quantify the mode quality, the unfortunate technician left to do the set-up is apt to err on the side of the variable he can measure, and ship a laser which meets power specifications, but will not meet customer expectations. This is one of the problems which motivated the present work and led to the present invention.

While the subject invention has been described with reference to the preferred embodiments, various changes and modifications could be made therein, by one skilled in the art, without varying from the scope and spirit of the subject invention as defined by the appended claims.

We claim:

1. An adjustable lens system for selectively focusing laser light over a broad wavelength range comprising:
   a first lens having a spherical aberration;
   a second lens, spaced from said first lens and having a shape selected to compensate for said spherical aberration of the first lens at a given spacing for a given wavelength within said range; and
   means for adjusting the spacing between sad lenses, with the spacing being selected to minimize a net spherical aberration of the two lenses for any wavelength of said laser light to be focused in said range.

2. A lens system as recited in claim 1, wherein the adjustment to the spacing between the lenses is proportional to where n is the index of refraction of the lenses for the wavelength of light to be focused.

3. A lens system as recited in claim 2, wherein said lenses are formed from the same material.

4. A lens system as recited in claim 2, wherein said lenses are formed from silica.

5. A lens system as recited in claim 2, wherein said first lens is a positive lens and the second lens is a negative lens.

6. A lens system as recited in claim 2, further including an inner carriage for supporting said first lens and an outer carriage for supporting said second lens, with said inner carriage being telescopingly received in said outer carriage.

7. A lens system as recited in claim 6, wherein said inner carriage includes an outwardly projecting pin receivable in a spiral slot formed on the inner surface of the outer carriage so that as the carriages are rotated with respect to each other, the spacing between said lenses is varied.

* * * * *